(12) United States Patent
Huang

(10) Patent No.: US 11,506,872 B2
(45) Date of Patent: *Nov. 22, 2022

(54) IMAGING LENS ASSEMBLY, IMAGING APPARATUS AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 124 days.

This patent is subject to a terminal disclaimer.

(21) Appl. No.: 16/994,759

(22) Filed: Aug. 17, 2020

(65) Prior Publication Data

US 2020/0379220 A1 Dec. 3, 2020

Related U.S. Application Data

(63) Continuation of application No. 15/844,895, filed on Dec. 18, 2017, now Pat. No. 10,782,505.

(30) Foreign Application Priority Data

Oct. 25, 2017 (TW) .................................. 106136761

(51) Int. Cl.
| | |
|---|---|
| *G02B 13/00* | (2006.01) |
| *G02B 15/14* | (2006.01) |
| *G02B 27/00* | (2006.01) |
| *G02B 9/26* | (2006.01) |
| *G02B 13/18* | (2006.01) |
| *G02B 9/62* | (2006.01) |

(52) U.S. Cl.
CPC ........... *G02B 13/0045* (2013.01); *G02B 9/62* (2013.01); *G02B 13/18* (2013.01); *G02B 27/0025* (2013.01)

(58) Field of Classification Search
CPC .... G02B 13/00; G02B 13/0045; G02B 13/02; G02B 13/04; G02B 13/18; G02B 3/04; G02B 9/62; G02B 15/14; G02B 27/00; G02B 27/0025; H04N 5/225; H04N 5/2254; H04N 5/2258
USPC .......................... 359/713, 756, 757, 759, 658
See application file for complete search history.

(56) References Cited

U.S. PATENT DOCUMENTS

| | | | |
|---|---|---|---|
| 2,029,806 | A | 2/1936 | Bertele |
| 2,522,390 | A | 9/1950 | McCarthy |
| 2,574,995 | A | 11/1951 | Aklin |
| 2,649,021 | A | 8/1953 | Angenieux |
| 3,045,549 | A | 7/1962 | Baker |

(Continued)

FOREIGN PATENT DOCUMENTS

| | | |
|---|---|---|
| CN | 103676088 A | 3/2014 |
| CN | 105572848 A | 5/2016 |

(Continued)

*Primary Examiner* — Jie Lei

(74) *Attorney, Agent, or Firm* — McClure, Qualey & Rodack, LLP

(57) ABSTRACT

An imaging lens assembly includes six lens elements, which are, in order from an object side to an image side, a first lens element, a second lens element, a third lens element, a fourth lens element, a fifth lens element and a sixth lens element. The sixth lens element has negative refractive power. At least one surface of an object-side surface and an image-side surface of at least one lens element of the six lens elements is aspheric.

29 Claims, 32 Drawing Sheets

(56) References Cited

U.S. PATENT DOCUMENTS

| | | |
|---|---|---|
| 3,942,876 A | 3/1976 | Betensky |
| 4,076,390 A | 2/1978 | Fleischman |
| 4,326,779 A | 4/1982 | Rybicki et al. |
| 5,331,465 A | 7/1994 | Miyano |
| 5,666,233 A | 11/1997 | Ogata |
| 5,760,970 A | 6/1998 | Kawamura |
| 5,777,800 A | 7/1998 | Yamaguchi et al. |
| 9,435,983 B2 | 9/2016 | Liao et al. |
| 9,726,857 B2 | 8/2017 | Chen |
| 10,782,505 B2 * | 9/2020 | Huang ............... G02B 13/0045 |
| 2012/0081799 A1 | 4/2012 | Tseng et al. |
| 2012/0212842 A1 | 8/2012 | Hosoi et al. |
| 2014/0043695 A1 * | 2/2014 | Hsu .................. G02B 9/62 359/713 |
| 2014/0063323 A1 | 3/2014 | Yamazaki et al. |
| 2015/0085378 A1 | 3/2015 | Jung et al. |
| 2015/0146086 A1 | 5/2015 | Liao |
| 2015/0168692 A1 | 6/2015 | Kitahara |
| 2015/0316750 A1 | 11/2015 | Dai et al. |
| 2016/0077332 A1 | 3/2016 | Baba et al. |
| 2016/0124192 A1 * | 5/2016 | Koreeda ............ G02B 27/0025 359/713 |
| 2016/0187620 A1 | 6/2016 | Huang |
| 2016/0195716 A1 | 7/2016 | Nakanuma |
| 2016/0327773 A1 | 11/2016 | Choi et al. |
| 2017/0023769 A1 * | 1/2017 | Jo .................... G02B 13/0045 |
| 2017/0045717 A1 | 2/2017 | Park |
| 2017/0045718 A1 | 2/2017 | Park |
| 2017/0146776 A1 | 5/2017 | Kang et al. |
| 2017/0199360 A1 | 7/2017 | Chang |
| 2017/0212337 A1 | 7/2017 | Lee et al. |
| 2017/0299846 A1 | 10/2017 | Lin et al. |
| 2018/0188505 A1 | 7/2018 | Chang et al. |
| 2018/0188506 A1 | 7/2018 | Chang et al. |
| 2019/0004286 A1 | 1/2019 | Heu et al. |
| 2020/0041761 A1 | 2/2020 | Seo et al. |

FOREIGN PATENT DOCUMENTS

| | | |
|---|---|---|
| JP | 59176716 A | 10/1984 |
| JP | 60166912 A | 8/1985 |
| JP | 02272513 A | 11/1990 |
| JP | 03118509 A | 5/1991 |
| JP | H05-173069 A | 7/1993 |
| JP | H11-119098 A | 4/1994 |
| JP | H07-181382 A | 7/1995 |
| JP | 08166539 A | 6/1996 |
| JP | 08234098 A | 9/1996 |
| JP | H08-286110 A | 11/1996 |
| JP | H09-90220 A | 4/1997 |
| JP | 2004070093 A | 3/2004 |
| TW | I541539 B | 7/2016 |
| TW | I574040 B | 3/2017 |

* cited by examiner

IMAGING LENS ASSEMBLY, IMAGING APPARATUS AND ELECTRONIC DEVICE

RELATED APPLICATIONS

The present application is a continuation of the U.S. application Ser. No. 15/844,895, filed on Dec. 18, 2017, issued Sep. 22, 2020 as U.S. Pat. No. 10,782,505, which claims priority to Taiwan Application Serial Number 106136761, filed Oct. 25, 2017, which are herein incorporated by references.

BACKGROUND

Technical Field

The present disclosure relates to an imaging lens assembly and an imaging apparatus. More particularly, the present disclosure relates to an imaging lens assembly and an imaging apparatus with a compact size applicable to electronic devices.

Description of Related Art

With the wider application of photographing modules, installing photographing modules in various smart electronic devices, portables, mobile devices, recognition devices, entertainment systems, sporting devices and smart home assisting systems is becoming a major trend in developments for the future technology, especially portables which are in high public demands. In order to obtain more extensive experiences in utilizations, smart devices with one, two or more than three lens assemblies are becoming the market mainstream, and various photographing modules with different features are developed in response to different demands.

However, conventional telephoto lens systems utilize mostly spherical glass lens elements, which are unfavorable for reducing the size of lens assemblies, and result in larger and thicker imaging apparatuses. Thus, it becomes difficult for miniaturization which cannot satisfy the size requirement of mobile electronic devices. Furthermore, conventional compact telephoto lens systems are mostly limited by size, and the aperture size in these optical systems is also limited, which causes insufficient image brightness. Currently, many compact imaging devices with high image quality available on the market have view angles not suitable for capturing detailed images from afar. Thus, conventional optical systems cannot satisfy the developing trend of current technology.

SUMMARY

According to one aspect of the present disclosure, an imaging lens assembly includes six lens elements, the six lens elements being, in order from an object side to an image side, a first lens element, a second lens element, a third lens element, a fourth lens element, a fifth lens element and a sixth lens element. The sixth lens element has negative refractive power and at least one of the six lens elements has at least one of an object-side surface and an image-side surface being aspheric. The imaging lens assembly further includes an aperture stop. When an axial distance between an object-side surface of the first lens element and an image surface is TL, a focal length of the imaging lens assembly is f, an entrance pupil diameter of the imaging lens assembly is EPD, a maximum image height of the imaging lens assembly is ImgH, an Abbe number of the second lens element is V2, an Abbe number of the fifth lens element is V5, an axial distance between the aperture stop and an image-side surface of the sixth lens element is SD, and an axial distance between the object-side surface of the first lens element and the image-side surface of the sixth lens element is TD, the following conditions are satisfied:

$0.50 < TL/f < 1.15;$ $0.80 < f/EPD < 2.60;$ $1.85 < f/ImgH < 10.0;$ $-70.0 < V5 - V2 < -10.0;$ and $0.55 < SD/TD < 1.10.$ According to another aspect of the present disclosure, an imaging apparatus includes the imaging lens assembly of the aforementioned aspect and an image sensor, wherein the image sensor is disposed on the image surface of the imaging lens assembly.

According to another aspect of the present disclosure, an electronic device includes the imaging apparatus of the aforementioned aspect.

According to one aspect of the present disclosure, an imaging lens assembly includes six lens elements, the six lens elements being, in order from an object side to an image side, a first lens element, a second lens element, a third lens element, a fourth lens element, a fifth lens element and a sixth lens element. The second lens element has positive refractive power, the third lens element has negative refractive power, and the sixth lens element has negative refractive power; at least one of an object-side surface and an image-side surface of at least one of the six lens elements includes at least one inflection point. When an axial distance between an object-side surface of the first lens element and an image surface is TL, a focal length of the imaging lens assembly is f, an entrance pupil diameter of the imaging lens assembly is EPD, a maximum image height of the imaging lens assembly is ImgH, a central thickness of the fourth lens element is CT4, and a central thickness of the fifth lens element is CT5, the following conditions are satisfied:

$0.30 < TL/f < 1.70;$ $0.80 < f/EPD \leq 2.40;$ $2.0 < f/ImgH < 10.0;$ and $0.10 < CT4/CT5 < 0.90.$ According to one aspect of the present disclosure, an imaging lens assembly comprising six lens elements, the six lens elements being, in order from an object side to an image side: a first lens element, a second lens element, a third lens element, a fourth lens element, a fifth lens element, and a sixth lens element. The first lens element has an object-side surface being convex in a paraxial region thereof, the second lens element has positive refractive power, the third lens element has negative refractive power, and the fifth lens element has positive refractive power. At least one of an object-side surface and an image-side surface of at least one of the six lens elements includes at least one inflection point. When an axial distance between the object-side surface of the first lens element and an image surface is TL, a focal length of the imaging lens assembly is f, a maximum image height of the imaging lens assembly is ImgH, an Abbe number of the fifth lens element is V5, an Abbe number of the sixth lens element is V6, and the following conditions are satisfied:

$$0.30 < TL/f < 4.0;$$

$$2.0 < f/ImgH < 10.0; \text{ and}$$

$$-55.0 < V5 - V6 < -17.0.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
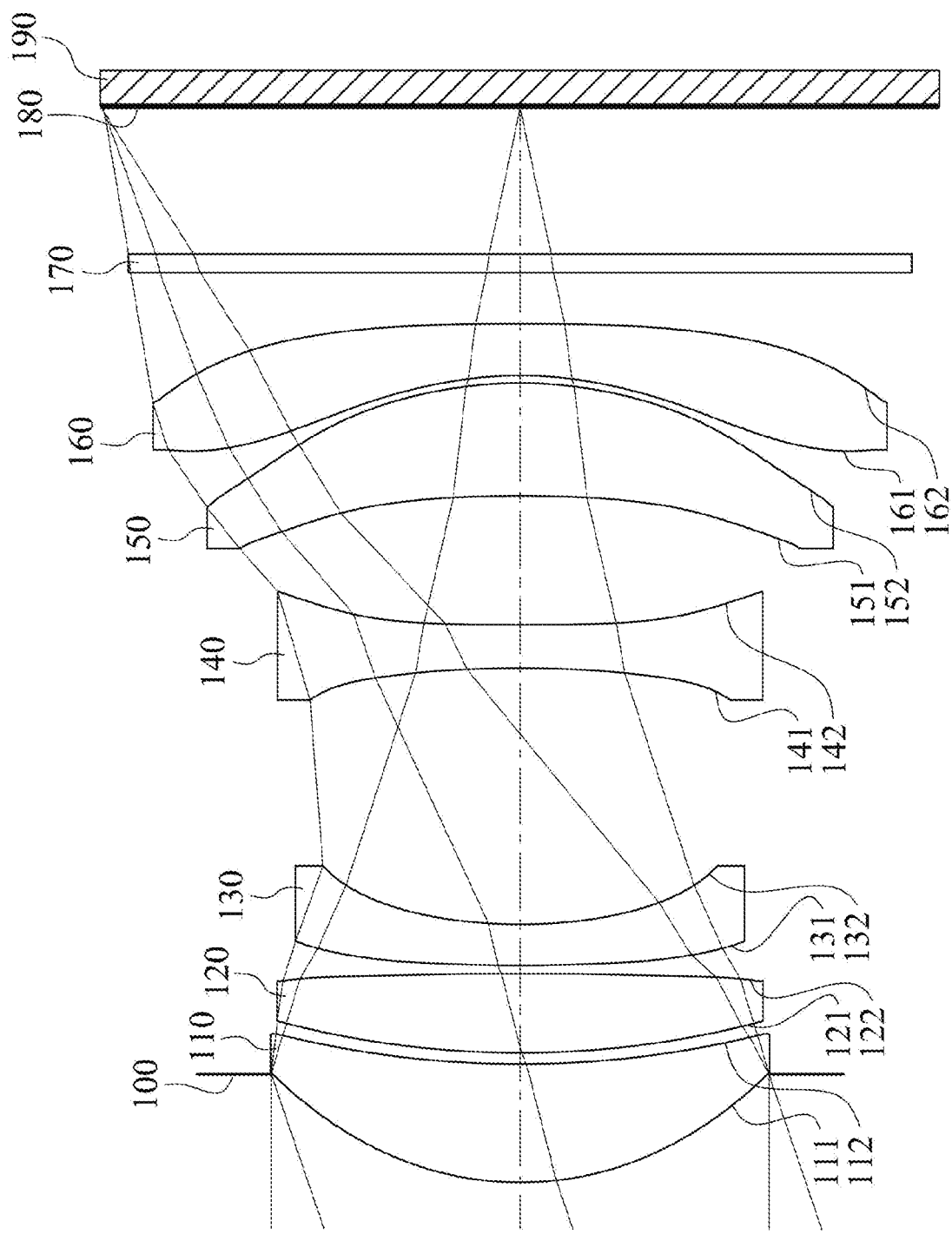
FIG. 1 is a schematic view of an imaging apparatus according to the 1st embodiment of the present disclosure.

An imaging lens assembly includes six lens elements, which are, in order from an object side to an image side, a first lens element, a second lens element, a third lens element, a fourth lens element, a fifth lens element and a sixth lens element.

At least one of an object-side surface and an image-side surface of at least one of the six lens elements can include at least one inflection point. Therefore, it is favorable for avoiding total reflection due to overly large surface angles of the lens elements, which generates unwanted light spots on the image.

The first lens element can have positive refractive power, so that the light converging ability of the imaging lens assembly can be provided for reducing the total track length thereof so as to obtain the compactness. The first lens element can have an object-side surface being convex in a paraxial region thereof, so as to avoid light projecting through the object-side surface with an overly large incident angle as well as preventing stray light. The first lens element with the object-side surface being convex in the paraxial region thereof can have an image-side surface being concave in a paraxial region thereof, so as to allow light rays converging between tangential direction and sagittal direction for correcting astigmatism of the imaging lens assembly.

The second lens element can have positive refractive power. Therefore, it is favorable for light converging on the object side of the imaging lens assembly and avoiding excessive aberrations generated due to overly large refractive power of any single lens element of the imaging lens assembly. The second lens element can have an object-side surface being convex in a paraxial region thereof and an image-side surface being convex in a paraxial region thereof. Thus, it is favorable for enhancing the converging ability of the second lens element while balancing curvatures of the object-side surface and the image-side surface thereof, and excessive spherical aberration can be avoided.

The third lens element can have negative refractive power. Therefore, it is favorable for correcting chromatic aberration of the imaging lens assembly and avoiding image overlaps due to imaged position variation of captured images in different colors. The third lens element can have an object-side surface being convex in a paraxial region thereof and an image-side surface being concave in a paraxial region thereof. Therefore, it is favorable for balancing aberrations generated by the second lens element and improving image quality.

The fourth lens element can have negative refractive power. Therefore, it is favorable for balancing negative refractive power with the third lens element, avoiding overly large refractive power from any single lens element of the imaging lens assembly while improving symmetry of lens configuration as well as image quality. The fourth lens element can have an image-side surface being concave in a paraxial region thereof. Thus, it is favorable for controlling the outgoing angle of refracted ray from the fourth lens element and limiting the range of the effective diameter on the image side of the imaging lens assembly to obtain compactness thereof.

The fifth lens element can have positive refractive power. Therefore, it is favorable for providing sufficient converging power on the image side of the imaging lens assembly and maintaining a desirable size of the imaging lens assembly. The fifth lens element can have an image-side surface being convex in a paraxial region thereof so as to improve symmetry of the lens configuration of the imaging lens assembly for reducing aberrations. The image-side surface of the fifth lens element can include at least one convex shape in an off-axis region thereof so as to reduce the outgoing angle of refracted ray from the image-side surface of the fifth lens element for correcting distortion and field curvature.

The sixth lens element can have negative refractive power, so that it is favorable for balancing the refractive power distribution on the image side of the imaging lens assembly, correcting aberrations of the fifth lens element, and avoiding the back focal length of the imaging lens assembly being excessively long along with the imaging lens assembly being overly large. The sixth lens element can have an object-side surface being concave in a paraxial region thereof, so that it is favorable for controlling the back focal length of the imaging lens assembly effectively and being applicable in the compact electronic device. The object-side surface of the sixth lens element can include at least one convex surface in an off-axis region thereof along with the object-side surface being concave in the paraxial region. Therefore, it is favorable for correcting off-axis aberrations and enhancing Petzval Field with effective size reduction and high image quality. An image-side surface of the sixth lens element can include at least one convex shape in an off-axis region thereof so as to reduce the outgoing angle of refraction on the image-side surface of the sixth lens element for correcting distortion and field curvature. The sixth lens element can have the image-side surface being concave in a paraxial region thereof while including at least one convex shape in the off-axis region thereof so as to control the back focal length of the imaging lens assembly for maintaining compactness, correcting off-axis aberrations, and improving image quality. At least one of the object-side surface and the image-side surface of the sixth lens element can include at least one inflection point, so that it is favorable for reducing distortion and avoiding dark corners on the image while correcting off-axis aberrations of the imaging lens assembly.

At least one of the six lens elements of the imaging lens assembly can have at least one of the object-side surface and image-side surface being aspheric, so that it is favorable for correcting aberrations, limiting the total track length of the imaging lens assembly, and obtaining compactness. Preferably, each of the six lens elements of the imaging lens assembly has at least one of the object-side surface and image-side surface being aspheric.

There is an air gap between every adjacent lens elements of the six lens elements, so that it is favorable for reducing assembling complexity of the imaging lens assembly and improving manufacturing yield rates.

The six lens elements of the imaging lens assembly can be made of plastic materials, so that it is favorable for reducing the weight of the imaging lens assembly while providing higher degree of freedom in lens designs for size reduction of the imaging lens assembly.

When an axial distance between the object-side surface of the first lens element and an image surface is TL, and a focal length of the imaging lens assembly is f, the following condition is satisfied: $0.30<TL/f<4.0$. Therefore, it is favorable for balancing the total track length and field of view of the imaging lens assembly while obtaining improved image quality and higher specifications. Preferably, the following condition can be satisfied: $0.30<TL/f<1.7$. More preferably, the following condition can be satisfied: $0.50<TL/f<1.15$. Even more preferably, the following condition can be satisfied: $0.50<TL/f<1.0$.

When the focal length of the imaging lens assembly is f, and an entrance pupil diameter of the imaging lens assembly is EPD, the following condition is satisfied: $0.80<f/EPD<2.60$. Therefore, it is favorable for increasing received light rays of the imaging lens assembly so as to generate images with higher clarity. Preferably, the following condition can be satisfied: $0.80<f/EPD\leq2.40$. More preferably, the following condition can be satisfied: $0.80<f/EPD<2.25$. Even more preferably, the following condition can be satisfied: $0.80<f/EPD<2.0$.

When the focal length of the imaging lens assembly is f, and a maximum image height of the imaging lens assembly is ImgH, the following condition is satisfied: $1.85<f/ImgH<10.0$. Therefore, it is favorable for effectively controlling the imaging range of the imaging lens assembly so as to satisfy the needs for a wider range of applications. Preferably, the following condition can be satisfied: $2.0<f/ImgH<10.0$. More preferably, the following condition can be satisfied: $2.25<f/ImgH<6.5$.

When an Abbe number of the second lens element is V2, and an Abbe number of the fifth lens element is V5, the following condition is satisfied: $-70.0<V5-V2<-10.0$. Therefore, it is favorable for balancing chromatic aberrations between the second lens element and the fifth lens element so as to provide sufficient image magnification as well as image brightness. Preferably, the following condition can be satisfied: $-50.0<V5-V2<-20.0$. More preferably, the following condition can be satisfied: $-45.0<V5-V2<-25.0$.

The imaging lens assembly can further include an aperture stop. When an axial distance between the aperture stop and the image-side surface of the sixth lens element is SD, and an axial distance between the object-side surface of the first lens element and the image-side surface of the sixth lens element is TD, the following condition is satisfied: $0.55<SD/TD<1.10$. Therefore, it is favorable for positioning the aperture stop, balancing field of view and the total track length of the imaging lens assembly so as to obtain compactness of the electronic device while enhancing its practical usefulness.

When a central thickness of the fourth lens element is CT4, and a central thickness of the fifth lens element is CT5, the following condition is satisfied: 0.10<CT4/CT5<0.90. Therefore, it is favorable for balancing the central thicknesses of the fourth lens element and the fifth lens element so as to avoid overly thin lens element being misshaped or overly thick lens element being unevenly formed. Preferably, the following condition can be satisfied: 0.10<CT4/CT5<0.65.

When the Abbe number of the fifth lens element is V5, and an Abbe number of the sixth lens element is V6, the following condition is satisfied: −55.0<V5−V6<−17.0. Therefore, the material configuration on the image side of the imaging lens assembly can be balanced, so as to enhance the light convergence thereof as well as obtaining the telephoto characteristic.

When a curvature radius of the object-side surface of the first lens element is R1, and the focal length of the imaging lens assembly is f, the following condition is satisfied: 0<R1/f<0.35. Therefore, it is favorable for reducing an incident angle of light rays on the object-side surface of the first lens element, and avoiding excessive aberrations or possible total reflection.

When a focal length of the second lens element is f2, and a focal length of the fifth lens element is f5, the following condition is satisfied: 0<f2/f5<5.50. Therefore, it is favorable for balancing the distribution of refractive power so as to reduce overall manufacturing sensitivity. Preferably, the following condition can be satisfied: 0.50<f2/f5<5.50.

When a maximum refractive index of the six lens elements of the imaging lens assembly is Nmax, the following condition is satisfied: 1.640<Nmax<1.750. Therefore, it is favorable for balancing the configuration of lens materials of the imaging lens assembly so as to improve image quality while reducing the total track length of the imaging lens assembly for obtaining compactness. Preferably, the following condition can be satisfied: 1.650≤Nmax<1.730.

When the focal length of the imaging lens assembly is f, the focal length of the fifth lens element is f5, and a focal length of the sixth lens element is f6, the following condition is satisfied: 1.50<|f/f5|+|f/f6|<4.0. Therefore, it is favorable for enhancing the ability to control light path on the image side of the imaging lens assembly so as to reduce the total track length and correct aberrations.

There are at least two of the six lens elements of the imaging lens assembly having an Abbe number smaller than 25. Therefore, it is favorable for providing stronger refractive power to achieve sufficient refraction within smaller space by utilizing the characteristic of larger density difference from air in high dispersion lens materials (High Dispersion implies lower Abbe number), in order to reduce the size of the imaging apparatus. Preferably, there are at least two of the six lens elements of the imaging lens assembly having an Abbe number smaller than 22. More preferably, there are at least two of the six lens elements of the imaging lens assembly having an Abbe number smaller than 20.

When the entrance pupil diameter of the imaging lens assembly is EPD, and the axial distance between the object-side surface of the first lens element and the image surface is TL, the following condition is satisfied: 0.40<EPD/TL<1.0. Therefore, it is favorable for increasing incoming light of the imaging lens assembly while maintaining compactness. Preferably, the following condition can be satisfied: 0.45<EPD/TL<0.80.

When a vertical distance between a maximum effective diameter position of the object-side surface of the first lens element and an optical axis is Y11, and a vertical distance between a maximum effective diameter position of the image-side surface of the sixth lens element and the optical axis is Y62, the following condition is satisfied: 0.65<Y11/Y62<1.20. Therefore, it is favorable for controlling the size of openings on the object side and the image side of the imaging apparatus so as to improve relative illumination while avoiding dark corners on the image.

When the focal length of the imaging lens assembly is f, and a composite focal length of the first lens element and the second lens element is f12, the following condition is satisfied: 1.50<f/f12<3.0. Therefore, it is favorable for providing sufficient converging power on the object side of the imaging lens assembly and satisfying the specification of a telephoto system.

When the axial distance between the object-side surface of the first lens element and the image surface is TL, and the maximum image height of the imaging lens assembly is ImgH, the following condition is satisfied: 1.50<TL/ImgH<3.50. Therefore, it is favorable for miniaturizing the imaging lens assembly while providing sufficient light receiving area so as to avoid dark corners on the image.

When the entrance pupil diameter of the imaging lens assembly is EPD, and the maximum image height of the imaging lens assembly is ImgH, the following condition is satisfied: 1.0<EPD/ImgH<2.0. Therefore, it is favorable for providing sufficient range of incoming light (directly related to the entrance pupil diameter) and light receiving area (directly related to the maximum image height) so as to enhance image brightness and image quality.

When the Abbe number of the fifth lens element is V5, the following condition is satisfied: 10.0<V5<38.0. Therefore, it is favorable for controlling the material property of the fifth lens element, increasing the density difference between the fifth lens element and air, improving refractive power of the fifth lens element, and achieving sufficient refraction within smaller space, so as to reduce the total track length of the imaging lens assembly for a wider range of applications.

When an Abbe number of the third lens element is V3, the following condition is satisfied: 10.0<V3<22.0. Therefore, it is favorable for correcting chromatic aberration of the imaging lens assembly while increasing the density difference between the third lens element and air for improving the aberration correction ability of the third lens element.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following condition is satisfied: 0≤(T12+T23+T56)/(T34+T45)<1.0. Therefore, it is favorable for balancing the distances between adjacent lens elements and avoiding assembling interference due to overly small distances between adjacent lens elements, so as to improve assembling yield rates. Preferably, the following condition can be satisfied: 0≤(T12+T23+T56)/(T34+T45)<0.50.

When the axial distance between the third lens element and the fourth lens element is T34, the axial distance between the fourth lens element and the fifth lens element is T45, a central thickness of the third lens element is CT3, and the central thickness of the fourth lens element is CT4, the following condition is satisfied: $2.70 < (T34+T45)/(CT3+CT4) < 15.0$. Therefore, it is favorable for balancing between lens thicknesses and distances between adjacent lens elements so as to avoid uneven molded lens elements due to overly large thickness while effectively reducing the manufacturing sensitivity of the imaging lens assembly.

The minimum of maximum effective diameters of object-side surfaces and image-side surfaces of the six lens elements is a maximum effective diameter of the image-side surface of the third lens element. Therefore, it is favorable for controlling the dimension of the imaging lens assembly and avoiding overly large outer diameter of a lens barrel member which makes it difficult to reduce the size of the imaging apparatus.

Each of the aforementioned features of the imaging lens assembly can be utilized in numerous combinations, so as to achieve the corresponding functionality.

According to the present disclosure, the lens elements of the imaging lens assembly can be made of either glass or plastic materials. When the lens elements are made of glass materials, the refractive power distribution of the imaging lens assembly may be more flexible to design. The glass lens element can either be made by grinding or molding. When the lens elements are made of plastic materials, the manufacturing cost can be effectively reduced. Furthermore, surfaces of each lens element can be arranged to be aspheric, which allows for more controllable variables for eliminating the aberration thereof, the required number of the lens elements can be decreased, and the total track length of the imaging lens assembly can be effectively reduced. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the imaging lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the imaging lens assembly of the present disclosure, the refractive power or the focal length of a lens element being positive or negative may refer to the refractive power or the focal length in a paraxial region of the lens element.

According to the imaging lens assembly of the present disclosure, the imaging lens assembly can include at least one stop, such as an aperture stop, a glare stop or a field stop. Said glare stop or said field stop is for eliminating the stray light and thereby improving the image resolution thereof.

According to the imaging lens assembly of the present disclosure, the image surface, depending on the corresponding image sensor, can be a planar surface or a curved surface with any curvature, particularly a curved surface being concave toward the object side. According to the imaging lens assembly of the present disclosure, at least one image correcting element (such as a field flattener) can be selectively disposed between a lens element closest to the image surface and the image surface so as to correct image aberrations (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the imaging lens assembly of the present disclosure, an aperture stop can be configured as a front stop or a middle stop. A front stop disposed between an object and the first lens element can provide a longer distance between an exit pupil of the imaging lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the imaging lens assembly and thereby provides a wider field of view for the same.

According to the present disclosure, an inflection point is a changing point where the curvature center of a lens surface changing from the object side to the image side (or from image side to the object side) along the range from the paraxial region to the off-axis region.

According to the imaging lens assembly of the present disclosure, the imaging lens assembly can be applied to 3D (three-dimensional) image capturing applications, and in products such as digital cameras, mobile devices, digital tablets, smart TVs, surveillance systems, motion sensing input devices, driving recording systems, rearview camera systems, wearable devices, and unmanned aerial vehicles.

According to the present disclosure, an imaging apparatus is provided. The imaging apparatus includes the aforementioned imaging lens assembly and an image sensor, wherein the image sensor is disposed on the image side of the aforementioned imaging lens assembly that is, the image sensor can be disposed on or near the image surface of the aforementioned imaging lens assembly. When specific conditions are satisfied, it is favorable for the imaging lens assembly to satisfy the requirements of lens miniaturization, small field of view, and a large aperture, so as to capture detailed images from afar. Preferably, the imaging apparatus can further include a barrel member, a holder member or a combination thereof. Furthermore, the imaging apparatus of the present disclosure can also include a reflective element such as a prism or a mirror, so as to provide advantages of a light path directional change for further reducing the total track length of the imaging apparatus.

According to the present disclosure, an electronic device is provided, which includes the aforementioned imaging apparatus. Preferably, the electronic device can further include but not limited to a control unit, a display, a storage unit, a random access memory unit (RAM) or a combination thereof. Furthermore, the electronic device of the present disclosure can also provide a photographing apparatus, wherein the photographing apparatus includes a photographing lens assembly with a maximum field of view larger than the field of view of the imaging lens assembly of the present disclosure, and both lens assemblies (the photographing lens assembly and the imaging lens assembly of the present disclosure) can be utilized to by the electronic device to achieve a zoom function.

According to the above description of the present disclosure, the following 1st-16th specific embodiments are provided for further explanation.

1st Embodiment

FIG. 1 is a schematic view of an imaging apparatus according to the 1st embodiment of the present disclosure.

Figure 2:
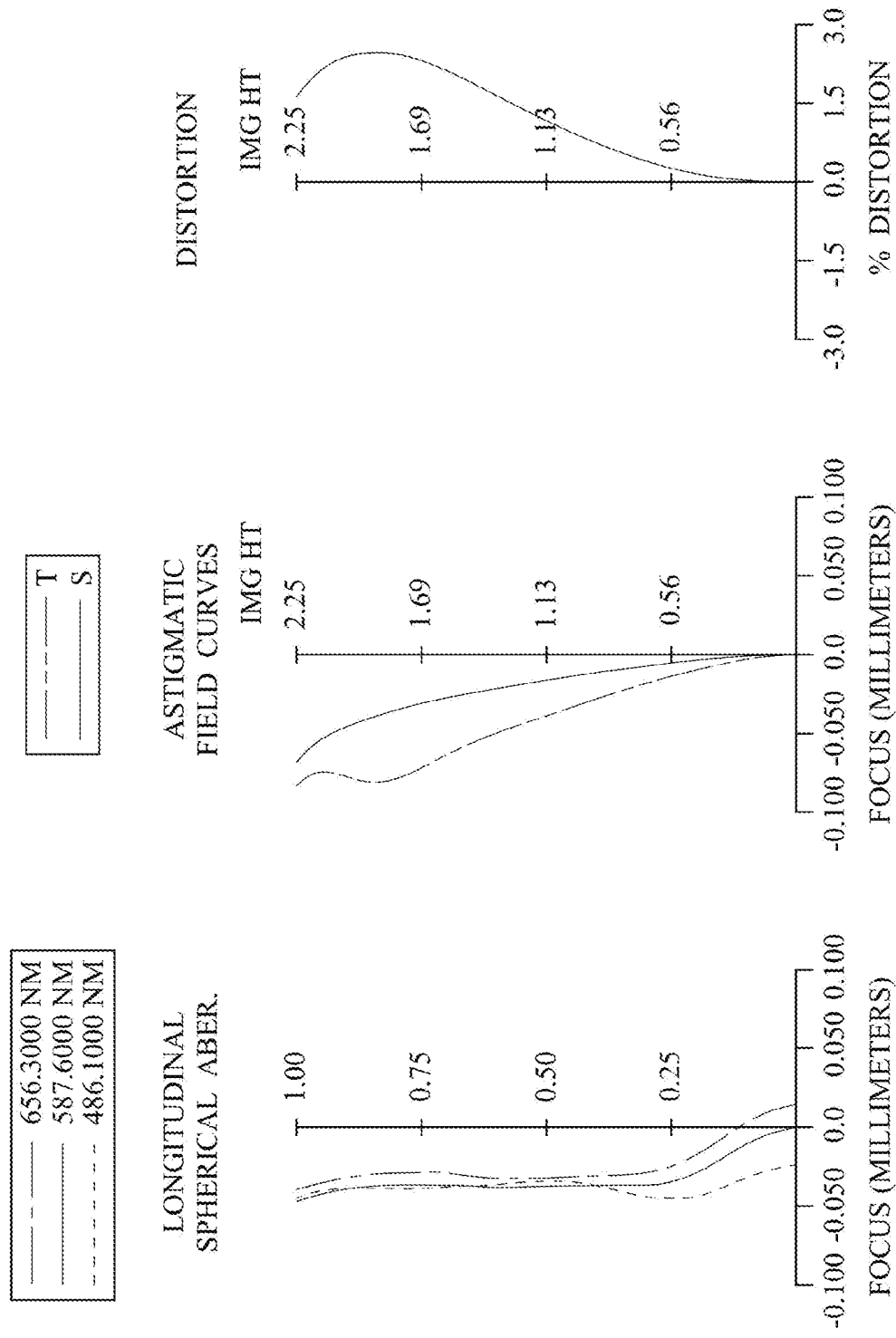
FIG. 2 shows spherical aberration curves, astigmatic field curves and a distortion curve of the imaging apparatus according to the 1st embodiment.

FIG. 2 shows spherical aberration curves, astigmatic field curves and a distortion curve of the imaging apparatus according to the 1st embodiment. In FIG. 1, the imaging apparatus includes an imaging lens assembly (its reference numeral is omitted) and an image sensor 190. The imaging lens assembly includes, in order from an object side to an image side, an aperture stop 100, a first lens element 110, a second lens element 120, a third lens element 130, a fourth lens element 140, a fifth lens element 150, a sixth lens element 160, a filter 170 and an image surface 180, wherein the image sensor 190 is disposed on the image surface 180 of the imaging lens assembly. The imaging lens assembly includes six lens elements (110, 120, 130, 140, 150, 160) with air gaps between every adjacent lens elements, and without additional one or more lens elements inserted between the first lens element 110 and the sixth lens element 160.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric. Furthermore, the image-side surface 152 of the fifth lens element 150 includes at least one convex shape in an off-axis region thereof.

The sixth lens element 160 with negative refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric. Furthermore, the object-side surface 161 of the sixth lens element 160 includes at least one convex shape in an off-axis region thereof and the image-side surface 162 of the sixth lens element 160 includes at least one convex shape in an off-axis region thereof.

The filter 170 is made of a glass material and located between the sixth lens element 160 and the image surface 180, and will not affect the focal length of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of a maximum field of view of the imaging lens assembly is HFOV, these parameters have the following values: f=6.54 mm; Fno=2.44; and HFOV=18.8 degrees.

In the imaging lens assembly according to the 1st embodiment, when an Abbe number of the second lens element 120 is V2, an Abbe number of the third lens element 130 is V3, an Abbe number of the fifth lens element 150 is V5, and an Abbe number of the sixth lens element 160 is V6, the following conditions are satisfied: V3=19.5; V5=23.2; V5−V2=−32.8, and V5−V6=−32.8.

In the imaging lens assembly according to the 1st embodiment, there are two of the six lens elements of the imaging lens assembly having an Abbe number smaller than 25, wherein the two lens elements are the third lens element 130 and the fifth lens element 150.

In the imaging lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a maximum refractive index of the six lens elements of the imaging lens assembly is Nmax (which is the maximum of N1, N2, N3, N4, N5, and N6; in the first embodiment, Nmax=N3), the following condition is satisfied: Nmax=1.669.

In the imaging lens assembly according to the 1st embodiment, when a central thickness of the fourth lens element 140 is CT4, and a central thickness of the fifth lens element 150 is CT5, the following condition is satisfied: CT4/CT5=0.38.

In the imaging lens assembly according to the 1st embodiment, when an axial distance between the third lens element 130 and the fourth lens element 140 is T34, an axial distance between the fourth lens element 140 and the fifth lens element 150 is T45, a central thickness of the third lens element 130 is CT3, and the central thickness of the fourth lens element 140 is CT4, the following condition is satisfied: (T34+T45)/(CT3+CT4)=4.57.

In the imaging lens assembly according to the 1st embodiment, when an axial distance between the first lens element 110 and the second lens element 120 is T12, an axial distance between the second lens element 120 and the third lens element 130 is T23, the axial distance between the third lens element 130 and the fourth lens element 140 is T34, the axial distance between the fourth lens element 140 and the fifth lens element 150 is T45, and an axial distance between the fifth lens element 150 and the sixth lens element 160 is T56, the following condition is satisfied: (T12+T23+T56)/(T34+T45)=0.07. In the imaging lens assembly according to the 1st embodiment, when a curvature radius of the object-side surface 111 of the first lens element 110 is R1, and the focal length of the imaging lens assembly is f, the following condition is satisfied: R1/f=0.26.

In the imaging lens assembly according to the 1st embodiment, when the focal length of the imaging lens assembly is f, a composite focal length of the first lens element 110 and the second lens element 120 is f12, a focal length of the second lens element 120 is f2, a focal length of the fifth lens element 150 is f5, and a focal length of the sixth lens element 160 is f6, the following conditions are satisfied: f/f12=2.04; f2/f5=2.21; and |f/f5|+|f/f6|=3.05.

In the imaging lens assembly according to the 1st embodiment, when the focal length of the imaging lens assembly is f, a maximum image height of the imaging lens assembly is ImgH, an axial distance between the object-side surface 111 of the first lens element 110 and the image surface 180 is TL, and an entrance pupil diameter of the imaging lens assembly is EPD, the following conditions are satisfied: f/ImgH=2.91; TL/ImgH=2.58; EPD/ImgH=1.19; EPD/TL=0.46; TL/f=0.89; and f/EPD=2.44.

In the imaging lens assembly according to the 1st embodiment, when an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.87.

Figure 26:
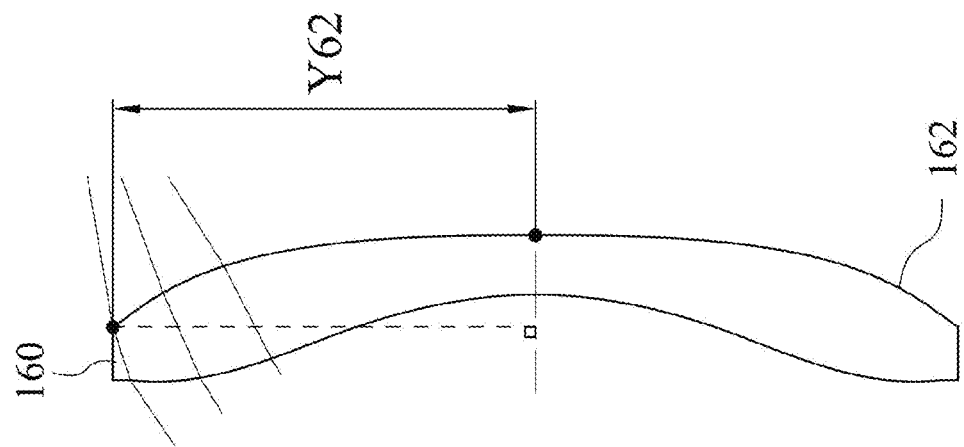
FIG. 26 is a schematic view of a parameter Yc62 according to the 1st embodiment of FIG. 1.
Figure 25:
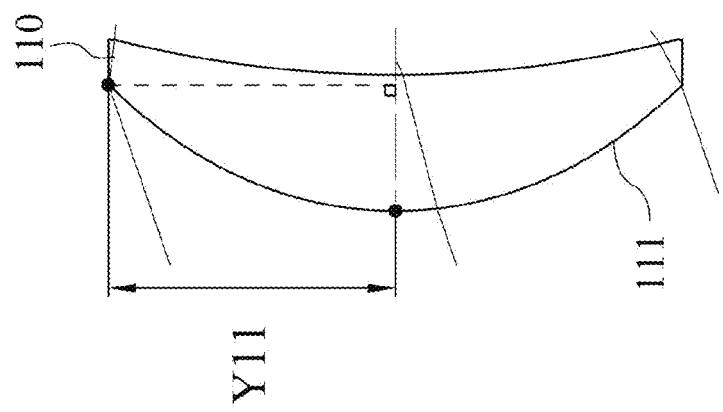
FIG. 25 is a schematic view of a parameter Yc11 according to the 1st embodiment of FIG. 1.

FIG. 25 is a schematic view of a parameter Y11 according to the 1st embodiment of FIG. 1, and FIG. 26 is a schematic view of a parameter Y62 according to the 1st embodiment of FIG. 1. In FIG. 25 and FIG. 26, when a vertical distance between a maximum effective diameter position on the object-side surface 111 of the first lens element 110 and an optical axis is Yc11, and a vertical distance between a maximum effective diameter position on the image-side surface 162 of the sixth lens element 160 and the optical axis is Y62, the following condition is satisfied: Y11/Y62=0.68.

In the imaging lens assembly according to the 1st embodiment, a minimum of maximum effective diameters of object-side surfaces and image-side surfaces of the six lens elements is a maximum effective diameter of the image-side surface 132 of the third lens element 130. In other words, among a maximum effective diameter of the object-side surface 111 of the first lens element 110, a maximum effective diameter of the image-side surface 112 of the first lens element 110, a maximum effective diameter of the object-side surface 121 of the second lens element 120, a maximum effective diameter of the image-side surface 122 of the second lens element 120, a maximum effective diameter of the object-side surface 131 of the third lens element 130, a maximum effective diameter of the image-side surface 132 of the third lens element 130, a maximum effective diameter of the object-side surface 141 of the fourth lens element 140, a maximum effective diameter of the image-side surface 142 of the fourth lens element 140, a maximum effective diameter of the object-side surface 151 of the fifth lens element 150, a maximum effective diameter of the image-side surface 152 of the fifth lens element 150, a maximum effective diameter of the object-side surface 160 of the sixth lens element 160, and a maximum effective diameter of the image-side surface 162 of the sixth lens element 160, the maximum effective diameter of the image-side surface 132 of the third lens element 130 is the smallest.

The detailed optical data of the 1st embodiment are shown in Table 1 and the aspheric surface data are shown in Table 2 below.

TABLE 1

1st Embodiment
f = 6.54 mm, Fno = 2.44, HFOV = 18.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.583 | | | | |
| 2 | Lens 1 | 1.722 | ASP | 0.639 | Plastic | 1.545 | 56.0 | 4.40 |
| 3 | | 5.317 | ASP | 0.061 | | | | |
| 4 | Lens 2 | 5.139 | ASP | 0.426 | Plastic | 1.545 | 56.0 | 10.13 |
| 5 | | 73.075 | ASP | 0.044 | | | | |
| 6 | Lens 3 | 5.920 | ASP | 0.221 | Plastic | 1.669 | 19.5 | −6.74 |
| 7 | | 2.521 | ASP | 1.384 | | | | |
| 8 | Lens 4 | −5.907 | ASP | 0.233 | Plastic | 1.544 | 56.0 | −8.76 |
| 9 | | 25.053 | ASP | 0.696 | | | | |
| 10 | Lens 5 | −6.926 | ASP | 0.608 | Plastic | 1.639 | 23.2 | 4.59 |
| 11 | | −2.130 | ASP | 0.040 | | | | |
| 12 | Lens 6 | −2.024 | ASP | 0.278 | Plastic | 1.544 | 56.0 | −4.02 |
| 13 | | −28.740 | ASP | 0.278 | | | | |
| 14 | Filter | Plano | | 0.102 | Glass | 1.517 | 64.2 | — |
| 15 | | Plano | | 0.795 | | | | |
| 16 | Image | Plano | | — | | | | |

Reference wavelength is 587.6 nm (d-line).

TABLE 2

Aspheric Coefficients

| Surface # | 2 | 3 | 4 | 5 | 6 | 7 |
|---|---|---|---|---|---|---|
| k= | −3.9167E−01 | −1.9502E−01 | 1.6170E−01 | 9.0000E+01 | −6.1720E+01 | −3.5820E+01 |
| A4= | 5.3172E−03 | −1.8213E−04 | 1.8138E−04 | −1.8491E−01 | −1.9086E−01 | 1.8736E−01 |
| A6= | 1.1249E−03 | −1.7289E−04 | 1.8089E−04 | 4.5454E−01 | 5.5173E−01 | −1.8729E−01 |
| A8= | −2.8985E−03 | −6.2382E−05 | 7.5868E−05 | −5.1764E−01 | −6.3093E−01 | 3.1704E−01 |
| A10= | 3.6127E−03 | 4.4628E−05 | −2.0755E−05 | 3.0953E−01 | 3.7753E−01 | −2.8617E−01 |
| A12= | −1.5810E−03 | | | −9.6918E−02 | −1.1486E−01 | 1.1410E−01 |
| A14= | | | | 1.2553E−02 | 1.4912E−02 | |

| Surface # | 8 | 9 | 10 | 11 | 12 | 13 |
|---|---|---|---|---|---|---|
| k= | 2.6611E+00 | 6.7330E+01 | 1.7632E+01 | −3.5558E−01 | −8.0952E+00 | −2.6636E+01 |
| A4= | 3.6353E−03 | 5.0613E−02 | −1.6355E−02 | 1.0582E−01 | 1.5898E−02 | −4.1711E−02 |
| A6= | −2.5404E−02 | 7.5832E−03 | −1.1992E−01 | −1.8018E−01 | −1.3032E−01 | 1.1326E−02 |
| A8= | 9.4959E−02 | 4.4749E−02 | −1.3240E−02 | 1.4083E−01 | 1.4449E−01 | 5.6157E−03 |
| A10= | −1.7075E−01 | −6.8084E−02 | 8.2745E−03 | −6.3791E−02 | −7.1270E−02 | −7.3422E−03 |
| A12= | 1.0850E−01 | 3.1946E−02 | 1.9445E−03 | 1.6901E−02 | 1.8794E−02 | 2.8534E−03 |
| A14= | −2.8234E−02 | −5.3369E−03 | −1.1370E−03 | −1.9389E−03 | −2.5836E−03 | −5.3028E−04 |
| A16= | | | | | 1.4597E−04 | 4.0414E−05 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Figure 27:
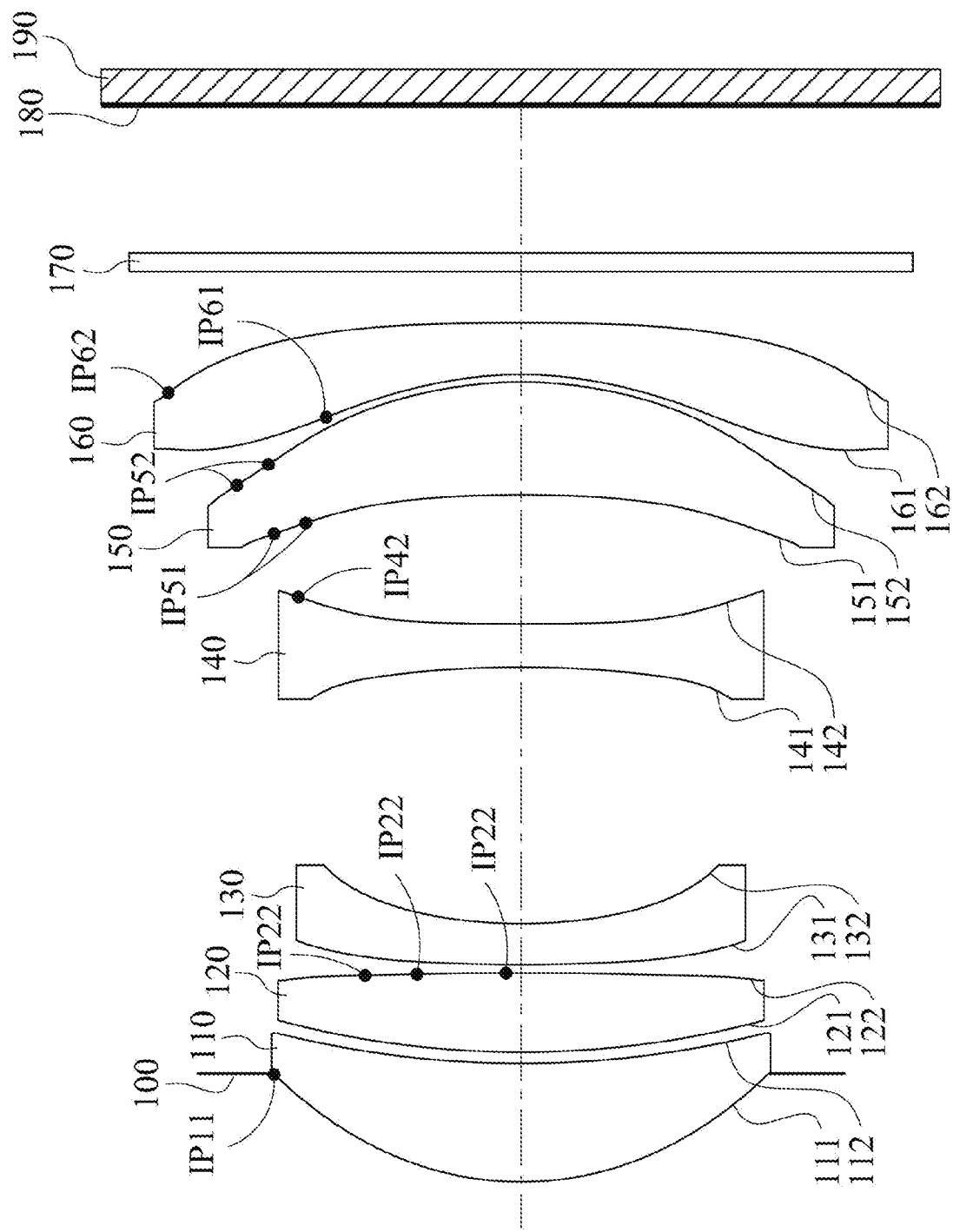
FIG. 27 is a schematic view of inflection points IP22, IP42, IP51, IP52, IP61, and IP62 according to the 1st embodiment of FIG. 1.

Additionally, FIG. 27 shows the inflection points IP11, IP22, IP42, IP51, IP52, IP61, and IP62 according to the 1st embodiment of FIG. 1. From FIG. 27, the object-side surface 111 of the first lens element 110 includes an inflection point IP11, the image-side surface 122 of the second lens element 120 includes inflection points IP22, the image-side surface 142 of the fourth lens element 140 includes an inflection point IP42, the object-side surface 151 of the fifth lens element 150 includes inflection points IP51, the image-side surface 152 of the fifth lens element 150 includes inflection points IP52, the object-side surface 161 of the sixth lens element 160 includes an inflection point IP61, and the image-side surface 162 of the sixth lens element 160 includes an inflection point IP62. Furthermore, the inflection points of object-side surfaces and image-side surfaces of the six lens elements are listed in table below. The inflections mentioned are those disposed between the optical axis and the maximum effective diameter position of each lens element.

Numbers of inflection points of 1st Embodiment

| | Lens 1 | Lens 2 | Lens 3 | Lens 4 | Lens 5 | Lens 6 |
|---|---|---|---|---|---|---|
| Object-side surface | 1 | 0 | 0 | 0 | 2 | 1 |
| Image-side surface | 0 | 3 | 0 | 1 | 2 | 1 |

2nd Embodiment

Figure 3:
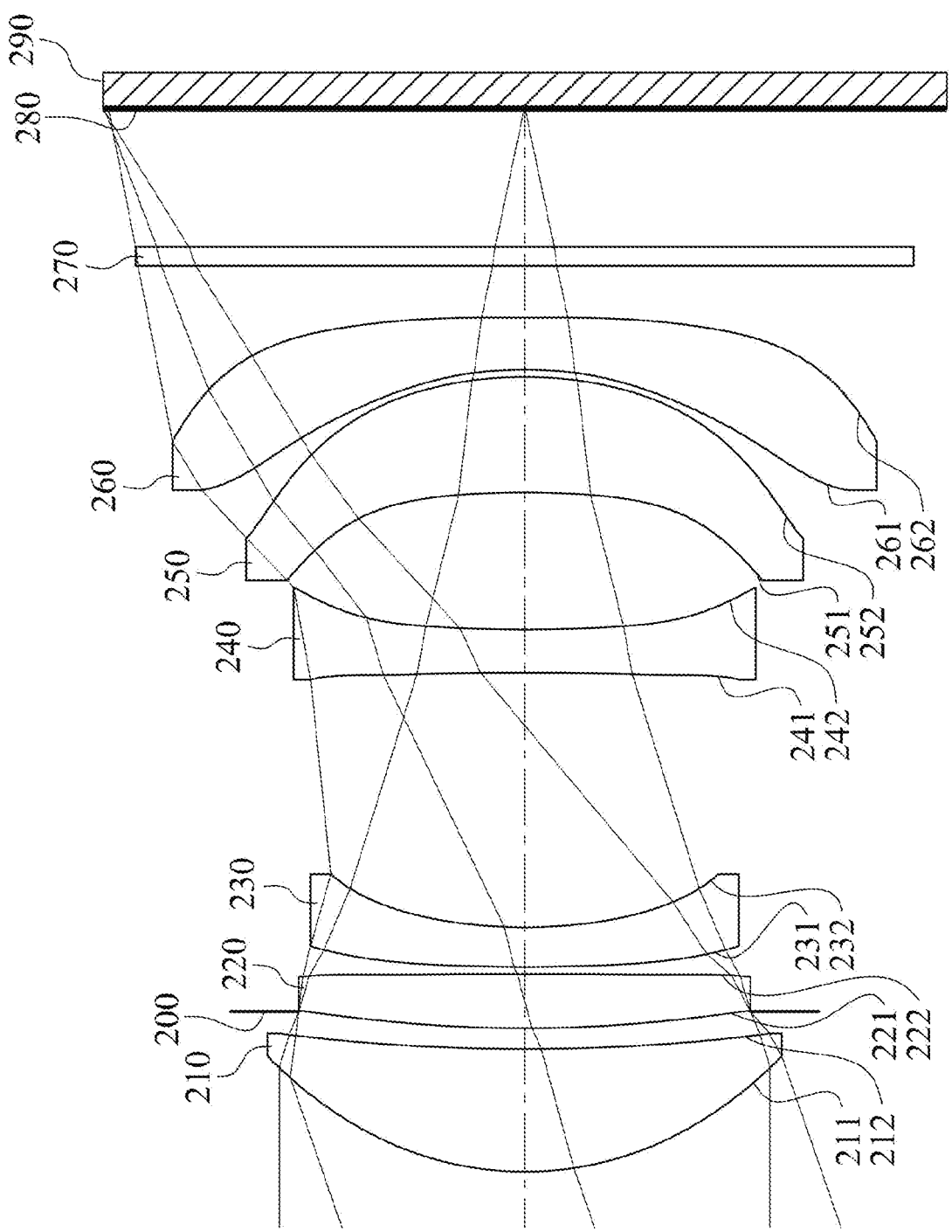
FIG. 3 is a schematic view of an imaging apparatus according to the 2nd embodiment of the present disclosure.

FIG. 3 is a schematic view of an imaging apparatus according to the 2nd embodiment of the present disclosure.

Figure 4:
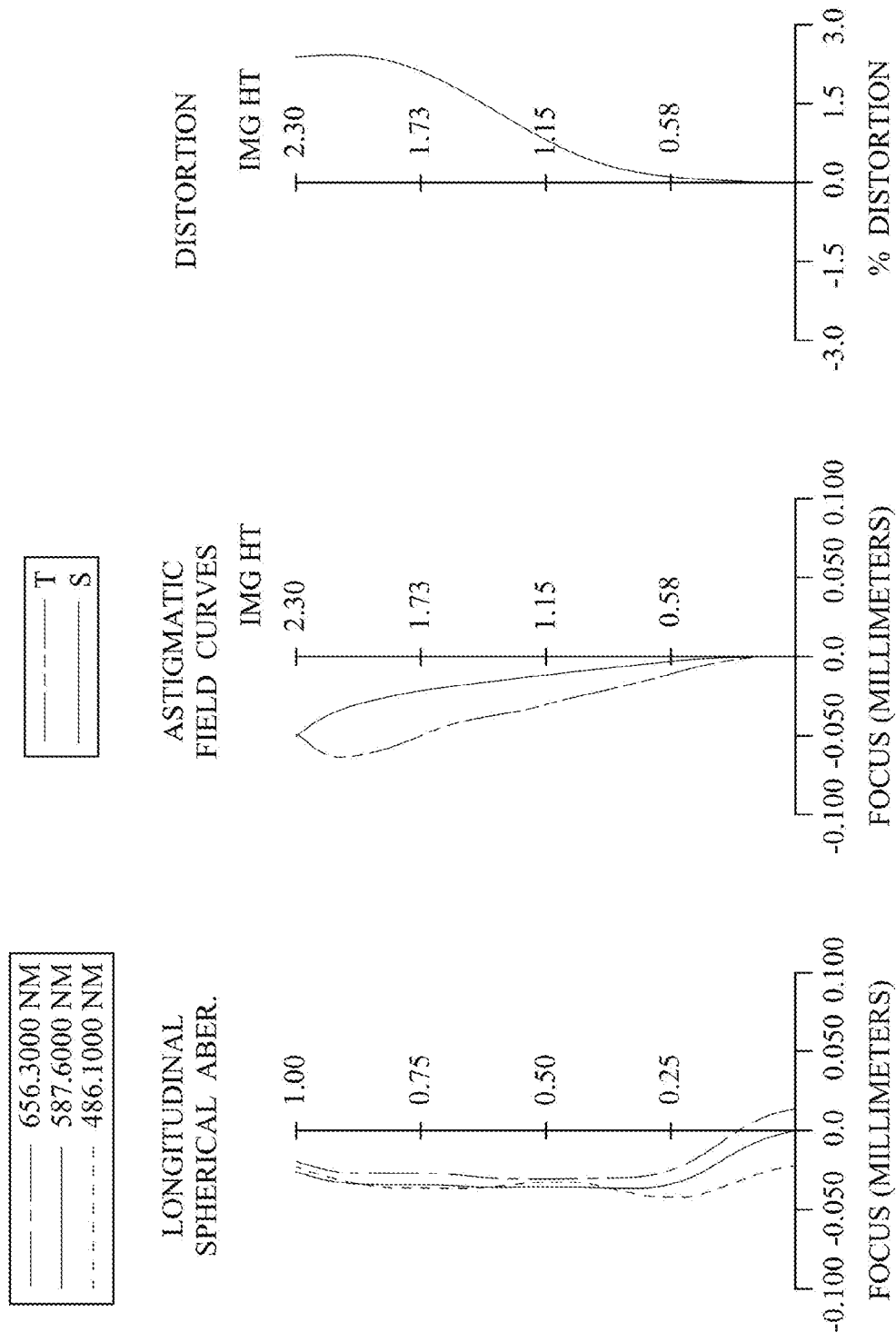
FIG. 4 shows spherical aberration curves, astigmatic field curves and a distortion curve of the imaging apparatus according to the 2nd embodiment.

FIG. 4 shows spherical aberration curves, astigmatic field curves and a distortion curve of the imaging apparatus according to the 2nd embodiment. In FIG. 3, the imaging apparatus includes an imaging lens assembly (its reference numeral is omitted) and an image sensor 290. The imaging lens assembly includes, in order from an object side an image side, a first lens element 210, an aperture stop 200, a second lens element 220, a third lens element 230, a fourth lens element 240, a fifth lens element 250, a sixth lens element 260, a filter 270 and an image surface 280, wherein the image sensor 290 is disposed on the image surface 280 of the imaging lens assembly. The imaging lens assembly includes six lens elements (210, 220, 230, 240, 250, 260) with air gaps between every adjacent lens elements, and without additional one or more lens elements inserted between the first lens element 210 and the sixth lens element 260.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of a plastic material, and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric. Furthermore, the image-side surface 252 of the fifth lens element 250 includes at least one convex shape in an off-axis region thereof.

The sixth lens element 260 with negative refractive power has an object-side surface 261 being concave in a paraxial region thereof and an image-side surface 262 being concave in a paraxial region thereof. The sixth lens element 260 is made of a plastic material, and has the object-side surface 261 and the image-side surface 262 being both aspheric. Furthermore, the object-side surface 261 of the sixth lens element 260 includes at least one convex shape in an off-axis region thereof, and the image-side surface 262 of the sixth lens element 260 includes at least one convex shape in an off-axis region thereof.

The filter 270 is made of a glass material and located between the sixth lens element 260 and the image surface 280, and will not affect the focal length of the imaging lens assembly.

The detailed optical data of the 2nd embodiment are shown in Table 3 and the aspheric surface data are shown in Table 4 below.

TABLE 3

2nd Embodiment
f = 6.55 mm, Fno = 2.44, HFOV = 19.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.789 | ASP | 0.672 | Plastic | 1.545 | 56.0 | 3.86 |
| 2 | | 10.480 | ASP | 0.205 | | | | |
| 3 | Ape. Stop | Plano | | −0.091 | | | | |
| 4 | Lens 2 | 7.707 | ASP | 0.296 | Plastic | 1.545 | 56.0 | 18.74 |
| 5 | | 31.073 | ASP | 0.037 | | | | |
| 6 | Lens 3 | 5.915 | ASP | 0.218 | Plastic | 1.669 | 19.5 | −7.06 |
| 7 | | 2.588 | ASP | 1.394 | | | | |
| 8 | Lens 4 | −24.840 | ASP | 0.237 | Plastic | 1.544 | 56.0 | −11.92 |
| 9 | | 8.803 | ASP | 0.751 | | | | |
| 10 | Lens 5 | −5.259 | ASP | 0.633 | Plastic | 1.639 | 23.2 | 5.29 |
| 11 | | −2.154 | ASP | 0.040 | | | | |
| 12 | Lens 6 | −2.276 | ASP | 0.284 | Plastic | 1.544 | 56.0 | −3.96 |
| 13 | | 41.336 | ASP | 0.284 | | | | |
| 14 | Filter | Plano | | 0.104 | Glass | 1.517 | 64.2 | — |
| 15 | | Plano | | 0.757 | | | | |
| 16 | Image | Plano | | — | | | | |

Reference wavelength is 587.6 nm (d-line).

TABLE 4

Aspheric Coefficients

| Surface # | 1 | 2 | 4 | 5 | 6 | 7 |
|---|---|---|---|---|---|---|
| k= | −3.7590E−01 | −5.7703E+00 | 3.7692E+00 | 9.0000E+01 | −6.1720E+01 | −3.5453E+01 |
| A4= | 6.3586E−03 | −4.5684E−04 | 1.2632E−04 | −1.8577E−01 | −1.8940E−01 | 1.7341E−01 |
| A6= | −5.2370E−03 | −4.6376E−04 | 1.1715E−04 | 5.1008E−01 | 6.0594E−01 | −1.5408E−01 |
| A8= | 7.3474E−03 | −1.1908E−04 | −1.4386E−04 | −6.5874E−01 | −8.1854E−01 | 2.2310E−01 |
| A10= | −4.3648E−03 | 1.2840E−04 | −3.2197E−04 | 4.6001E−01 | 6.2351E−01 | −1.7087E−01 |
| A12= | 7.9774E−04 | 1.3641E−04 | −2.9461E−04 | −1.7305E−01 | −2.5961E−01 | 6.0324E−02 |
| A14= | | | | 2.7423E−02 | 4.6611E−02 | |

| Surface # | 8 | 9 | 10 | 11 | 12 | 13 |
|---|---|---|---|---|---|---|
| k= | 2.6611E+00 | 3.0245E+01 | 1.3078E+01 | 5.8196E−01 | −8.0952E+00 | −2.6636E+01 |
| A4= | −2.9814E−03 | 1.4709E−02 | −3.5722E−02 | 1.4196E−02 | −2.0545E−01 | −1.7750E−01 |
| A6= | −6.5280E−02 | −5.6375E−02 | −4.0305E−02 | −7.3757E−02 | 2.0829E−01 | 2.1105E−01 |
| A8= | 2.5433E−01 | 2.1187E−01 | −8.7259E−02 | 3.8755E−02 | −8.7220E−02 | −1.4769E−01 |
| A10= | −3.0953E−01 | −1.9289E−01 | 1.4148E−01 | −1.7804E−04 | −1.0173E−02 | 5.7728E−02 |
| A12= | 1.6581E−01 | 7.5884E−02 | −8.2515E−02 | −9.2870E−03 | 1.9617E−02 | −1.3096E−02 |
| A14= | −3.6991E−02 | −1.2237E−02 | 1.8596E−02 | 2.8627E−03 | −5.4955E−03 | 1.5770E−03 |
| A16= | | | | | 4.9248E−04 | −7.6817E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.55 | f/f12 | 2.00 |
| Fno | 2.44 | f2/f5 | 3.54 |
| HFOV [deg] | 19.0 | |f/f5| + |f/f6| | 2.89 |
| V3 | 19.5 | f/ImgH | 2.85 |
| V5 | 23.2 | TL/ImgH | 2.53 |
| V5-V2 | −32.8 | EPD/ImgH | 1.17 |
| V5-V6 | −32.8 | EPD/TL | 0.46 |
| Nmax | 1.669 | TL/f | 0.89 |
| CT4/CT5 | 0.37 | f/EPD | 2.44 |
| (T34 + T45)/(CT3 + CT4) | 4.72 | SD/TD | 0.81 |
| (T12 + T23 + T56)/(T34 + T45) | 0.09 | Y11/Y62 | 0.73 |
| R1/f | 0.27 | | |

Furthermore, in the imaging lens assembly according to the 2nd embodiment, there are two of the six lens elements of the imaging lens assembly having an Abbe number smaller than 25, wherein the two lens elements are the third lens element 230 and the fifth lens element 250.

In the imaging lens assembly according to the 2nd embodiment, a minimum of maximum effective diameters of object-side surfaces and image-side surfaces of the six lens elements is a maximum effective diameter of the image-side surface 232 of the third lens element 230.

In the imaging lens assembly according to the 2nd embodiment, the inflection points of object-side surfaces and image-side surfaces of the six lens elements are listed in table below. The inflections mentioned are those disposed between the optical axis and the maximum effective diameter position of each lens element.

| Numbers of inflection points of 2nd Embodiment | | | | | | |
|---|---|---|---|---|---|---|
| | Lens 1 | Lens 2 | Lens 3 | Lens 4 | Lens 5 | Lens 6 |
| Object-side surface | 0 | 1 | 0 | 2 | 1 | 1 |
| Image-side surface | 0 | 3 | 0 | 1 | 1 | 1 |

3rd Embodiment

Figure 5:
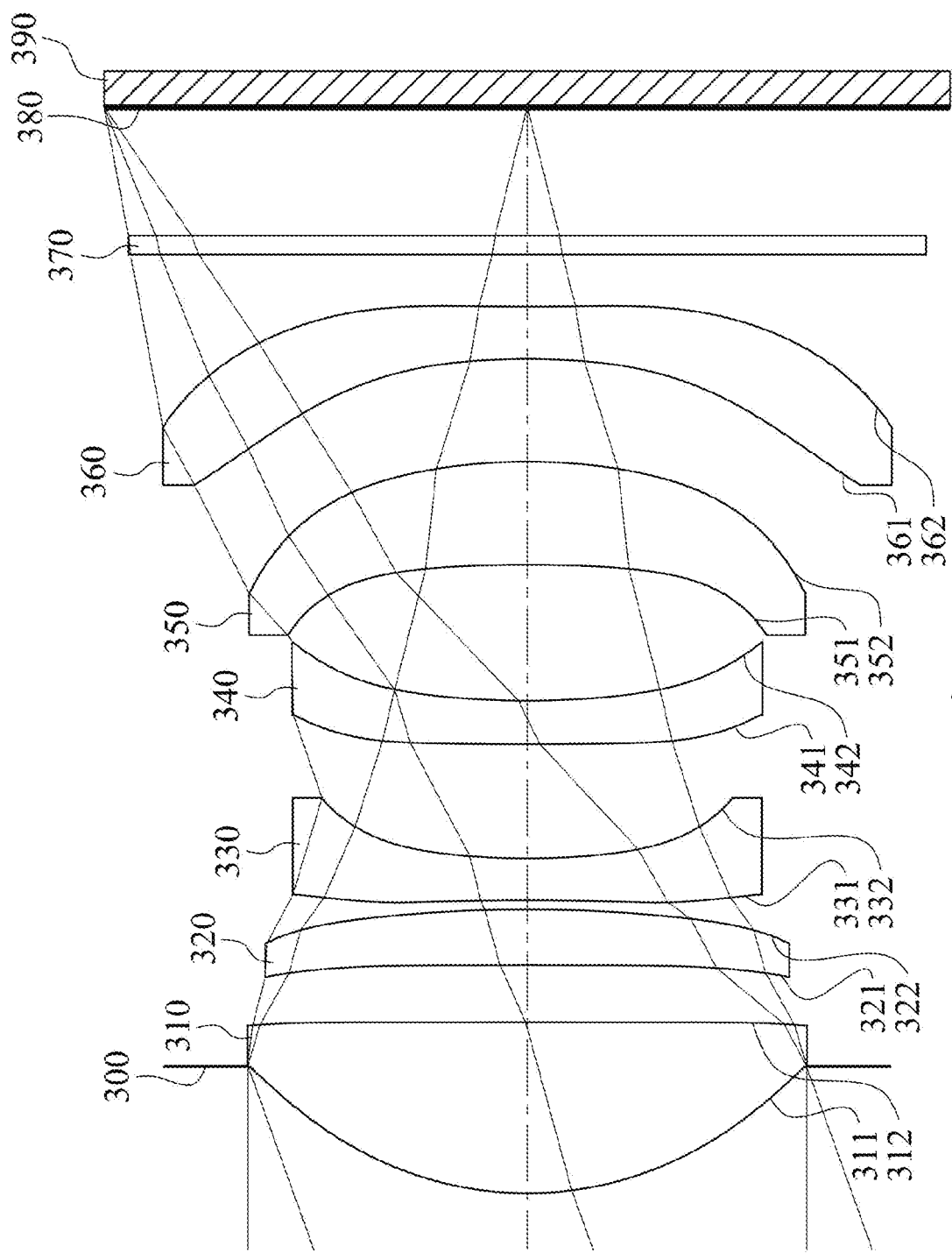
FIG. 5 is a schematic view of an imaging apparatus according to the 3rd embodiment of the present disclosure.
Figure 6:
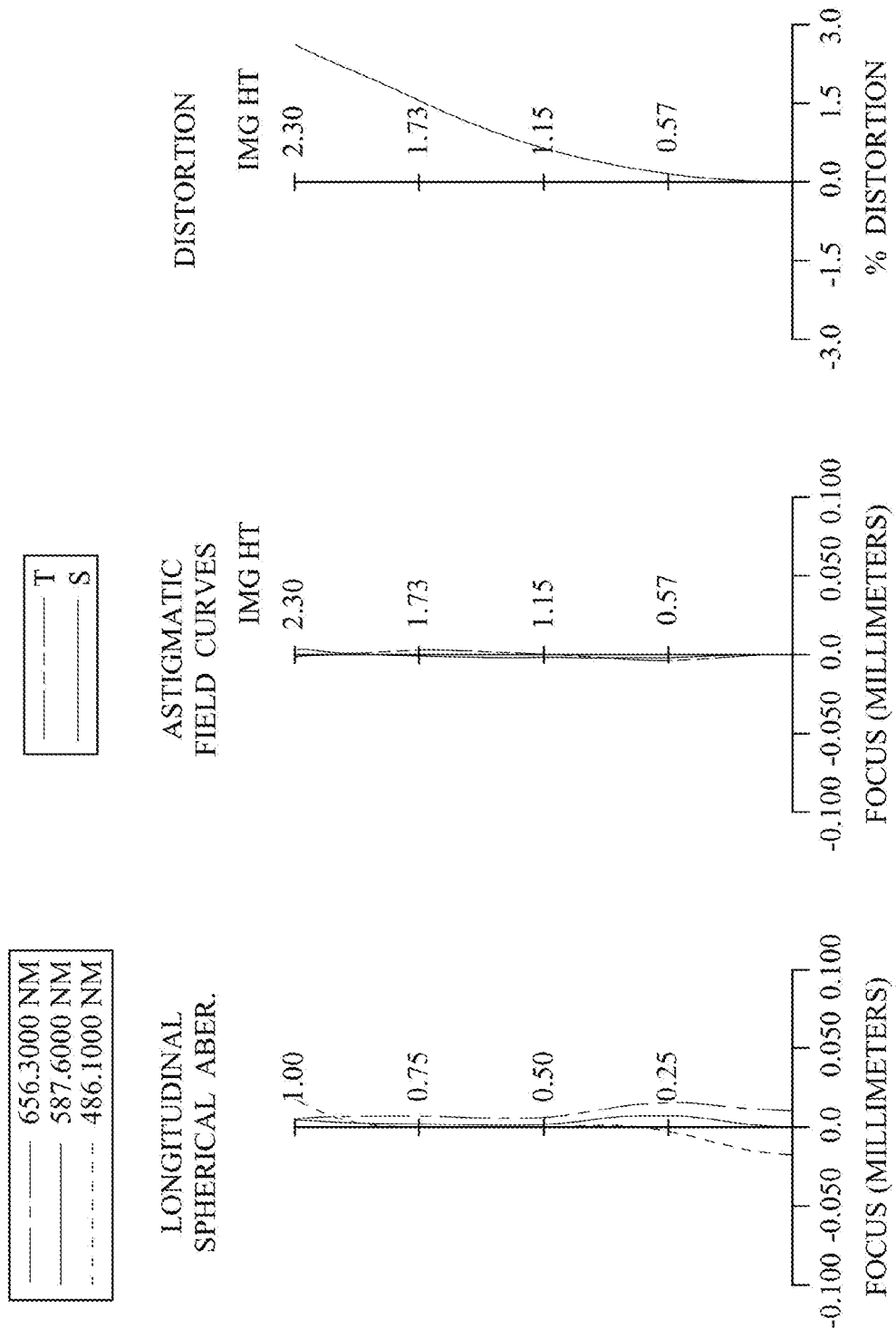
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an imaging lens assembly (its reference numeral is omitted) and an image sensor 390. The imaging lens assembly includes, in order from an object side to an image side, an aperture stop 300, a first lens element 310, a second lens element 320, a third lens element 330, a fourth lens element 340, a fifth lens element 350, a sixth lens element 360, a filter 370 and an image surface 380, wherein the image sensor 390 is disposed on the image surface 380 of the imaging lens assembly. The imaging lens assembly includes six lens elements (310, 320, 330, 340, 350, 360) with air gaps between every adjacent lens elements, and without additional one or more lens elements inserted between the first lens element 310 and the sixth lens element 360.

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of a plastic material, and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric. Furthermore, the image-side surface 352 of the fifth lens element 350 includes at least one convex shape in an off-axis region thereof.

The sixth lens element 360 with negative refractive power has an object-side surface 361 being concave in a paraxial region thereof and an image-side surface 362 being concave in a paraxial region thereof. The sixth lens element 360 is made of a plastic material, and has the object-side surface 361 and the image-side surface 362 being both aspheric. Furthermore, the object-side surface 361 of the sixth lens element 360 includes at least one convex shape in an off-axis region thereof and the image-side surface 362 of the sixth lens element 360 includes at least one convex shape in an off-axis region thereof.

The filter 370 is made of a glass material and located between the sixth lens element 360 and the image surface 380, and will not affect the focal length of the imaging lens assembly.

The detailed optical data of the 3rd embodiment are shown in Table 5 and the aspheric surface data are shown in Table 6 below.

TABLE 5

3rd Embodiment
f = 6.26 mm, Fno = 2.06, HFOV = 19.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.692 | | | | |
| 2 | Lens 1 | 1.875 | ASP | 0.932 | Plastic | 1.545 | 56.0 | 3.42 |
| 3 | | −234.520 | ASP | 0.312 | | | | |
| 4 | Lens 2 | −44.780 | ASP | 0.302 | Plastic | 1.545 | 56.0 | 24.96 |
| 5 | | −10.452 | ASP | 0.049 | | | | |
| 6 | Lens 3 | −52.949 | ASP | 0.228 | Plastic | 1.688 | 18.7 | −5.20 |
| 7 | | 3.843 | ASP | 0.622 | | | | |
| 8 | Lens 4 | 20.660 | ASP | 0.237 | Plastic | 1.544 | 56.0 | −10.82 |
| 9 | | 4.564 | ASP | 0.740 | | | | |
| 10 | Lens 5 | −7.918 | ASP | 0.563 | Plastic | 1.688 | 18.7 | 7.21 |
| 11 | | −3.138 | ASP | 0.559 | | | | |
| 12 | Lens 6 | −4.169 | ASP | 0.284 | Plastic | 1.544 | 56.0 | −5.59 |
| 13 | | 11.520 | ASP | 0.284 | | | | |
| 14 | Filter | Plano | | 0.104 | Glass | 1.517 | 64.2 | — |
| 15 | | Plano | | 0.697 | | | | |
| 16 | Image | Plano | | — | | | | |

Reference wavelength is 587.6 nm (d-line).

TABLE 6

Aspheric Coefficients

| Surface # | 2 | 3 | 4 | 5 | 6 | 7 |
|---|---|---|---|---|---|---|
| k= | −3.8099E−01 | −2.1398E−01 | 1.7346E−01 | 3.7038E+01 | −6.1721E+01 | −4.0767E+01 |
| A4= | 2.4961E−03 | 3.3599E−03 | 1.5969E−02 | −1.1135E−01 | −1.6947E−01 | 3.5013E−02 |
| A6= | 3.6462E−03 | −4.9836E−04 | −1.2591E−02 | 3.1899E−01 | 4.8947E−01 | 1.4980E−01 |
| A8= | −4.1635E−03 | −9.4540E−04 | −1.2308E−02 | −4.1510E−01 | −5.3938E−01 | −6.8981E−02 |
| A10= | 2.6825E−03 | −3.4910E−04 | 1.9833E−03 | 2.7154E−01 | 3.2208E−01 | 4.6495E−04 |
| A12= | −7.4082E−04 | 1.5053E−04 | 6.4492E−03 | −8.7701E−02 | −1.0207E−01 | 1.2505E−02 |
| A14= | | | −2.2170E−03 | 1.0937E−02 | 1.2878E−02 | |

| Surface # | 8 | 9 | 10 | 11 | 12 | 13 |
|---|---|---|---|---|---|---|
| k= | 2.2722E+00 | −2.7473E+01 | 1.6199E+01 | 1.7739E+00 | −8.0952E+00 | −2.6636E+01 |
| A4= | −3.6305E−02 | 2.5954E−02 | −8.9820E−03 | 2.0933E−02 | −8.3010E−02 | −1.1420E−01 |
| A6= | 6.8713E−02 | 2.2282E−02 | −6.5438E−02 | −5.9852E−02 | −3.0989E−03 | 4.1967E−02 |
| A8= | 3.6579E−02 | 3.9623E−02 | 4.2647E−02 | 3.4404E−02 | 2.7986E−02 | −1.1797E−02 |
| A10= | −5.9897E−02 | −3.5251E−02 | −3.1728E−02 | −1.6288E−02 | −1.8011E−02 | 2.5825E−03 |
| A12= | 2.5742E−02 | 1.0669E−02 | 1.0735E−02 | 4.1795E−03 | 6.0059E−03 | −6.2698E−04 |
| A14= | −4.2318E−03 | −1.6599E−03 | −1.8866E−03 | −5.3398E−04 | −1.0268E−03 | 1.1416E−04 |
| A16= | | | | | 7.0218E−05 | −9.3984E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.26 | f/f12 | 1.99 |
| Fno | 2.06 | f2/f5 | 3.46 |
| HFOV [deg] | 19.7 | |f/f5| + |f/f6| | 1.99 |
| V3 | 18.7 | f/ImgH | 2.72 |
| V5 | 18.7 | TL/ImgH | 2.57 |
| V5−V2 | −37.3 | EPD/ImgH | 1.32 |
| V5−V6 | −37.3 | EPD/TL | 0.51 |
| Nmax | 1.688 | TL/f | 0.95 |
| CT4/CT5 | 0.42 | f/EPD | 2.06 |
| (T34 + T45)/(CT3 + CT4) | 2.93 | SD/TD | 0.86 |
| (T12 + T23 + T56)/(T34 + T45) | 0.68 | Y11/Y62 | 0.77 |
| R1/f | 0.30 | | |

Furthermore, in the imaging lens assembly according to the 3rd embodiment, there are two of the six lens elements of the imaging lens assembly having an Abbe number smaller than 25, 22, and 20, wherein the two lens elements are the third lens element 330 and the fifth lens element 350.

In the imaging lens assembly according to the 3rd embodiment, a minimum of maximum effective diameters of object-side surfaces and image-side surfaces of the six lens elements is a maximum effective diameter of the image-side surface 332 of the third lens element 330.

In the imaging lens assembly according to the 3rd embodiment, the inflection points of object-side surfaces and image-side surfaces of the six lens elements are listed in table below. The inflections mentioned are those disposed between the optical axis and the maximum effective diameter position of each lens element.

| Numbers of inflection points of 3rd Embodiment | | | | | | |
|---|---|---|---|---|---|---|
| | Lens 1 | Lens 2 | Lens 3 | Lens 4 | Lens 5 | Lens 6 |
| Object-side surface | 1 | 0 | 2 | 0 | 0 | 1 |
| Image-side surface | 2 | 0 | 0 | 0 | 0 | 1 |

4th Embodiment

Figure 7:
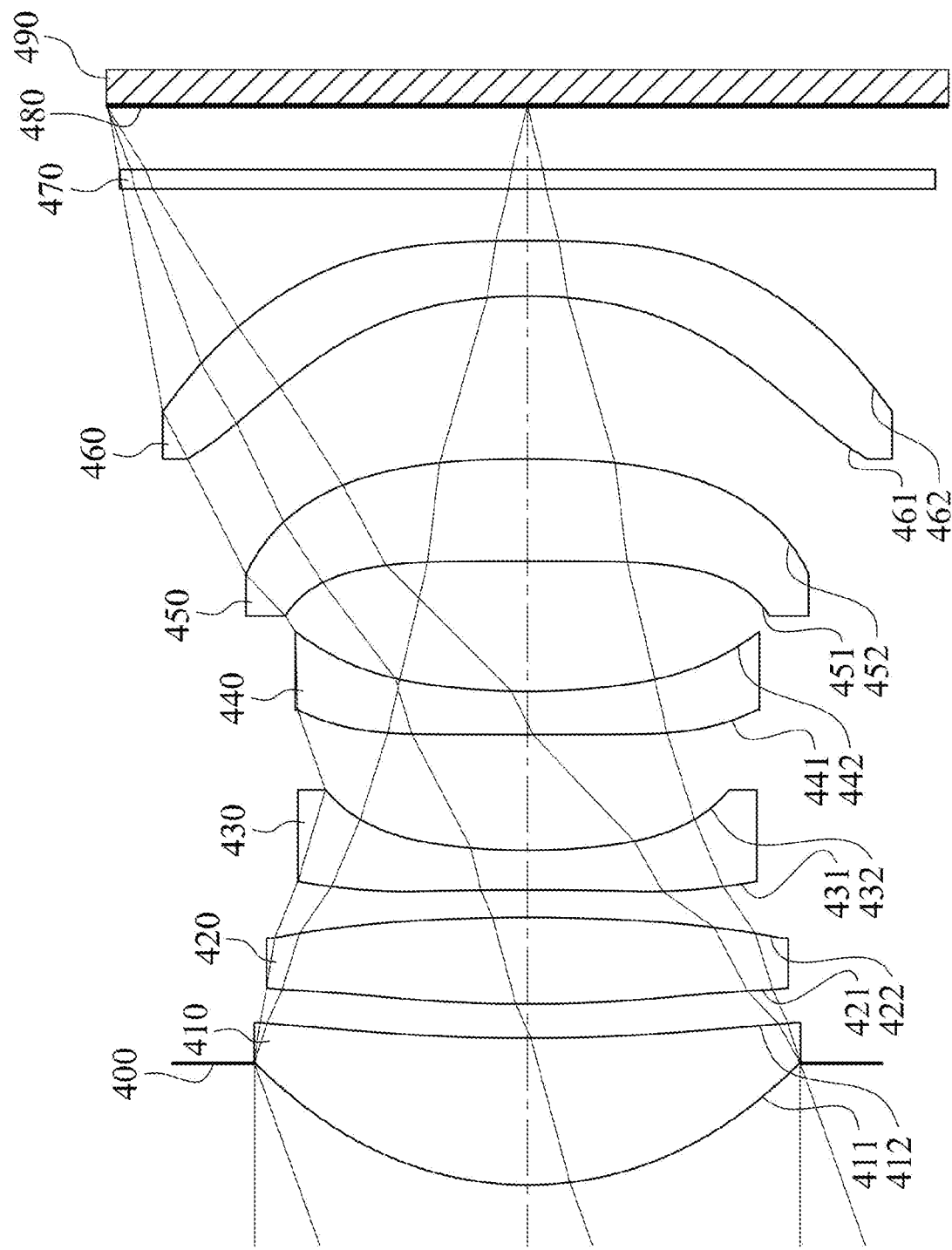
FIG. 7 is a schematic view of an imaging apparatus according to the 4th embodiment of the present disclosure.
Figure 8:
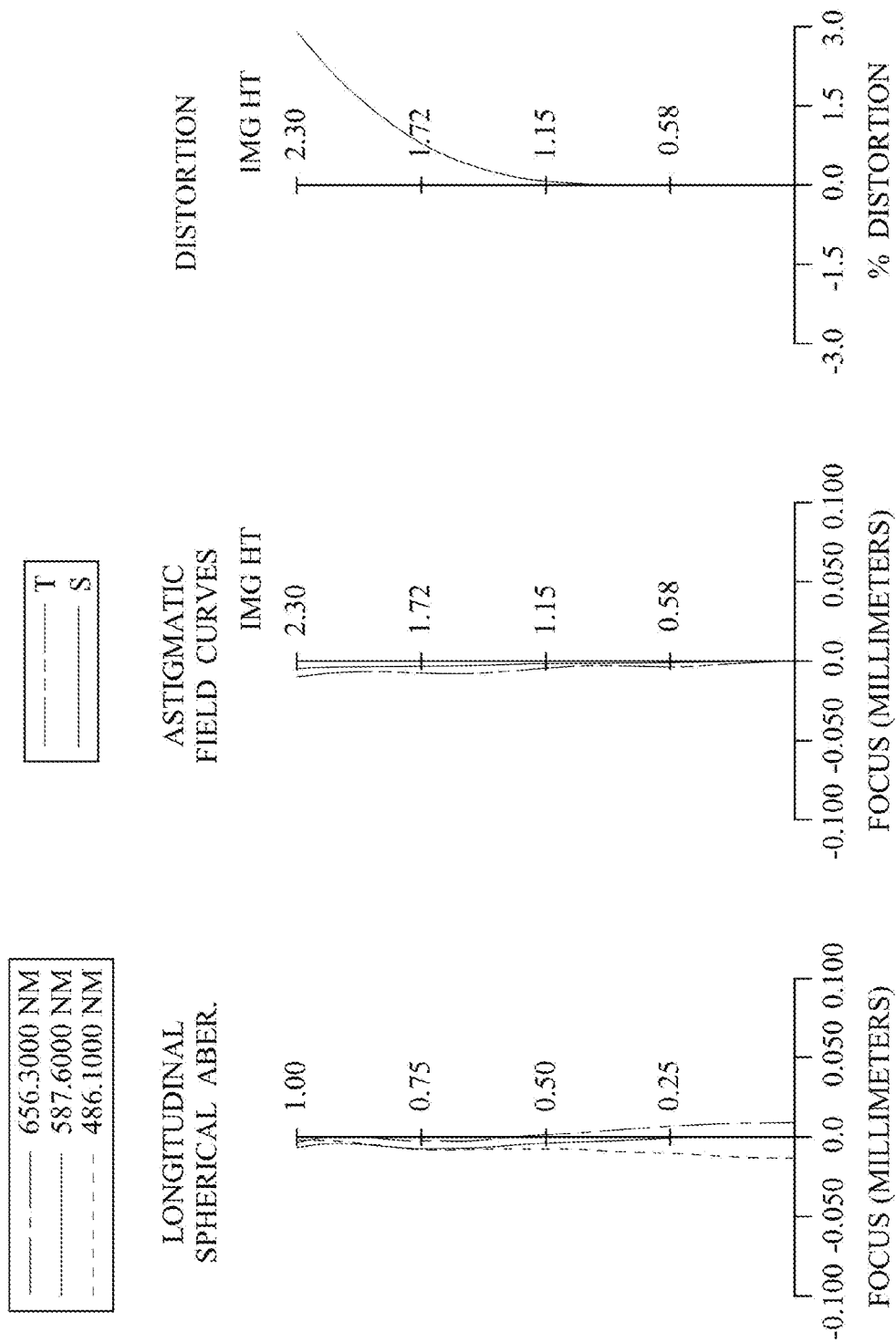
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an imaging lens assembly (its reference numeral is omitted) and an image sensor 490. The imaging lens assembly includes, in order from an object side to an image side, an aperture stop 400, a first lens element 410, a second lens element 420, a third lens element 430, a fourth lens element 440, a fifth lens element 450, a sixth lens element 460, a filter 470 and an image surface 480, wherein the image sensor 490 is disposed on the image surface 480 of the imaging lens assembly. The imaging lens assembly includes six lens elements (410, 420, 430, 440, 450, 460) with air gaps between every adjacent lens elements, and without additional one or more lens elements inserted between the first lens element 410 and the sixth lens element 460.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of a plastic material, and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of a plastic material, and has the object-side surface 451 and the image-side surface 452 being both aspheric. Furthermore, the image-side surface 452 of the fifth lens element 450 includes at least one convex shape in an off-axis region thereof.

The sixth lens element 460 with negative refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric. Furthermore, the object-side surface 461 of the sixth lens element 460 includes at least one convex shape in an off-axis region thereof and the image-side surface 462 of the sixth lens element 460 includes at least one convex shape in an off-axis region thereof.

The filter 470 is made of a glass material and located between the sixth lens element 460 and the image surface 480, and will not affect the focal length of the imaging lens assembly.

The detailed optical data of the 4th embodiment are shown in Table 7 and the aspheric surface data are shown in Table 8 below.

TABLE 7

4th Embodiment
f = 6.26 mm, Fno = 2.10, HFOV = 19.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.667 | | | | |
| 2 | Lens 1 | 1.898 | ASP | 0.805 | Plastic | 1.545 | 56.0 | 4.06 |
| 3 | | 11.331 | ASP | 0.187 | | | | |
| 4 | Lens 2 | 8.128 | ASP | 0.474 | Plastic | 1.545 | 56.0 | 9.16 |
| 5 | | −12.641 | ASP | 0.150 | | | | |
| 6 | Lens 3 | 16599.196 | ASP | 0.218 | Plastic | 1.688 | 18.7 | −4.90 |
| 7 | | 3.373 | ASP | 0.634 | | | | |
| 8 | Lens 4 | 24.535 | ASP | 0.237 | Plastic | 1.544 | 56.0 | −7.65 |
| 9 | | 3.546 | ASP | 0.712 | | | | |
| 10 | Lens 5 | 344.238 | ASP | 0.562 | Plastic | 1.688 | 18.7 | 8.04 |
| 11 | | −5.620 | ASP | 0.890 | | | | |
| 12 | Lens 6 | −2.692 | ASP | 0.304 | Plastic | 1.534 | 55.9 | −6.67 |
| 13 | | −11.444 | ASP | 0.284 | | | | |

TABLE 7-continued

4th Embodiment
f = 6.26 mm, Fno = 2.10, HFOV = 19.7 deg.

| Surface # | | Curvature Radius | Thickness | Material | Index | Abbe # | Focal Length |
|---|---|---|---|---|---|---|---|
| 14 | Filter | Plano | 0.104 | Glass | 1.517 | 64.2 | — |
| 15 | | Plano | 0.351 | | | | |
| 16 | Image | Plano | — | | | | |

Reference wavelength is 587.6 nm (d-line).

TABLE 8

Aspheric Coefficients

| Surface # | 2 | 3 | 4 | 5 | 6 | 7 |
|---|---|---|---|---|---|---|
| k= | −3.5980E−01 | −2.1398E−01 | 1.7350E−01 | 2.7339E+01 | −6.1664E+01 | −3.7983E+01 |
| A4= | 2.6355E−03 | 3.5543E−03 | 8.3427E−03 | −5.4389E−02 | −1.6979E−01 | −6.6948E−04 |
| A6= | 2.0717E−03 | 3.7244E−03 | −4.6800E−03 | 1.2361E−01 | 4.8611E−01 | 2.9328E−01 |
| A8= | −1.3302E−03 | −8.4484E−03 | −1.1897E−02 | −1.3702E−01 | −5.4333E−01 | −2.5498E−01 |
| A10= | 8.5373E−04 | 3.0485E−03 | 1.4505E−03 | 7.4817E−02 | 3.3005E−01 | 1.0086E−01 |
| A12= | −3.0793E−04 | −2.3426E−04 | 3.6384E−03 | −1.9256E−02 | −1.0635E−01 | −5.4534E−03 |
| A14= | | | −9.5898E−04 | 1.7691E−03 | 1.4018E−02 | |

| Surface # | 8 | 9 | 10 | 11 | 12 | 13 |
|---|---|---|---|---|---|---|
| k= | 2.2722E+00 | −2.9473E+01 | 9.0000E+01 | 5.3933E+00 | −8.0952E+00 | −2.6636E+01 |
| A4= | −1.2411E−01 | −2.7143E−02 | −5.8933E−02 | −3.6384E−02 | −1.2637E−01 | −1.0602E−01 |
| A6= | 3.1816E−01 | 1.9384E−01 | −3.0433E−02 | −2.4458E−02 | 3.3102E−02 | 2.9077E−02 |
| A8= | −2.5230E−01 | −1.2902E−01 | 5.4557E−02 | 2.8039E−02 | 3.3174E−03 | −4.3725E−03 |
| A10= | 8.8317E−02 | 1.1766E−02 | −5.9227E−02 | −2.0402E−02 | −5.9293E−03 | −5.8141E−04 |
| A12= | −2.1999E−03 | 2.2633E−02 | 3.0387E−02 | 7.3223E−03 | 2.1671E−03 | 4.1420E−04 |
| A14= | −4.2260E−03 | −7.4942E−03 | −7.3523E−03 | −1.2316E−03 | −3.2079E−04 | −8.3265E−05 |
| A16= | | | | | 1.5419E−05 | 6.4073E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.26 | f/f12 | 2.07 |
| Fno | 2.10 | f2/f5 | 1.14 |
| HFOV [deg] | 19.7 | \|f/f5\| + \|f/f6\| | 1.72 |
| V3 | 18.7 | f/ImgH | 2.72 |
| V5 | 18.7 | TL/ImgH | 2.57 |
| V5−V2 | −37.3 | EPD/ImgH | 1.30 |
| V5−V6 | −37.2 | EPD/TL | 0.50 |
| Nmax | 1.688 | TL/f | 0.94 |
| CT4/CT5 | 0.42 | f/EPD | 2.10 |
| (T34 + T45)/(CT3 + CT4) | 2.96 | SD/TD | 0.87 |
| (T12 + T23 + T56)/(T34 + T45) | 0.91 | Y11/Y62 | 0.75 |
| R1/f | 0.30 | | |

Furthermore, in the imaging lens assembly according to the 4th embodiment, there are two of the six lens elements of the imaging lens assembly having an Abbe number smaller than 25, 22, and 20; wherein the two lens elements are the third lens element 430 and the fifth lens element 450.

In the imaging lens assembly according to the 4th embodiment, a minimum of maximum effective diameters of object-side surfaces and image-side surfaces of the six lens elements is a maximum effective diameter of the image-side surface 432 of the third lens element 430.

In the imaging lens assembly according to the 4th embodiment, the inflection points of object-side surfaces and image-side surfaces of the six lens elements are listed in table below. The inflections mentioned are those disposed between the optical axis and the maximum effective diameter position of each lens element.

Numbers of inflection points of 4th Embodiment

| | Lens 1 | Lens 2 | Lens 3 | Lens 4 | Lens 5 | Lens 6 |
|---|---|---|---|---|---|---|
| Object-side surface | 0 | 2 | 3 | 2 | 1 | 1 |
| Image-side surface | 2 | 0 | 0 | 0 | 0 | 0 |

5th Embodiment

Figure 9:
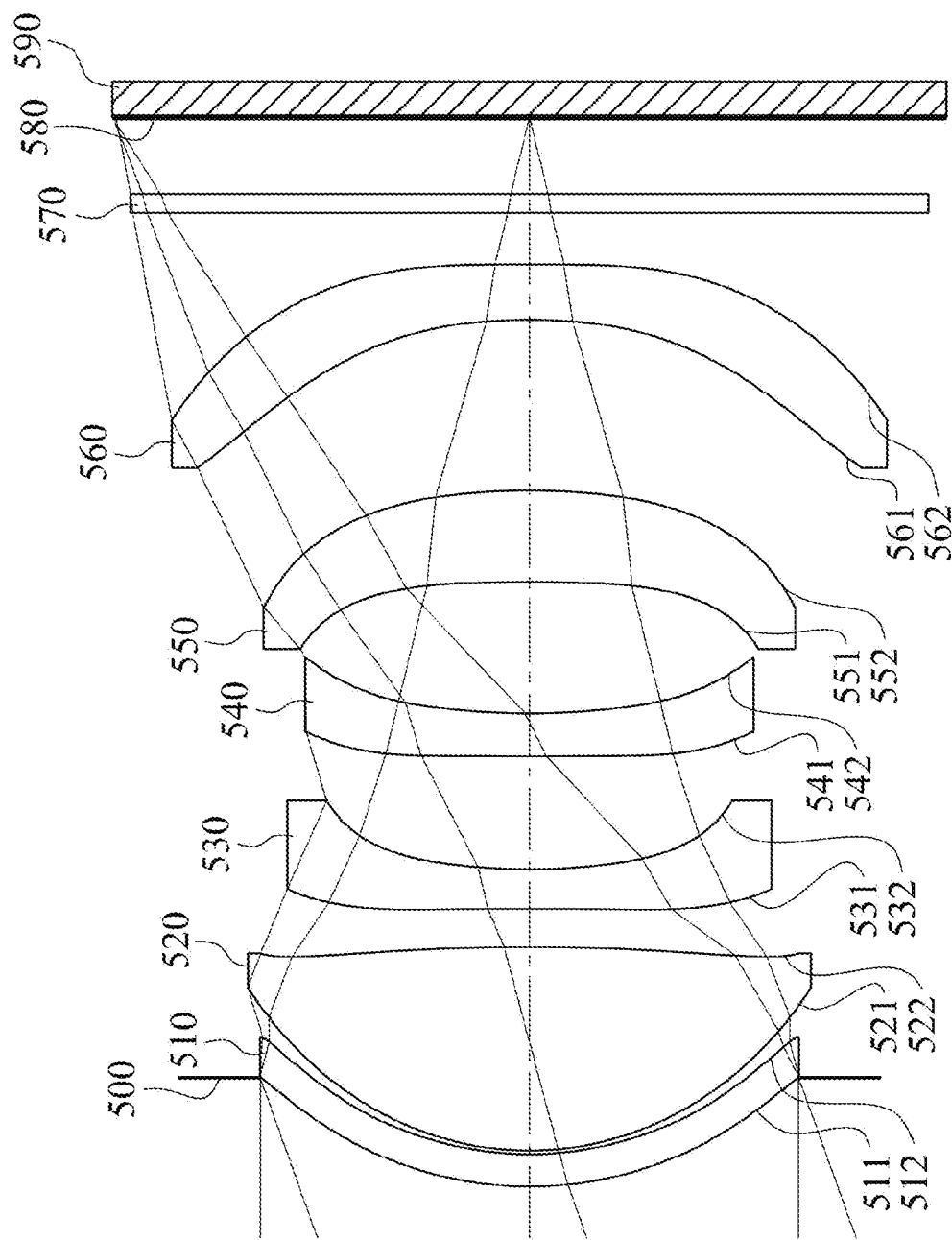
FIG. 9 is a schematic view of an imaging apparatus according to the 5th embodiment of the present disclosure.
Figure 10:
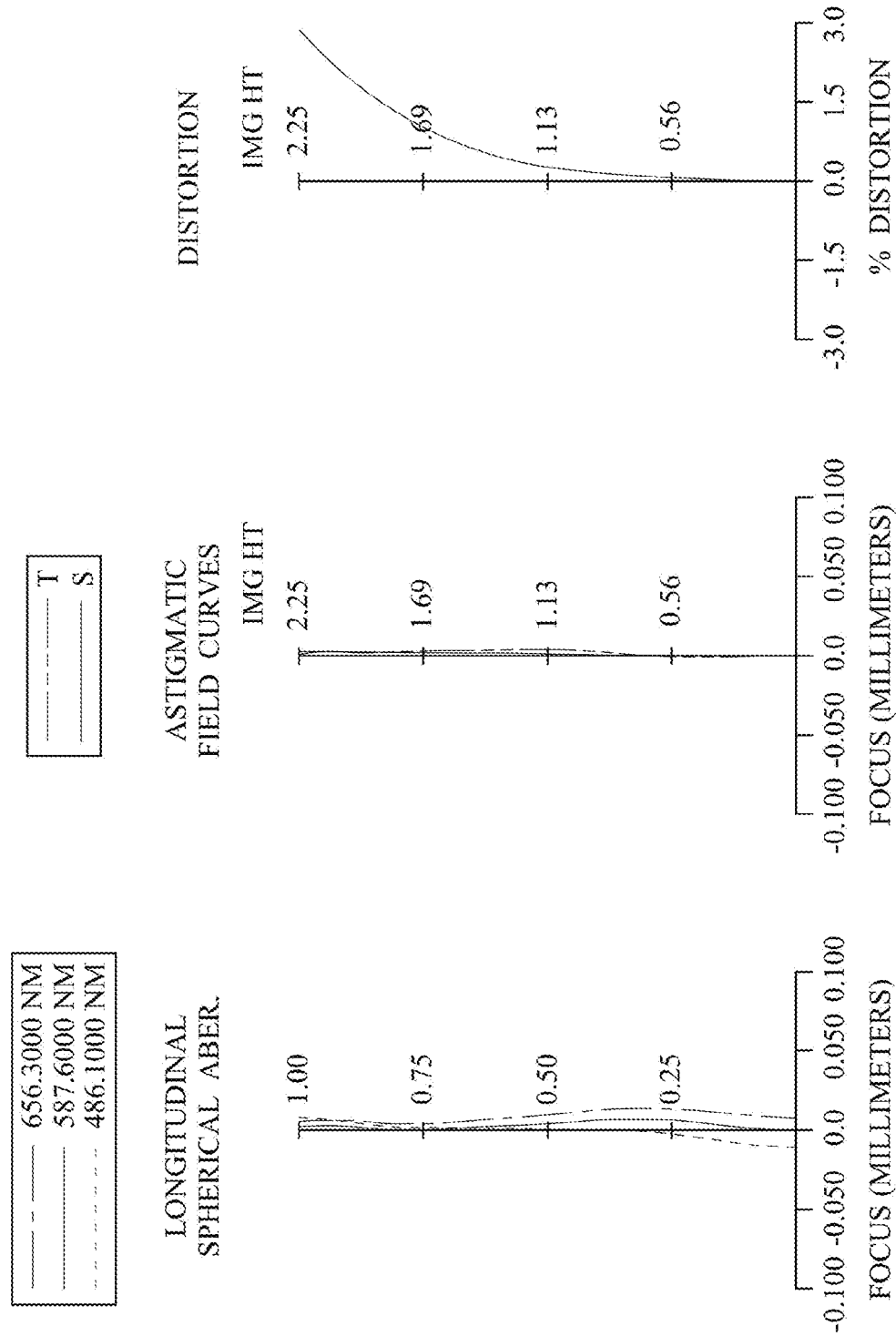
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an imaging lens assembly (its reference numeral is omitted) and an image sensor 590. The imaging lens assembly includes, in order from an object side to an image side, an aperture stop 500, a first lens element 510, a second lens element 520, a third lens element 530, a fourth lens element 540, a fifth lens element 550, a sixth lens element 560, a filter 570 and an image surface 580, wherein the image sensor 590 is disposed on the image surface 580 of the imaging lens assembly. The imaging lens assembly includes six lens elements (510, 520, 530, 540, 550, 560) with air gaps between every adjacent lens elements, and without additional one or more lens elements inserted between the first lens element 510 and the sixth lens element 560.

The first lens element 510 with negative refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of a plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric. Furthermore, the image-side surface 552 of the fifth lens element 550 includes at least one convex shape in an off-axis region thereof.

The sixth lens element 560 with negative refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric. Furthermore, the object-side surface 561 of the sixth lens element 560 includes at least one convex shape in an off-axis region thereof, and the image-side surface 562 of the sixth lens element 560 includes at least one convex shape in an off-axis region thereof.

The filter 570 is made of a glass material and located between the sixth lens element 560 and the image surface 580, and will not affect the focal length of the imaging lens assembly.

The detailed optical data of the 5th embodiment are shown in Table 9 and the aspheric surface data are shown in Table 10 below.

TABLE 9

5th Embodiment
f = 6.11 mm, Fno = 2.10, HFOV = 19.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.590 | | | | |
| 2 | Lens 1 | 2.001 | ASP | 0.176 | Plastic | 1.545 | 56.0 | −78.76 |
| 3 | | 1.852 | ASP | 0.019 | | | | |
| 4 | Lens 2 | 1.656 | ASP | 1.102 | Plastic | 1.545 | 56.0 | 2.76 |
| 5 | | −12.629 | ASP | 0.207 | | | | |
| 6 | Lens 3 | 105.753 | ASP | 0.216 | Plastic | 1.688 | 18.7 | −4.89 |
| 7 | | 3.257 | ASP | 0.611 | | | | |
| 8 | Lens 4 | 18.407 | ASP | 0.232 | Plastic | 1.544 | 56.0 | −8.66 |
| 9 | | 3.735 | ASP | 0.712 | | | | |
| 10 | Lens 5 | −10.203 | ASP | 0.495 | Plastic | 1.688 | 18.7 | 8.79 |
| 11 | | −3.871 | ASP | 0.924 | | | | |
| 12 | Lens 6 | −3.126 | ASP | 0.301 | Plastic | 1.534 | 55.9 | −6.66 |
| 13 | | −26.637 | ASP | 0.278 | | | | |
| 14 | Filter | Plano | | 0.102 | Glass | 1.517 | 64.2 | — |
| 15 | | Plano | | 0.416 | | | | |
| 16 | Image | Plano | | — | | | | |

Reference wavelength is 587.6 nm (d-line).

TABLE 10

Aspheric Coefficients

| Surface # | 2 | 3 | 4 | 5 | 6 | 7 |
|---|---|---|---|---|---|---|
| k= | −3.4755E−01 | −1.8281E−01 | 1.0323E−02 | −9.0000E+01 | −6.5735E+01 | −3.5792E+01 |
| A4= | −1.9752E−03 | 1.0401E−02 | 1.2072E−02 | −1.6784E−02 | −1.1005E−01 | 3.1402E−02 |
| A6= | 4.3369E−03 | −4.0659E−02 | −4.5312E−02 | 1.5765E−02 | 2.5024E−01 | 1.2039E−01 |
| A8= | 1.2596E−03 | 4.7444E−02 | 3.8229E−02 | 2.7856E−03 | −1.5640E−01 | 7.6367E−02 |

TABLE 10-continued

Aspheric Coefficients

| A10= | 3.4002E−04 | −1.8086E−02 | −1.3155E−02 | −7.7414E−03 | 1.8075E−02 | −1.6332E−01 |
|---|---|---|---|---|---|---|
| A12= | −6.9981E−04 | 1.4057E−03 | 1.8481E−04 | 2.4432E−03 | 1.9089E−02 | 8.3971E−02 |
| A14= | | | 3.3685E−04 | 6.9461E−05 | −5.4720E−03 | |

| Surface # | 8 | 9 | 10 | 11 | 12 | 13 |
|---|---|---|---|---|---|---|
| k= | 2.2728E+00 | −3.0531E+01 | 3.8810E+01 | 4.3885E+00 | −8.0952E+00 | −2.6636E+01 |
| A4= | −1.1651E−01 | −1.6991E−02 | −6.1389E−02 | −3.2645E−02 | −1.2019E−01 | −1.1438E−01 |
| A6= | 2.6839E−01 | 1.5787E−01 | −3.2044E−02 | −2.0953E−02 | 3.3627E−02 | 3.7021E−02 |
| A8= | −1.6116E−01 | −6.5293E−02 | 2.7393E−02 | 1.5463E−02 | 6.6521E−03 | −7.4968E−03 |
| A10= | 3.0100E−02 | −3.0079E−02 | −2.4002E−02 | −8.6520E−03 | −9.7286E−03 | −1.2315E−04 |
| A12= | 1.1755E−02 | 3.8093E−02 | 5.2993E−03 | 1.3712E−03 | 3.5180E−03 | 3.7273E−04 |
| A14= | −5.3477E−03 | −1.1115E−02 | −1.3836E−03 | −1.2212E−04 | −5.2513E−04 | −7.8330E−05 |
| A16= | | | | | 2.6258E−05 | 5.8744E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.11 | f/f12 | 2.07 |
| Fno | 2.10 | f2/f5 | 0.31 |
| HFOV [deg] | 19.7 | \|f/f5\| + \|f/f6\| | 1.61 |
| V3 | 18.7 | f/ImgH | 2.72 |
| V5 | 18.7 | TL/ImgH | 2.57 |
| V5-V2 | −37.3 | EPD/ImgH | 1.29 |
| V5-V6 | −37.2 | EPD/TL | 0.50 |
| Nmax | 1.688 | TL/f | 0.95 |
| CT4/CT5 | 0.47 | f/EPD | 2.10 |
| (T34 + T45)/(CT3 + CT4) | 2.96 | SD/TD | 0.88 |
| (T12 + T23 + T56)/(T34 + T45) | 0.87 | Y11/Y62 | 0.75 |
| R1/f | 0.33 | | |

Furthermore, in the imaging lens assembly according to the 5th embodiment, there are two of the six lens elements of the imaging lens assembly having an Abbe number smaller than 25, 22, and 20, wherein the two lens elements are the third lens element 530 and the fifth lens element 550.

In the imaging lens assembly according to the 5th embodiment, a minimum of maximum effective diameters of object-side surfaces and image-side surfaces of the six lens elements is a maximum effective diameter of the image-side surface 532 of the third lens element 530.

In the imaging lens assembly according to the 5th embodiment, the inflection points of object-side surfaces and image-side surfaces of the six lens elements are listed in table below. The inflections mentioned are those disposed between the optical axis and the maximum effective diameter position of each lens element.

| Numbers of inflection points of 5th Embodiment | | | | | | |
|---|---|---|---|---|---|---|
| | Lens 1 | Lens 2 | Lens 3 | Lens 4 | Lens 5 | Lens 6 |
| Object-side surface | 1 | 0 | 2 | 2 | 0 | 1 |
| Image-side surface | 1 | 1 | 0 | 1 | 0 | 0 |

6th Embodiment

Figure 11:
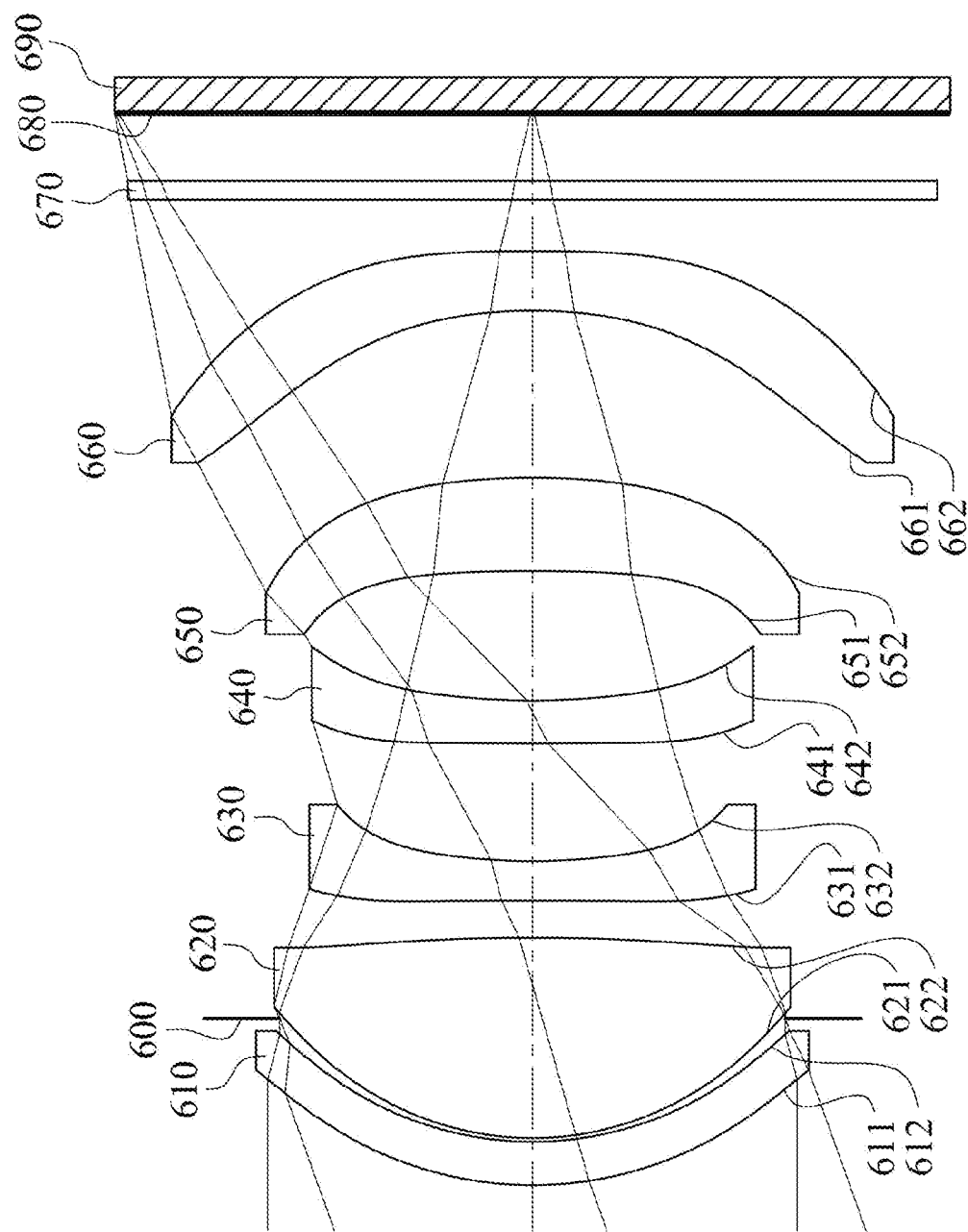
FIG. 11 is a schematic view of an imaging apparatus according to the 6th embodiment of the present disclosure.
Figure 12:
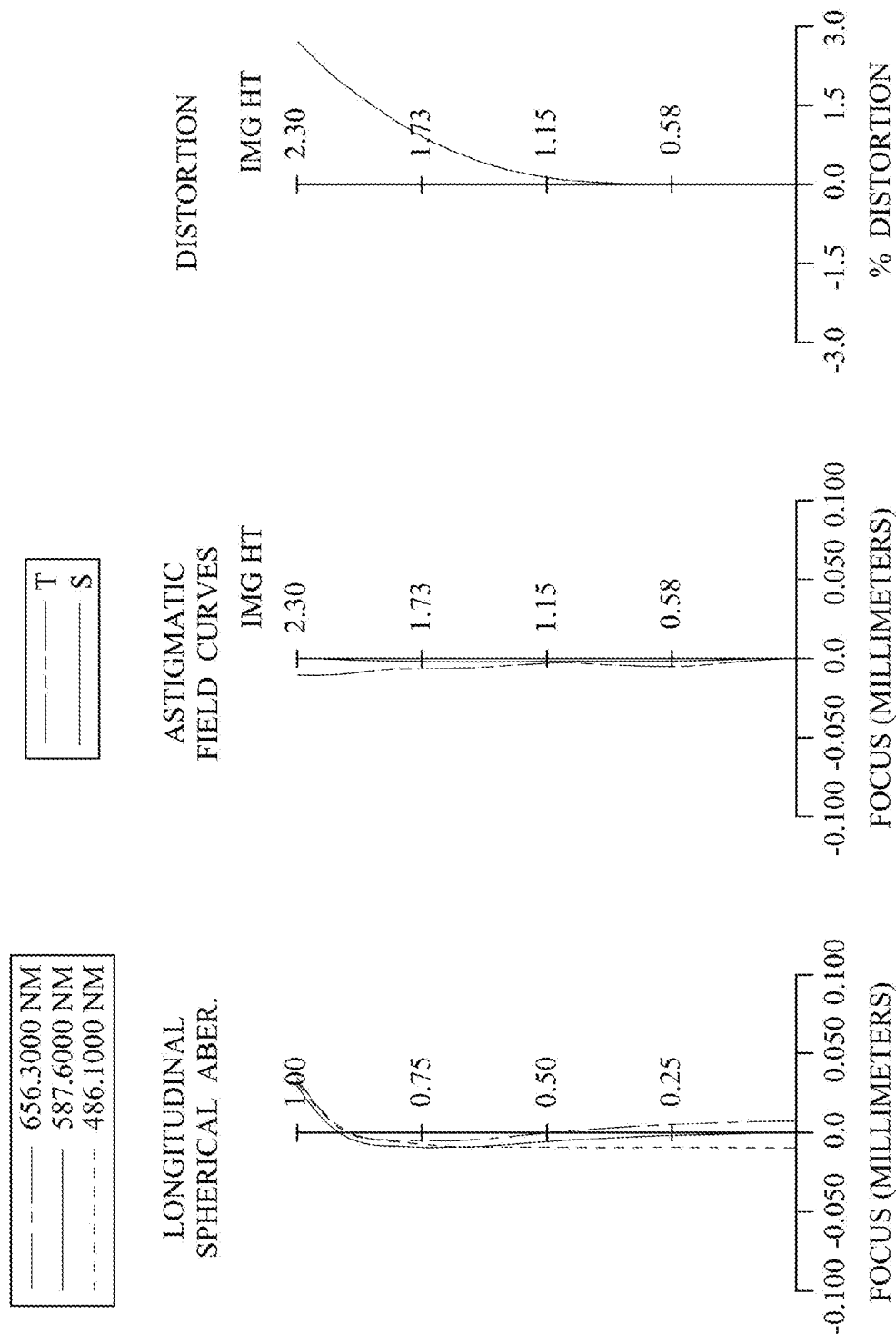
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an imaging lens assembly (its reference numeral is omitted) and an image sensor 690. The imaging lens assembly includes, in order from an object side an image side, a first lens element 610, an aperture stop 600, a second lens element 620, a third lens element 630, a fourth lens element 640, a fifth lens element 650, a sixth lens element 660, a filter 670 and an image surface 680, wherein the image sensor 690 is disposed on the image surface 680 of the imaging lens assembly. The imaging lens assembly includes six lens elements (610, 620, 630, 640, 650, 660) with air gaps between every adjacent lens elements, and without additional one or more lens elements inserted between the first lens element 610 and the sixth lens element 660.

The first lens element 610 with negative refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of a plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric. Furthermore, the image-side surface 652 of the fifth lens element 650 includes at least one convex shape in an off-axis region thereof.

The sixth lens element 660 with negative refractive power has an object-side surface 661 being concave in a paraxial region thereof and an image-side surface 662 being convex in a paraxial region thereof. The sixth lens element 660 is made of a plastic material, and has the object-side surface 661 and the image-side surface 662 being both aspheric. Furthermore, the object-side surface 661 of the sixth lens element 660 includes at least one convex shape in an off-axis region thereof, and the image-side surface 662 of the sixth lens element 660 includes at least one convex shape in an off-axis region thereof.

The filter 670 is made of a glass material and located between the sixth lens element 660 and the image surface 680, and will not affect the focal length of the imaging lens assembly.

The detailed optical data of the 6th embodiment are shown in Table 11 and the aspheric surface data are shown in Table 12 below.

TABLE 11

6th Embodiment
f = 6.28 mm, Fno = 2.15, HFOV = 19.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.046 | ASP | 0.241 | Plastic | 1.545 | 56.0 | −79.13 |
| 2 | | 1.872 | ASP | 0.683 | | | | |
| 3 | Ape. Stop | Plano | | −0.663 | | | | |
| 4 | Lens 2 | 1.678 | ASP | 1.109 | Plastic | 1.545 | 56.0 | 2.78 |
| 5 | | −11.838 | ASP | 0.205 | | | | |
| 6 | Lens 3 | 328.821 | ASP | 0.218 | Plastic | 1.688 | 18.7 | −4.90 |
| 7 | | 3.334 | ASP | 0.652 | | | | |
| 8 | Lens 4 | 19.443 | ASP | 0.237 | Plastic | 1.544 | 56.0 | −8.75 |
| 9 | | 3.809 | ASP | 0.716 | | | | |
| 10 | Lens 5 | −11.444 | ASP | 0.517 | Plastic | 1.688 | 18.7 | 8.95 |
| 11 | | −4.076 | ASP | 0.922 | | | | |
| 12 | Lens 6 | −2.871 | ASP | 0.331 | Plastic | 1.534 | 55.9 | −6.59 |
| 13 | | −16.225 | ASP | 0.284 | | | | |
| 14 | Filter | Plano | | 0.104 | Glass | 1.517 | 64.2 | — |
| 15 | | Plano | | 0.375 | | | | |
| 16 | Image | Plano | | — | | | | |

Reference wavelength is 587.6 nm (d-line).

TABLE 12

Aspheric Coefficients

| Surface # | 1 | 2 | 4 | 5 | 6 | 7 |
|---|---|---|---|---|---|---|
| k= | −3.4199E−01 | −1.8522E−01 | 7.5498E−03 | −8.9361E+01 | −6.5735E+01 | −3.6296E+01 |
| A4= | −1.1303E−03 | −6.7632E−03 | −5.8966E−03 | −1.7471E−02 | −1.0040E−01 | 3.1950E−02 |
| A6= | 8.4947E−03 | 1.6796E−02 | 4.6422E−03 | 2.4316E−02 | 2.4177E−01 | 1.2319E−01 |
| A8= | −5.3916E−03 | −1.4034E−02 | −9.9749E−03 | −1.3728E−02 | −2.0584E−01 | −1.8414E−02 |
| A10= | 2.8217E−03 | 8.0651E−03 | 6.5804E−03 | 3.5410E−03 | 1.0457E−01 | −2.8125E−02 |
| A12= | −8.2679E−04 | −2.3334E−03 | −2.7466E−03 | −3.7269E−04 | −3.1461E−02 | 2.5556E−02 |
| A14= | | | 3.8996E−04 | 1.8720E−04 | 4.4118E−03 | |

| Surface # | 8 | 9 | 10 | 11 | 12 | 13 |
|---|---|---|---|---|---|---|
| k= | 2.2728E+00 | −3.0197E+01 | 3.7430E+01 | 4.4079E+00 | −8.0948E+00 | −2.6636E+01 |
| A4= | −1.0135E−01 | −9.0897E−03 | −5.4644E−02 | −3.1504E−02 | −1.1999E−01 | −1.0640E−01 |
| A6= | 2.1107E−01 | 1.2229E−01 | −3.7945E−02 | −2.0298E−02 | 3.4002E−02 | 3.1984E−02 |
| A8= | −1.0963E−01 | −3.8286E−02 | 4.6558E−02 | 1.7252E−02 | 6.4776E−03 | −4.0751E−03 |
| A10= | 9.9360E−03 | −3.4077E−02 | −4.9034E−02 | −1.1117E−02 | −9.7858E−03 | −1.7403E−03 |
| A12= | 1.7766E−02 | 3.5805E−02 | 2.2471E−02 | 2.9460E−03 | 3.6730E−03 | 8.7516E−04 |
| A14= | −6.7998E−03 | −1.0202E−02 | −5.5561E−03 | −4.2598E−04 | −5.9083E−04 | −1.6596E−04 |
| A16= | | | | | 3.4775E−05 | 1.2340E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.28 | f/f12 | 2.09 |
| Fno | 2.15 | f2/f5 | 0.31 |
| HFOV [deg] | 19.6 | \|f/f5\| + \|f/f6\| | 1.66 |
| V3 | 18.7 | f/ImgH | 2.73 |
| V5 | 18.7 | TL/ImgH | 2.58 |
| V5-V2 | −37.3 | EPD/ImgH | 1.27 |
| V5-V6 | −37.2 | EPD/TL | 0.49 |
| Nmax | 1.688 | TL/f | 0.94 |
| CT4/CT5 | 0.46 | f/EPD | 2.15 |
| (T34 + T45)/(CT3 + CT4) | 3.01 | SD/TD | 0.82 |
| (T12 + T23 + T56)/(T34 + T45) | 0.84 | Y11/Y62 | 0.77 |
| R1/f | 0.33 | | |

Furthermore, in the imaging lens assembly according to the 6th embodiment, there are two of the six lens elements of the imaging lens assembly with an Abbe number smaller than 25, 22, and 20, wherein the two lens elements are the third lens element 630 and the fifth lens element 650.

In the imaging lens assembly according to the 6th embodiment, a minimum of maximum effective diameters of object-side surfaces and image-side surfaces of the six lens elements is a maximum effective diameter of the image-side surface 632 of the third lens element 630.

In the imaging lens assembly according to the 6th embodiment, the inflection points of object-side surfaces and image-side surfaces of the six lens elements are listed in table below. The inflections mentioned are those disposed between the optical axis and the maximum effective diameter position of each lens element.

| Numbers of inflection points of 6th Embodiment | | | | | | |
|---|---|---|---|---|---|---|
| | Lens 1 | Lens 2 | Lens 3 | Lens 4 | Lens 5 | Lens 6 |
| Object-side surface | 1 | 0 | 2 | 2 | 0 | 1 |
| Image-side surface | 1 | 1 | 0 | 0 | 0 | 0 |

7th Embodiment

Figure 13:
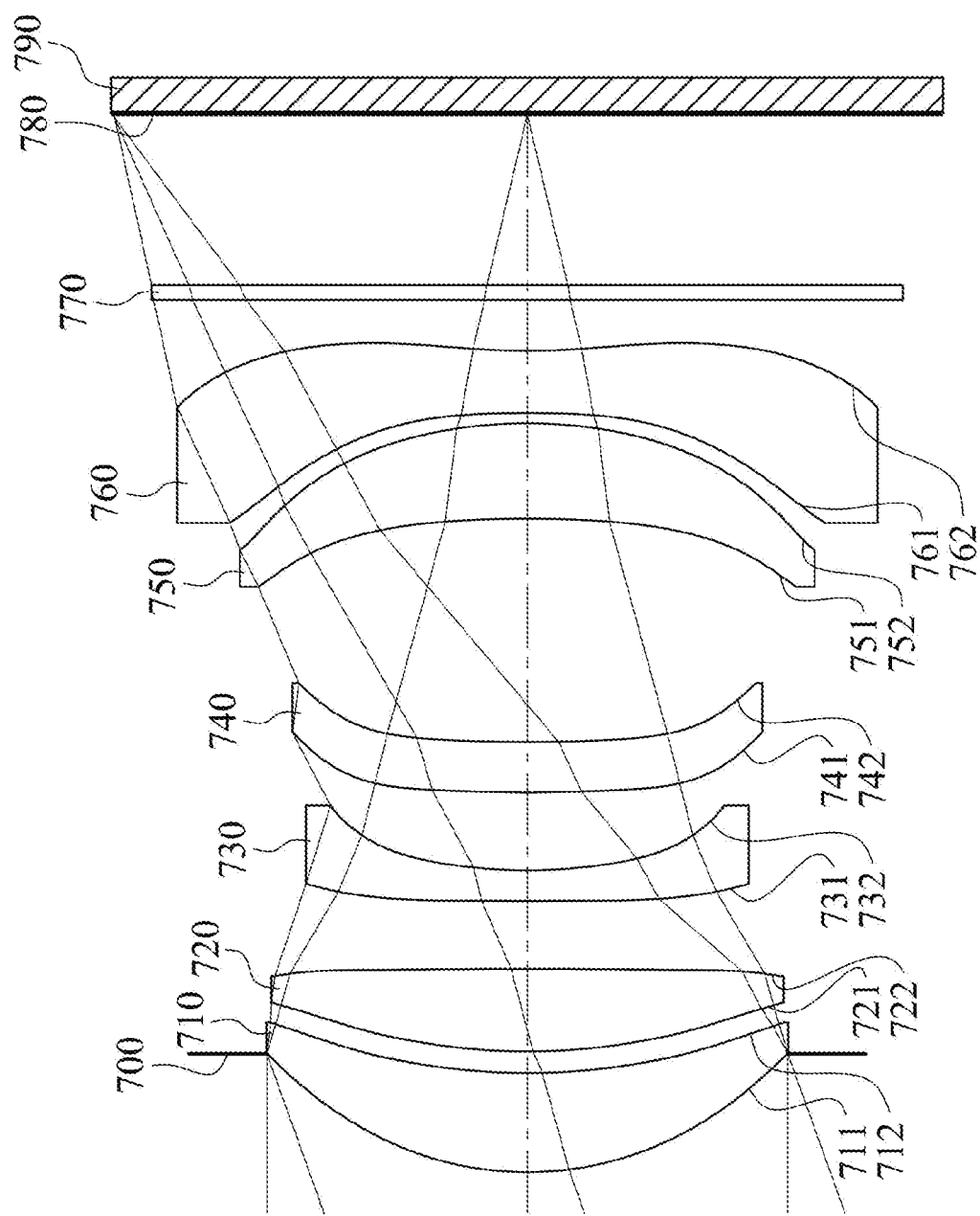
FIG. 13 is a schematic view of an imaging apparatus according to the 7th embodiment of the present disclosure.
Figure 14:
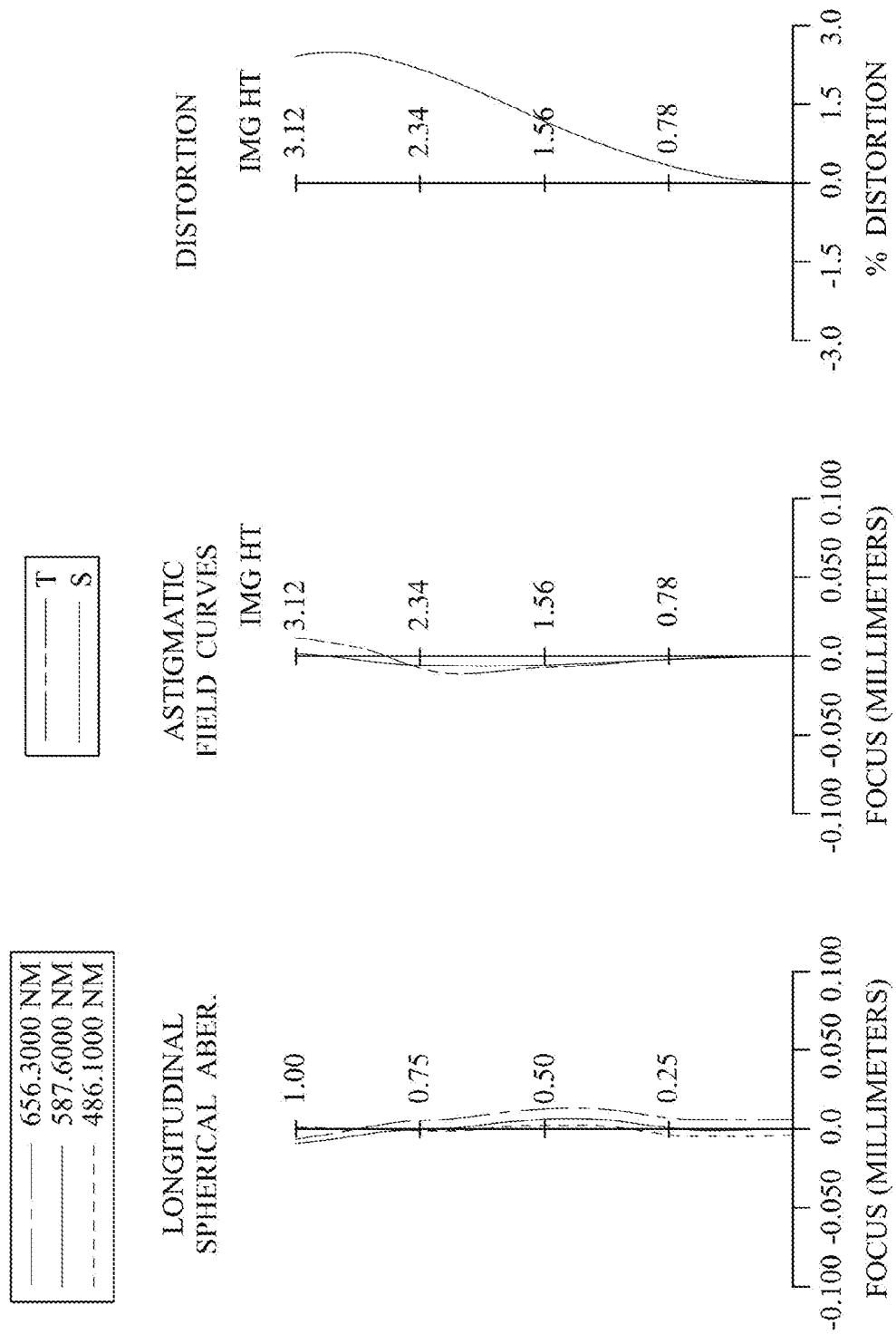
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an imaging lens assembly (its reference numeral is omitted) and an image sensor 790. The imaging lens assembly includes, in order from an object side to an image side, an aperture stop 700, a first lens element 710, a second lens element 720, a third lens element 730, a fourth lens element 740, a fifth lens element 750, a sixth lens element 760, a filter 770 and an image surface 780, wherein the image sensor 790 is disposed on the image surface 780 of the imaging lens assembly. The imaging lens assembly includes six lens elements (710, 720, 730, 740, 750, 760) with air gaps between every adjacent lens elements, and without additional one or more lens elements inserted between the first lens element 710 and the sixth lens element 760.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric. Furthermore, the image-side surface 752 of the fifth lens element 750 includes at least one convex shape in an off-axis region thereof.

The sixth lens element 760 with negative refractive power has an object-side surface 761 being concave in a paraxial region thereof and an image-side surface 762 being concave in a paraxial region thereof. The sixth lens element 760 is made of a plastic material, and has the object-side surface 761 and the image-side surface 762 being both aspheric. Furthermore, the object-side surface 761 of the sixth lens element 760 includes at least one convex shape in an off-axis region thereof, and the image-side surface 762 of the sixth lens element 760 includes at least one convex shape in an off-axis region thereof.

The filter 770 is made of a glass material and located between the sixth lens element 760 and the image surface 780, and will not affect the focal length of the imaging lens assembly.

The detailed optical data of the 7th embodiment are shown in Table 13 and the aspheric surface data are shown in Table 14 below.

TABLE 13

7th Embodiment
f = 8.50 mm, Fno = 2.17, HFOV = 19.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.893 | | | | |
| 2 | Lens 1 | 2.452 | ASP | 0.748 | Plastic | 1.535 | 56.3 | 8.49 |
| 3 | | 4.768 | ASP | 0.162 | | | | |
| 5 | Lens 2 | 4.557 | ASP | 0.623 | Plastic | 1.545 | 56.0 | 7.99 |
| 6 | | −90.606 | ASP | 0.510 | | | | |
| 7 | Lens 3 | 20.332 | ASP | 0.230 | Plastic | 1.688 | 18.7 | −6.09 |
| 8 | | 3.457 | ASP | 0.588 | | | | |
| 9 | Lens 4 | 9.899 | ASP | 0.380 | Plastic | 1.566 | 37.4 | 113.85 |
| 10 | | 11.534 | ASP | 1.682 | | | | |
| 11 | Lens 5 | −9.090 | ASP | 0.717 | Plastic | 1.688 | 18.7 | 8.14 |
| 12 | | −3.577 | ASP | 0.078 | | | | |
| 13 | Lens 6 | −9.657 | ASP | 0.466 | Plastic | 1.535 | 56.3 | −5.53 |
| 14 | | 4.333 | ASP | 0.386 | | | | |
| 15 | Filter | Plano | | 0.110 | Glass | 1.517 | 64.2 | — |
| 16 | | Plano | | 1.294 | | | | |
| 17 | Image | Plano | | — | | | | |

Reference wavelength is 587.6 nm (d-line).

TABLE 14

| Aspheric Coefficients | | | | | | |
|---|---|---|---|---|---|---|
| Surface # | 2 | 3 | 4 | 5 | 6 | 7 |
| k= | −3.7163E−01 | −3.6452E−01 | 2.7014E−01 | 8.1594E+00 | −6.1720E+01 | −2.6852E+01 |
| A4= | 1.1467E−03 | −8.5579E−04 | −2.2691E−03 | −2.0680E−03 | −5.8554E−02 | 3.3671E−03 |
| A6= | 2.7306E−04 | −8.2415E−04 | −1.0971E−02 | −3.2640E−03 | 8.2159E−02 | 3.9480E−02 |
| A8= | −2.1060E−04 | 8.3950E−03 | 1.1031E−02 | 6.4715E−03 | −4.0565E−02 | −1.8647E−03 |
| A10= | 1.7356E−04 | −2.7390E−03 | −3.5844E−03 | −3.2613E−03 | 9.9639E−03 | −5.0849E−03 |
| A12= | −3.6375E−05 | 2.8656E−04 | 3.2784E−04 | 6.1585E−04 | −1.1704E−03 | 1.5494E−03 |
| A14= | | | 1.0529E−05 | −3.9852E−05 | 4.9333E−05 | |
| Surface # | 8 | 9 | 10 | 11 | 12 | 13 |
| k= | 2.6611E+00 | −2.1816E+01 | −1.9268E+01 | −7.7384E−01 | −8.0953E+00 | −2.6636E+01 |
| A4= | −3.9509E−02 | −9.8488E−03 | −1.3031E−02 | 4.3734E−03 | −6.3981E−02 | −4.5892E−02 |
| A6= | 2.5548E−02 | 1.4653E−02 | −3.8902E−03 | −1.5431E−02 | 1.6858E−02 | 1.6150E−02 |
| A8= | 1.5240E−02 | 1.2333E−02 | 6.9325E−04 | 6.8390E−03 | −4.6835E−03 | −4.5752E−03 |
| A10= | −1.2175E−02 | −8.4174E−03 | 2.9684E−04 | −1.8379E−03 | 2.0202E−03 | 8.8586E−04 |
| A12= | 3.2530E−03 | 2.2318E−03 | −1.9120E−04 | 3.1720E−04 | −6.9924E−04 | −1.1575E−04 |
| A14= | −3.2926E−04 | −2.5162E−04 | 2.7183E−05 | −4.6196E−05 | 1.2151E−04 | 9.0071E−06 |
| A16= | | | | 4.2625E−06 | −7.8076E−06 | −3.1370E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 8.50 | f/f12 | 1.93 |
| Fno | 2.17 | f2/f5 | 0.98 |
| HFOV [deg] | 19.7 | |f/f5| + |f/f6| | 2.58 |
| V3 | 18.7 | f/ImgH | 2.73 |
| V5 | 18.7 | TL/ImgH | 2.56 |
| V5−V2 | −37.3 | EPD/ImgH | 1.26 |
| V5−V6 | −37.6 | EPD/TL | 0.49 |

-continued

| 7th Embodiment | | | |
|---|---|---|---|
| Nmax | 1.688 | TL/f | 0.94 |
| CT4/CT5 | 0.53 | f/EPD | 2.17 |
| (T34 + T45)/(CT3 + CT4) | 3.72 | SD/TD | 0.86 |
| (T12 + T23 + T56)/(T34 + T45) | 0.33 | Y11/Y62 | 0.74 |
| R1/f | 0.29 | | |

Furthermore, in the imaging lens assembly according to the 7th embodiment, there are two of the six lens elements of the imaging lens assembly having an Abbe number smaller than 25, 22, and 20, wherein the two lens elements are the third lens element 730 and the fifth lens element 750.

In the imaging lens assembly according to the 7th embodiment, a minimum of maximum effective diameters of object-side surfaces and image-side surfaces of the six lens elements is a maximum effective diameter of the image-side surface 732 of the third lens element 730.

In the imaging lens assembly according to the 7th embodiment, the inflection points of object-side surfaces and image-side surfaces of the six lens elements are listed in table below. The inflections mentioned are those disposed between the optical axis and the maximum effective diameter position of each lens element.

| Numbers of inflection points of 7th Embodiment | | | | | | |
|---|---|---|---|---|---|---|
| | Lens 1 | Lens 2 | Lens 3 | Lens 4 | Lens 5 | Lens 6 |
| Object-side surface | 1 | 2 | 2 | 1 | 1 | 1 |
| Image-side surface | 2 | 2 | 0 | 1 | 1 | 1 |

8th Embodiment

Figure 15:
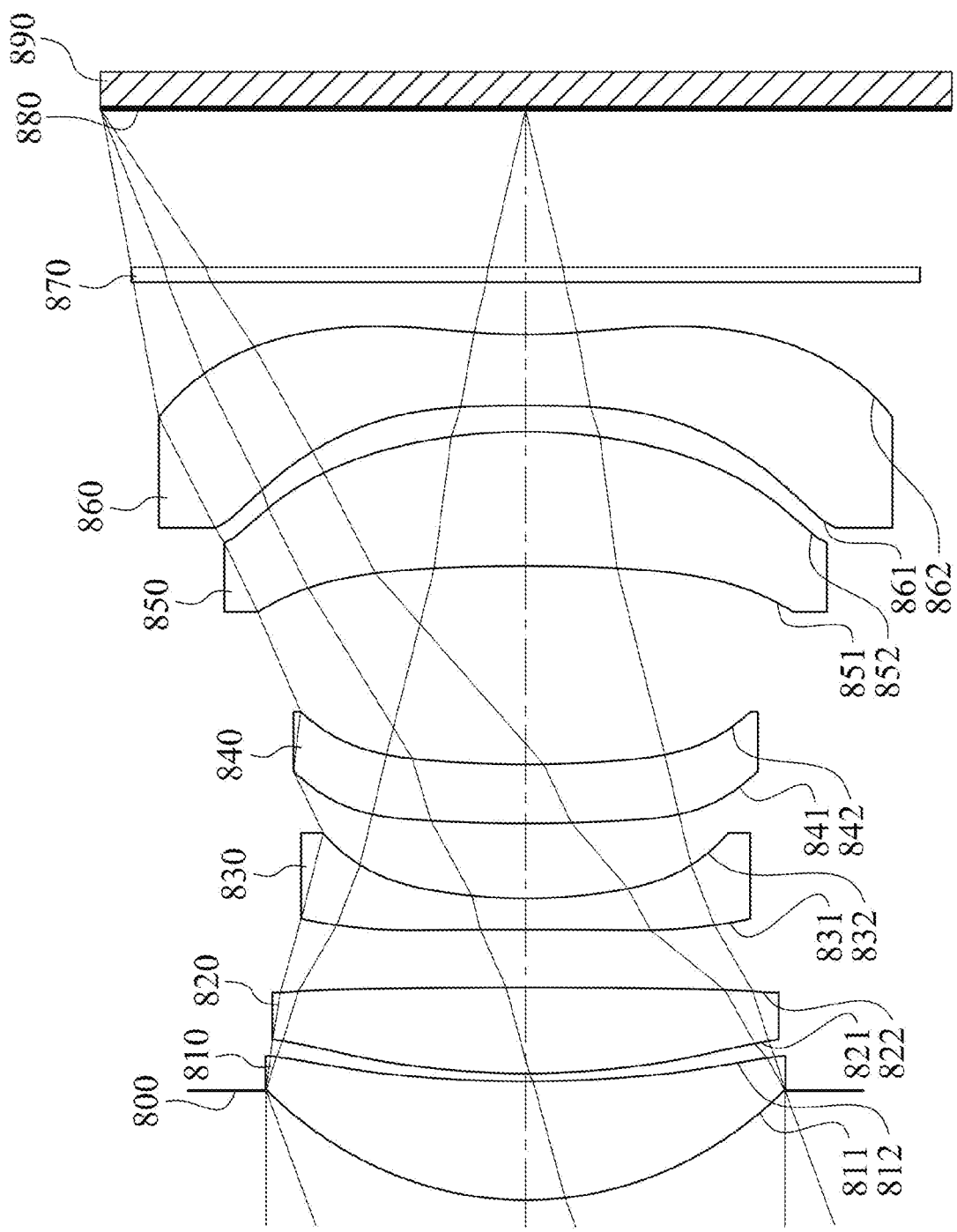
FIG. 15 is a schematic view of an imaging apparatus according to the 8th embodiment of the present disclosure.
Figure 16:
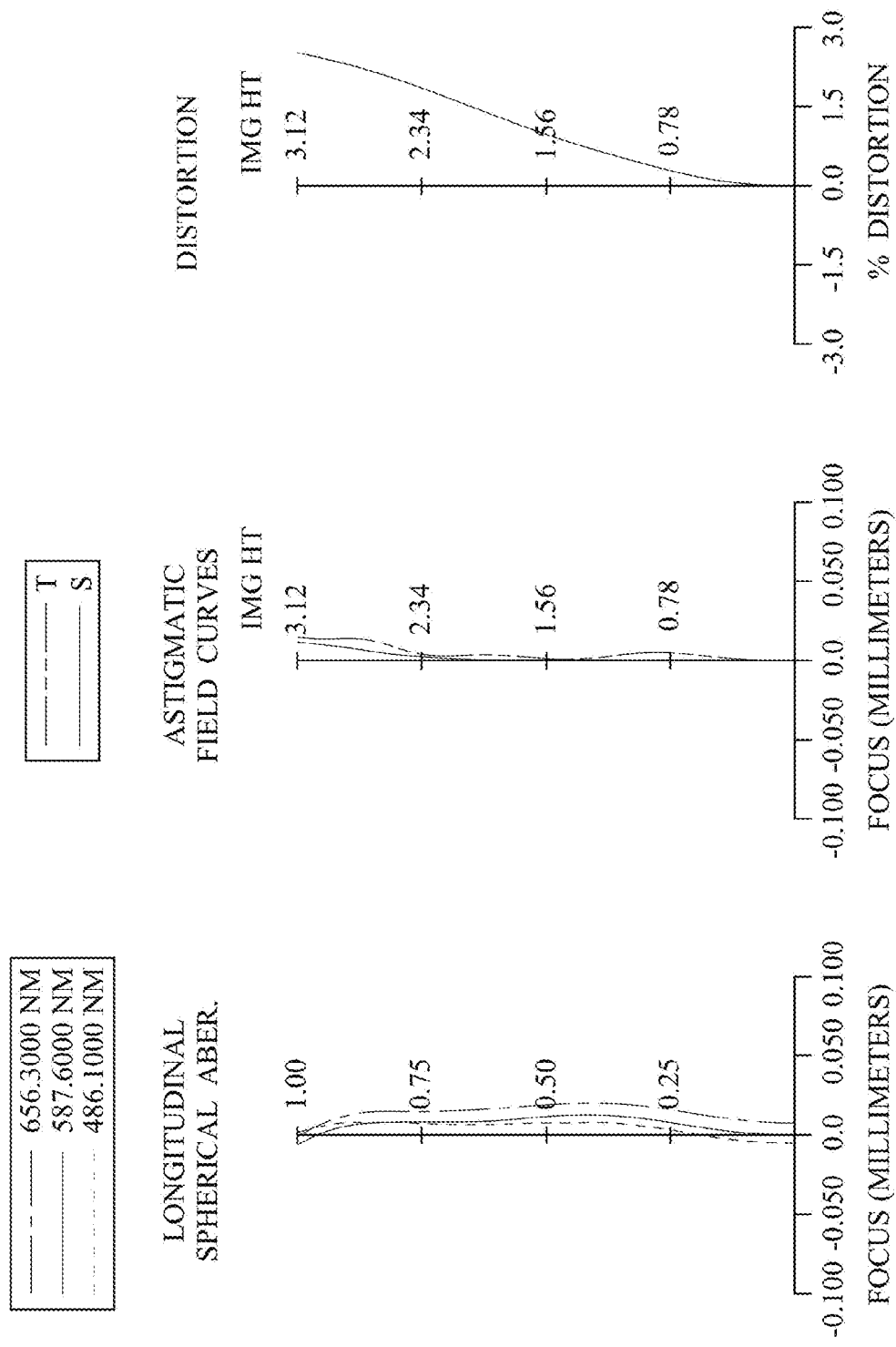
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an imaging lens assembly (its reference numeral is omitted) and an image sensor 890. The imaging lens assembly includes, in order from an object side to an image side, an aperture stop 800, a first lens element 810, a second lens element 820, a third lens element 830, a fourth lens element 840, a fifth lens element 850, a sixth lens element 860, a filter 870 and an image surface 880, wherein the image sensor 890 is disposed on the image surface 880 of the imaging lens assembly. The imaging lens assembly includes six lens elements (810, 820, 830, 840, 850, 860) with air gaps between every adjacent lens elements, and without additional one or more lens elements inserted between the first lens element 810 and the sixth lens element 860.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with positive refractive power has an object-side surface 821 being convex in a paraxial region thereof and an image-side surface 822 being convex in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric. Furthermore, the image-side surface 852 of the fifth lens element 850 includes at least one convex shape in an off-axis region thereof.

The sixth lens element 860 with negative refractive power has an object-side surface 861 being concave in a paraxial region thereof and an image-side surface 862 being concave in a paraxial region thereof. The sixth lens element 860 is made of a plastic material, and has the object-side surface 861 and the image-side surface 862 being both aspheric. Furthermore, the object-side surface 861 of the sixth lens element 860 includes at least one convex shape in an off-axis region thereof, and the image-side surface 862 of the sixth lens element 860 includes at least one convex shape in an off-axis region thereof.

The filter 870 is made of a glass material and located between the sixth lens element 860 and the image surface 880, and will not affect the focal length of the imaging lens assembly.

The detailed optical data of the 8th embodiment are shown in Table 15 and the aspheric surface data are shown in Table 16 below.

TABLE 15

8th Embodiment
f = 8.26 mm, Fno = 2.17, HFOV = 20.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.804 | | | | |
| 2 | Lens 1 | 2.558 | ASP | 0.872 | Plastic | 1.535 | 56.3 | 6.53 |
| 3 | | 8.451 | ASP | 0.060 | | | | |
| 4 | Lens 2 | 5.859 | ASP | 0.631 | Plastic | 1.545 | 56.0 | 9.99 |
| 5 | | −73.356 | ASP | 0.425 | | | | |
| 6 | Lens 3 | 65.636 | ASP | 0.230 | Plastic | 1.660 | 20.4 | −5.69 |
| 7 | | 3.548 | ASP | 0.551 | | | | |
| 8 | Lens 4 | 9.955 | ASP | 0.436 | Plastic | 1.566 | 37.4 | −142.80 |
| 9 | | 8.723 | ASP | 1.456 | | | | |
| 10 | Lens 5 | −14.791 | ASP | 0.988 | Plastic | 1.656 | 21.3 | 8.13 |
| 11 | | −4.023 | ASP | 0.192 | | | | |
| 12 | Lens 6 | −15.241 | ASP | 0.522 | Plastic | 1.535 | 56.3 | −5.86 |
| 13 | | 3.986 | ASP | 0.386 | | | | |

TABLE 15-continued

8th Embodiment
f = 8.26 mm, Fno = 2.17, HFOV = 20.2 deg.

| Surface # | | Curvature Radius | Thickness | Material | Index | Abbe # | Focal Length |
|---|---|---|---|---|---|---|---|
| 14 | Filter | Plano | 0.110 | Glass | 1.517 | 64.2 | — |
| 15 | | Plano | 1.166 | | | | |
| 16 | Image | Plano | — | | | | |

Reference wavelength is 587.6 (d-line).

TABLE 16

Aspheric Coefficients

| Surface # | 2 | 3 | 4 | 5 | 6 | 7 |
|---|---|---|---|---|---|---|
| k= | −3.5419E−01 | −5.9585E−01 | 3.1116E−01 | −8.9128E+01 | −6.1720E+01 | −2.4707E+01 |
| A4= | 4.2367E−04 | −1.1273E−02 | −1.0883E−02 | −3.0201E−03 | −6.2709E−02 | −8.0177E−03 |
| A6= | 9.2354E−04 | 7.3235E−03 | 4.8797E−03 | −1.3205E−03 | 9.0262E−02 | 5.8143E−02 |
| A8= | −5.0282E−04 | −8.2490E−05 | 1.8155E−03 | 5.3990E−03 | −4.6184E−02 | −1.3428E−02 |
| A10= | 2.0118E−04 | −8.0372E−04 | −1.3678E−03 | −3.2410E−03 | 1.1581E−02 | −1.6591E−03 |
| A12= | −2.9038E−05 | 1.2986E−04 | 8.7937E−05 | 6.8219E−04 | −1.3712E−03 | 9.6389E−04 |
| A14= | | | 2.3817E−05 | −4.3841E−05 | 6.0065E−05 | |

| Surface # | 8 | 9 | 10 | 11 | 12 | 13 |
|---|---|---|---|---|---|---|
| k= | 2.6611E+00 | −2.4606E+01 | −9.0000E+01 | −1.8355E+00 | −8.0953E+00 | −2.6636E+01 |
| A4= | −3.4070E−02 | −3.2438E−03 | −6.9975E−03 | 6.7887E−03 | −7.2120E−02 | −4.6404E−02 |
| A6= | 2.3703E−02 | 1.0787E−02 | −4.2729E−03 | −1.4718E−02 | 1.9075E−02 | 1.1480E−02 |
| A8= | 1.3839E−02 | 1.0748E−02 | 6.4669E−04 | 6.4135E−03 | −6.6528E−03 | −2.0682E−03 |
| A10= | −1.1259E−02 | −7.4668E−03 | 2.7213E−04 | −1.7072E−03 | 3.2491E−03 | 2.3544E−04 |
| A12= | 2.9994E−03 | 2.0665E−03 | −1.7226E−04 | 2.9032E−04 | −1.0511E−03 | −2.2507E−05 |
| A14= | −2.9602E−04 | −2.3002E−04 | 2.4069E−05 | −4.1662E−05 | 1.6159E−04 | 1.8777E−06 |
| A16= | | | | 3.7878E−06 | −8.9504E−06 | −8.5690E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.26 | f/f12 | 1.98 |
| Fno | 2.17 | f2/f5 | 1.23 |
| HFOV [deg] | 20.2 | \|f/f5\| + \|f/f6\| | 2.43 |
| V3 | 20.4 | f/ImgH | 2.65 |
| V5 | 21.3 | TL/ImgH | 2.57 |
| V5−V2 | −34.7 | EPD/ImgH | 1.22 |
| V5−V6 | −35.0 | EPD/TL | 0.47 |
| Nmax | 1.660 | TL/f | 0.97 |
| CT4/CT5 | 0.44 | f/EPD | 2.17 |
| (T34 + T45)/(CT3 + CT4) | 3.01 | SD/TD | 0.87 |
| (T12 + T23 + T56)/(T34 + T45) | 0.34 | Y11/Y62 | 0.71 |
| R1/f | 0.31 | | |

Furthermore, in the imaging lens assembly according to the 8th embodiment, there are two of the six lens elements of the imaging lens assembly having an Abbe number smaller than 25 and 22; wherein the two lens elements are the third lens element 830 and the fifth lens element 850.

In the imaging lens assembly according to the 8th embodiment, a minimum of maximum effective diameters of object-side surfaces and image-side surfaces of the six lens elements is a maximum effective diameter of the image-side surface 832 of the third lens element 830.

In the imaging lens assembly according to the 8th embodiment, the inflection points of object-side surfaces and image-side surfaces of the six lens elements are listed in table below. The inflections mentioned are those disposed between the optical axis and the maximum effective diameter position of each lens element.

Numbers of inflection points of 8th Embodiment

| | Lens 1 | Lens 2 | Lens 3 | Lens 4 | Lens 5 | Lens 6 |
|---|---|---|---|---|---|---|
| Object-side surface | 0 | 2 | 2 | 0 | 1 | 1 |
| Image-side surface | 2 | 3 | 0 | 0 | 1 | 1 |

9th Embodiment

Figure 17:
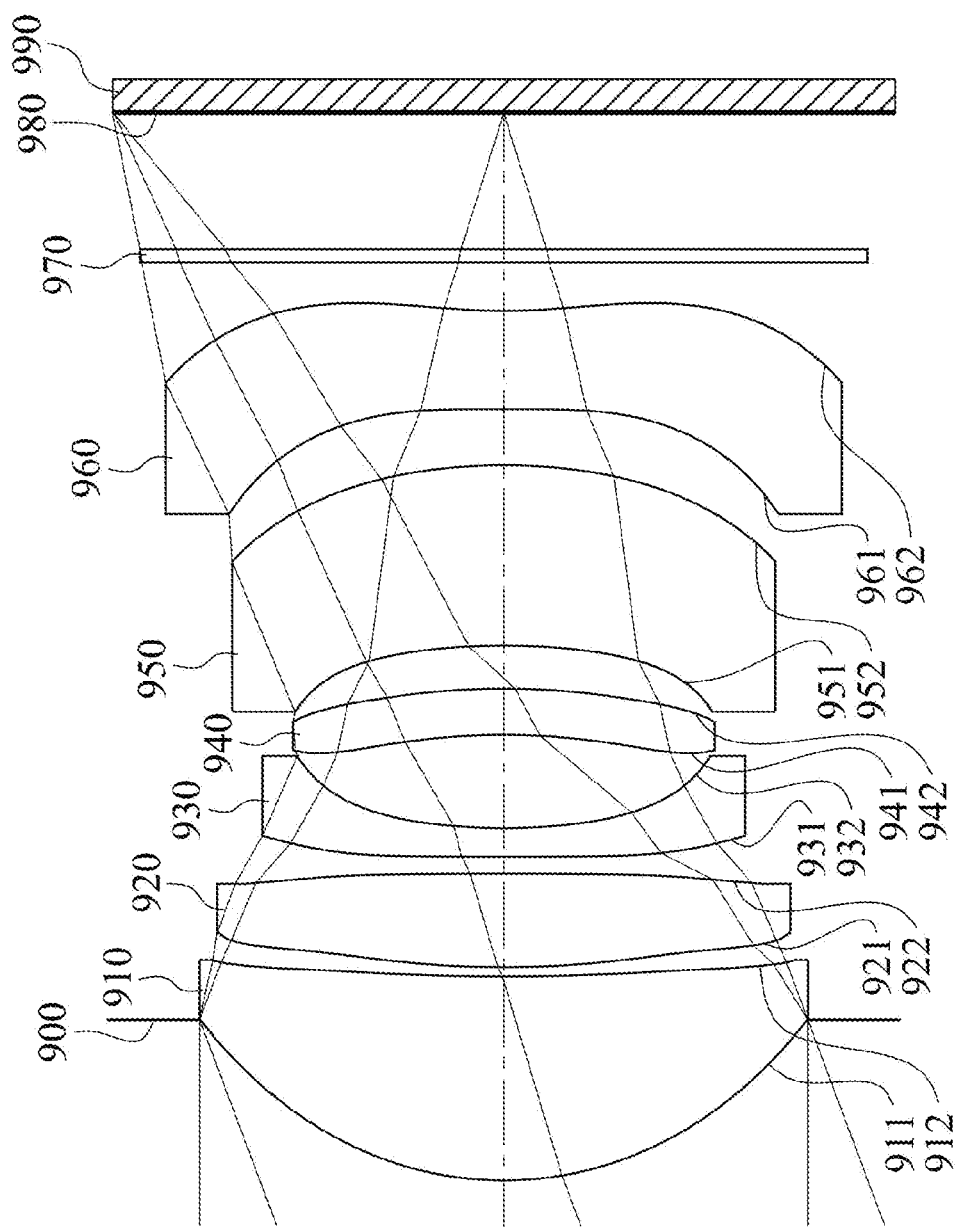
FIG. 17 is a schematic view of an imaging apparatus according to the 9th embodiment of the present disclosure.
Figure 18:
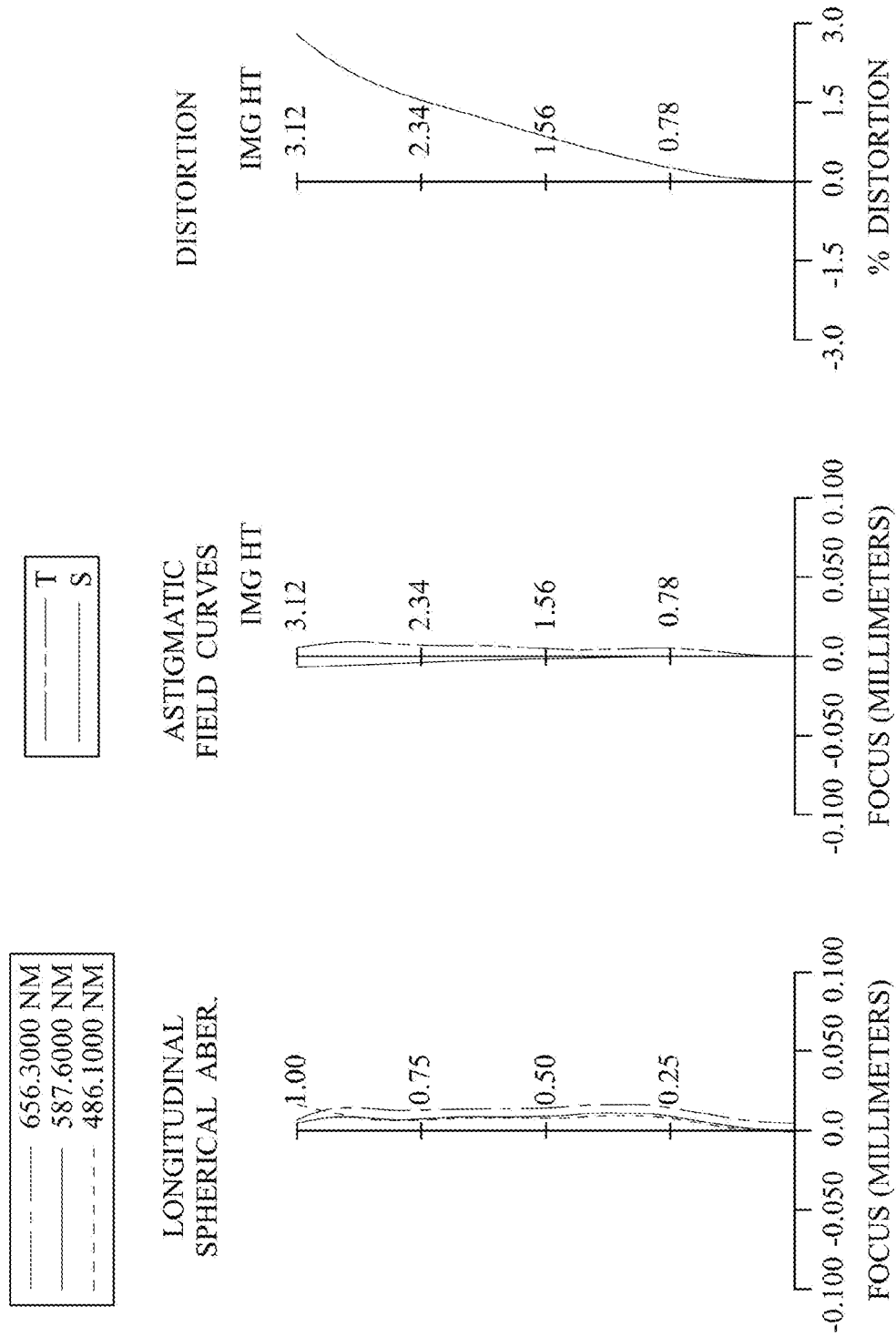
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an imaging lens assembly (its reference numeral is omitted) and an image sensor 990. The imaging lens assembly includes, in order from an object side an image side, an aperture stop 900, a first lens element 910, a second lens element 920, a third lens element 930, a fourth lens element 940, a fifth lens element 950, a sixth lens element 960, a filter 970 and an image surface 980, wherein the image sensor 990 is disposed on the image surface 980 of the imaging lens assembly. The imaging lens assembly includes six lens elements (910, 920, 930, 940, 950, 960) with air gaps between every adjacent lens elements, and without additional one or more lens elements inserted between the first lens element 910 and the sixth lens element 960.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of a plastic material, and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with negative refractive power has an object-side surface 941 being concave in a paraxial region thereof and an image-side surface 942 being convex in a paraxial region thereof. The fourth lens element 940 is made of a plastic material, and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of a plastic material, and has the object-side surface 951 and the image-side surface 952 being both aspheric. Furthermore, the image-side surface 952 of the fifth lens element 950 includes at least one convex shape in an off-axis region thereof.

The sixth lens element 960 with negative refractive power has an object-side surface 961 being convex in a paraxial region thereof and an image-side surface 962 being concave in a paraxial region thereof. The sixth lens element 960 is made of a plastic material, and has the object-side surface 961 and the image-side surface 962 being both aspheric. Furthermore, the object-side surface 961 of the sixth lens element 960 includes at least one convex shape in an off-axis region thereof, and the image-side surface 962 of the sixth lens element 960 includes at least one convex shape in an off-axis region thereof.

The filter 970 is made of a glass material and located between the sixth lens element 960 and the image surface 980, and will not affect the focal length of the imaging lens assembly.

The detailed optical data of the 9th embodiment are shown in Table 17 and the aspheric surface data are shown in Table 18 below.

TABLE 17

9th Embodiment
f = 8.12 mm, Fno = 1.67, HFOV = 20.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.287 | | | | |
| 2 | Lens 1 | 2.760 | ASP | 1.636 | Plastic | 1.545 | 56.0 | 5.63 |
| 3 | | 22.008 | ASP | 0.073 | | | | |
| 4 | Lens 2 | 8.208 | ASP | 0.750 | Plastic | 1.545 | 56.0 | 12.78 |
| 5 | | −44.393 | ASP | 0.134 | | | | |
| 6 | Lens 3 | 70.828 | ASP | 0.230 | Plastic | 1.688 | 18.7 | −7.05 |
| 7 | | 4.531 | ASP | 0.748 | | | | |
| 8 | Lens 4 | −5.518 | ASP | 0.370 | Plastic | 1.544 | 56.0 | −254.33 |
| 9 | | −5.883 | ASP | 0.344 | | | | |
| 10 | Lens 5 | −5.651 | ASP | 1.446 | Plastic | 1.688 | 18.7 | 25.12 |
| 11 | | −4.702 | ASP | 0.448 | | | | |
| 12 | Lens 6 | 143.447 | ASP | 0.787 | Plastic | 1.544 | 56.0 | −8.60 |
| 13 | | 4.520 | ASP | 0.386 | | | | |
| 14 | Filter | Plano | | 0.110 | Glass | 1.517 | 64.2 | — |
| 15 | | Plano | | 1.093 | | | | |
| 16 | Image | Plano | | — | | | | |

Reference wavelength is 587.6 nm (d-line).

TABLE 18

Aspheric Coefficients

| Surface # | 2 | 3 | 4 | 5 | 6 | 7 |
|---|---|---|---|---|---|---|
| k= | −3.2545E−01 | 1.7947E+01 | −3.1282E+00 | −3.7429E+00 | −6.1720E+01 | −3.0457E+01 |
| A4= | 5.5528E−04 | 6.2277E−03 | 8.7688E−03 | 8.2088E−03 | −6.7152E−03 | 2.8981E−02 |
| A6= | 1.9511E−04 | −4.5016E−03 | −5.4233E−03 | −9.6198E−03 | 1.5158E−02 | 2.8445E−03 |
| A8= | 1.1289E−05 | 4.5683E−04 | −1.2898E−03 | 3.4939E−03 | −4.8814E−03 | 4.9034E−03 |

TABLE 18-continued

Aspheric Coefficients

| | | | | | |
|---|---|---|---|---|---|
| A10= | −2.2263E−05 | 2.4827E−04 | 1.1226E−03 | −5.9667E−04 | 7.4927E−04 | −2.9957E−03 |
| A12= | 6.1950E−06 | −7.2065E−05 | −2.3554E−04 | 3.3219E−05 | −5.9472E−05 | 7.3101E−04 |
| A14= | −6.0889E−07 | 5.8670E−06 | 1.7714E−05 | 1.9009E−06 | 1.3205E−06 | |

| Surface # | 8 | 9 | 10 | 11 | 12 | 13 |
|---|---|---|---|---|---|---|
| k= | 2.6604E+00 | 9.9960E+00 | 8.7261E+00 | −2.2827E+00 | −8.0953E+00 | −2.6636E+01 |
| A4= | −1.0569E−02 | −1.5158E−03 | −6.6504E−03 | −1.9464E−02 | −8.1132E−02 | −3.7519E−02 |
| A6= | 1.9728E−02 | 2.1582E−02 | 6.2336E−03 | 1.1490E−02 | 3.4348E−02 | 9.7280E−03 |
| A8= | −6.1329E−03 | −1.2856E−02 | −9.0677E−03 | −6.6970E−03 | −1.3971E−02 | −2.5868E−03 |
| A10= | 3.7425E−04 | 3.7666E−03 | 3.9137E−03 | 2.2048E−03 | 4.0820E−03 | 4.7040E−04 |
| A12= | 3.9614E−04 | −6.5471E−04 | −1.2324E−03 | −4.8028E−04 | −8.3603E−04 | −5.6368E−05 |
| A14= | −5.3833E−05 | 6.9160E−05 | 1.5987E−04 | 6.2245E−05 | 1.0273E−04 | 3.9569E−06 |
| A16= | | | | −3.4780E−06 | −5.5572E−06 | −1.2328E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 8.12 | f/f12 | 1.93 |
| Fno | 1.67 | f2/f5 | 0.51 |
| HFOV [deg] | 20.5 | |f/f5| + |f/f6| | 1.27 |
| V3 | 18.7 | f/ImgH | 2.60 |
| V5 | 18.7 | TL/ImgH | 2.74 |
| V5-V2 | −37.3 | EPD/ImgH | 1.56 |
| V5-V6 | −37.3 | EPD/TL | 0.57 |
| Nmax | 1.688 | TL/f | 1.05 |
| CT4/CT5 | 0.26 | f/EPD | 1.67 |
| (T34 + T45)/(CT3 + CT4) | 1.82 | SD/TD | 0.82 |
| (T12 + T23 + T56)/(T34 + T45) | 0.60 | Y11/Y62 | 0.90 |
| R1/f | 0.34 | | |

Furthermore, in the imaging lens assembly according to the 9th embodiment, there are two of the six lens elements of the imaging lens assembly having an Abbe number smaller than 25, 22, and 20, wherein the two lens elements are the third lens element 930 and the fifth lens element 950.

In the imaging lens assembly according to the 9th embodiment, a minimum of maximum effective diameters of object-side surfaces and image-side surfaces of the six lens elements is a maximum effective diameter of the image-side surface 932 of the third lens element 930.

In the imaging lens assembly according to the 9th embodiment, the inflection points of object-side surfaces and image-side surfaces of the six lens elements are listed in table below. The inflections mentioned are those disposed between the optical axis and the maximum effective diameter position of each lens element.

| Numbers of inflection points of 9th Embodiment | | | | | | |
|---|---|---|---|---|---|---|
| | Lens 1 | Lens 2 | Lens 3 | Lens 4 | Lens 5 | Lens 6 |
| Object-side surface | 0 | 2 | 1 | 1 | 0 | 1 |
| Image-side surface | 2 | 1 | 0 | 0 | 0 | 1 |

10th Embodiment

Figure 19:
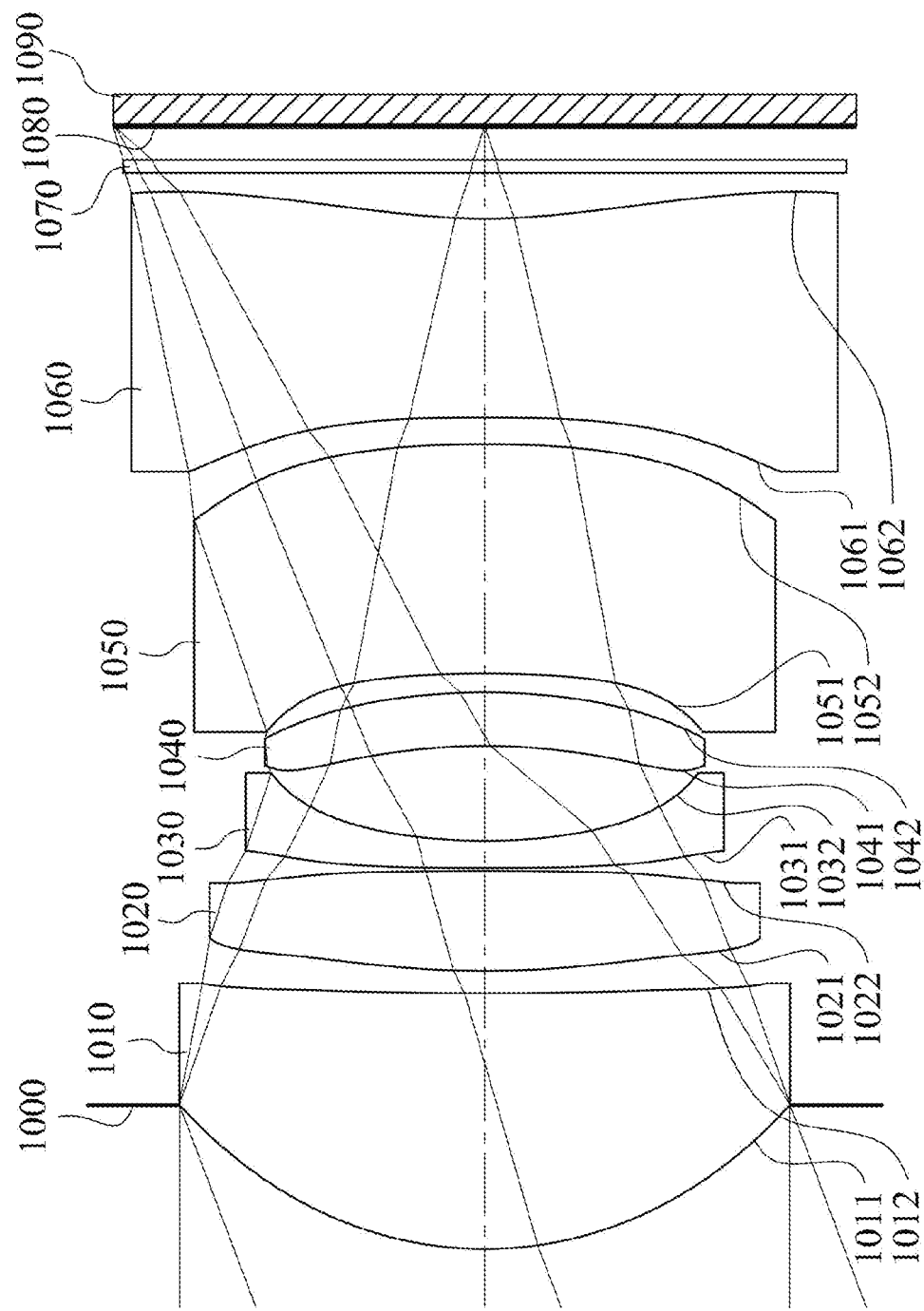
FIG. 19 is a schematic view of an imaging apparatus according to the 10th embodiment of the present disclosure.
Figure 20:
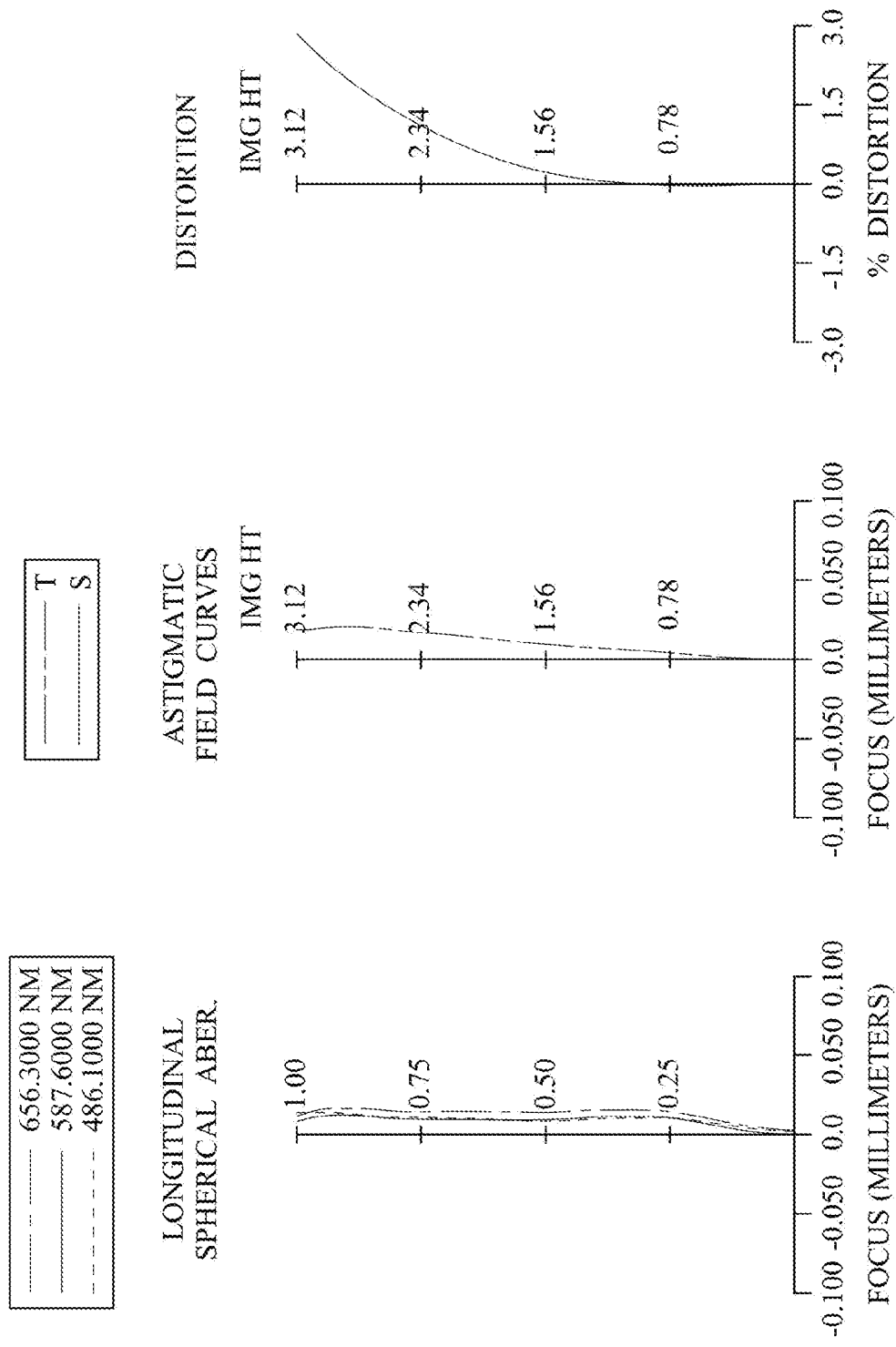
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an imaging lens assembly (its reference numeral is omitted) and an image sensor 1090. The imaging lens assembly includes, in order from an object side to an image side, an aperture stop 1000, a first lens element 1010, a second lens element 1020, a third lens element 1030, a fourth lens element 1040, a fifth lens element 1050, a sixth lens element 1060, a filter 1070 and an image surface 1080, wherein the image sensor 1090 is disposed on the image surface 1080 of the imaging lens assembly. The imaging lens assembly includes six lens elements (1010, 1020, 1030, 1040, 1050, 1060) with air gaps between every adjacent lens elements, and without additional one or more lens elements inserted between the first lens element 1010 and the sixth lens element 1060.

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with positive refractive power has an object-side surface 1021 being convex in a paraxial region thereof and an image-side surface 1022 being convex in a paraxial region thereof. The second lens element 1020 is made of a plastic material, and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric.

The fourth lens element 1040 with positive refractive power has an object-side surface 1041 being concave in a paraxial region thereof and an image-side surface 1042 being convex in a paraxial region thereof. The fourth lens element 1040 is made of a plastic material, and has the object-side surface 1041 and the image-side surface 1042 being both aspheric.

The fifth lens element 1050 with positive refractive power has an object-side surface 1051 being concave in a paraxial region thereof and an image-side surface 1052 being convex in a paraxial region thereof. The fifth lens element 1050 is made of a plastic material, and has the object-side surface 1051 and the image-side surface 1052 being both aspheric.

Furthermore, the image-side surface 1052 of the fifth lens element 1050 includes at least one convex shape in an off-axis region thereof.

The sixth lens element 1060 with negative refractive power has an object-side surface 1061 being concave in a paraxial region thereof and an image-side surface 1062 being concave in a paraxial region thereof. The sixth lens element 1060 is made of a plastic material, and has the object-side surface 1061 and the image-side surface 1062 being both aspheric. Furthermore, the object-side surface 1061 of the sixth lens element 1060 includes at least one convex shape in an off-axis region thereof, and the image-side surface 1062 of the sixth lens element 1060 includes at least one convex shape in an off-axis region thereof.

The filter 1070 is made of a glass material and located between the sixth lens element 1060 and the image surface 1080, and will not affect the focal length of the imaging lens assembly.

The detailed optical data of the 10th embodiment are shown in Table 19 and the aspheric surface data are shown in Table 20 below.

TABLE 19

10th Embodiment
f = 8.03 mm, Fno = 1.56, HFOV = 20.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.217 | | | | |
| 2 | Lens 1 | 3.169 | ASP | 2.160 | Plastic | 1.545 | 56.0 | 6.14 |
| 3 | | 45.693 | ASP | 0.188 | | | | |
| 4 | Lens 2 | 8.228 | ASP | 0.845 | Plastic | 1.545 | 56.0 | 12.43 |
| 5 | | −36.758 | ASP | 0.025 | | | | |
| 6 | Lens 3 | 115.379 | ASP | 0.230 | Plastic | 1.688 | 18.7 | −8.02 |
| 7 | | 5.264 | ASP | 0.800 | | | | |
| 8 | Lens 4 | −5.245 | ASP | 0.453 | Plastic | 1.544 | 56.0 | 221.16 |
| 9 | | −5.179 | ASP | 0.156 | | | | |
| 10 | Lens 5 | −11.155 | ASP | 1.937 | Plastic | 1.688 | 18.7 | 331.46 |
| 11 | | −11.388 | ASP | 0.224 | | | | |
| 12 | Lens 6 | −49.637 | ASP | 1.680 | Plastic | 1.544 | 56.0 | −8.42 |
| 13 | | 5.107 | ASP | 0.386 | | | | |
| 14 | Filter | Plano | | 0.110 | Glass | 1.517 | 64.2 | — |
| 15 | | Plano | | 0.285 | | | | |
| 16 | Image | Plano | | — | | | | |

Reference wavelength is 587.6 nm (d-line).

TABLE 20

Aspheric Coefficients

| Surface # | 2 | 3 | 4 | 5 | 6 | 7 |
|---|---|---|---|---|---|---|
| k= | −3.3226E−01 | 9.0000E+01 | −4.4249E+00 | 8.9524E+01 | −6.1720E+01 | −3.3431E+01 |
| A4= | 3.3189E−04 | 3.0900E−03 | 2.0030E−03 | 1.5642E−02 | 2.2570E−02 | 4.0116E−02 |
| A6= | 2.9693E−04 | −1.9967E−03 | −3.1375E−03 | −2.0561E−02 | −1.1594E−02 | −9.3848E−03 |
| A8= | −1.3109E−04 | 4.0856E−04 | 1.0737E−03 | 9.8677E−03 | 3.9850E−03 | 3.1615E−03 |
| A10= | 3.3812E−05 | −1.5245E−05 | 1.8556E−04 | −2.4715E−03 | −3.4516E−04 | −7.2844E−04 |
| A12= | −4.3967E−06 | −7.3732E−06 | −4.1890E−05 | 3.1306E−04 | −8.9432E−05 | 1.6595E−04 |
| A14= | 2.0982E−07 | 1.0264E−06 | 3.7169E−06 | −1.5144E−05 | 1.2678E−05 | |

| Surface # | 8 | 9 | 10 | 11 | 12 | 13 |
|---|---|---|---|---|---|---|
| k= | 3.3852E+00 | 6.1686E+00 | 7.1825E+00 | −2.7193E+00 | −8.0953E+00 | −2.6636E+01 |
| A4= | 2.2221E−03 | −1.7671E−03 | −1.7538E−02 | −2.3003E−02 | −3.8915E−02 | −2.6972E−03 |
| A6= | 8.7451E−03 | 2.0013E−02 | 1.0347E−02 | 1.2105E−02 | 1.9375E−02 | −8.8776E−04 |
| A8= | −6.0020E−03 | −1.6699E−02 | −1.0916E−02 | −5.1202E−03 | −6.8476E−03 | 4.8839E−04 |
| A10= | 1.8919E−03 | 6.2696E−03 | 4.0087E−03 | 1.1759E−03 | 1.4684E−03 | −1.1693E−04 |

TABLE 20-continued

| Aspheric Coefficients | | | | | |
|---|---|---|---|---|---|
| A12= | −1.8817E−04 | −1.1303E−03 | −8.0245E−04 | −1.5754E−04 | −1.9241E−04 | 1.5001E−05 |
| A14= | 1.6752E−05 | 9.0933E−05 | 6.3826E−05 | 1.1599E−05 | 1.4558E−05 | −1.0124E−06 |
| A16= | | | | −3.4148E−07 | −4.7839E−07 | 2.8425E−08 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 8.03 | f/f12 | 1.77 |
| Fno | 1.56 | f2/f5 | 0.04 |
| HFOV [deg] | 20.7 | \|f/f5\| + \|f/f6\| | 0.98 |
| V3 | 18.7 | f/ImgH | 2.57 |
| V5 | 18.7 | TL/ImgH | 3.04 |
| V5-V2 | −37.3 | EPD/ImgH | 1.65 |
| V5-V6 | −37.3 | EPD/TL | 0.54 |
| Nmax | 1.688 | TL/f | 1.18 |
| CT4/CT5 | 0.23 | f/EPD | 1.56 |
| (T34 + T45)/(CT3 + CT4) | 1.40 | SD/TD | 0.86 |
| (T12 + T23 + T56)/(T34 + T45) | 0.46 | Y11/Y62 | 0.86 |
| R1/f | 0.39 | | |

Furthermore, in the imaging lens assembly according to the 10th embodiment, there are two of the six lens elements of the imaging lens assembly having an Abbe number smaller than 25, 22, and 20, wherein the two lens elements are the third lens element 1030 and the fifth lens element 1050.

In the imaging lens assembly according to the 10th embodiment, a minimum of maximum effective diameters of object-side surfaces and image-side surfaces of the six lens elements is a maximum effective diameter of the image-side surface 1032 of the third lens element 1030.

In the imaging lens assembly according to the 10th embodiment, the inflection points of object-side surfaces and image-side surfaces of the six lens elements are listed in table below. The inflections mentioned are those disposed between the optical axis and the maximum effective diameter position of each lens element.

| Numbers of inflection points of 10th Embodiment | | | | | | |
|---|---|---|---|---|---|---|
| | Lens 1 | Lens 2 | Lens 3 | Lens 4 | Lens 5 | Lens 6 |
| Object-side surface | 0 | 2 | 1 | 1 | 0 | 1 |
| Image-side surface | 2 | 1 | 0 | 0 | 1 | 2 |

11th Embodiment

Figure 21:
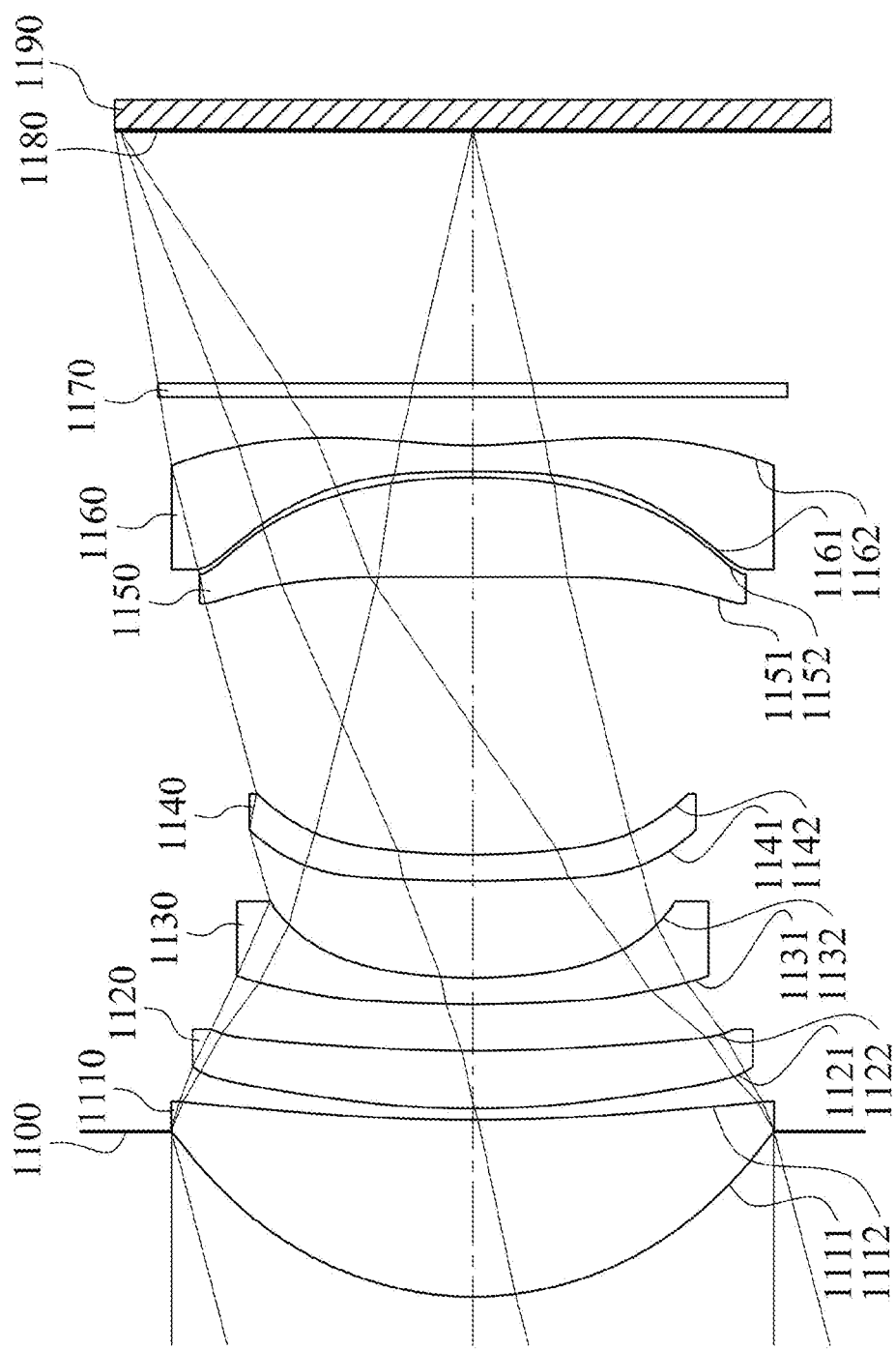
FIG. 21 is a schematic view of an imaging apparatus according to the 11th embodiment of the present disclosure.
Figure 22:
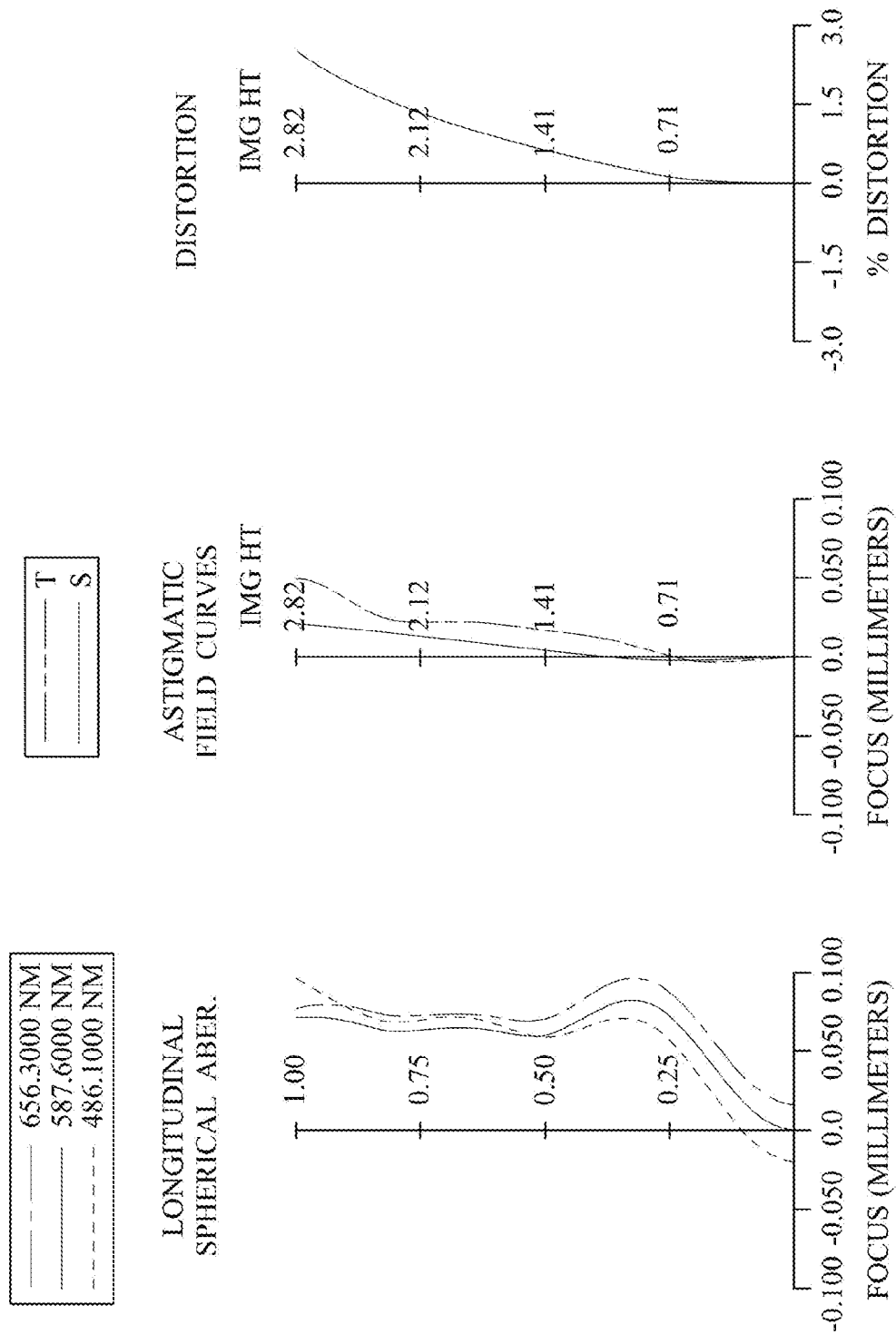
FIG. 22 shows spherical aberration curves, astigmatic field curves and a distortion curve of the imaging apparatus according to the 11th embodiment.

FIG. 21 is a schematic view of an imaging apparatus according to the 11th embodiment of the present disclosure. FIG. 22 shows spherical aberration curves, astigmatic field curves and a distortion curve of the imaging apparatus according to the 11th embodiment. In FIG. 21, the imaging apparatus includes an imaging lens assembly (its reference numeral is omitted) and an image sensor 1190. The imaging lens assembly includes, in order from an object side to an image side, an aperture stop 1100, a first lens element 1110, a second lens element 1120, a third lens element 1130, a fourth lens element 1140, a fifth lens element 1150, a sixth lens element 1160, a filter 1170 and an image surface 1180, wherein the image sensor 1190 is disposed on the image surface 1180 of the imaging lens assembly. The imaging lens assembly includes six lens elements (1110, 1120, 1130, 1140, 1150, 1160) with air gaps between every adjacent lens elements, and without additional one or more lens elements inserted between the first lens element 1110 and the sixth lens element 1160.

The first lens element 1110 with positive refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with positive refractive power has an object-side surface 1121 being convex in a paraxial region thereof and an image-side surface 1122 being concave in a paraxial region thereof. The second lens element 1120 is made of a plastic material, and has the object-side surface 1121 and the image-side surface 1122 being both aspheric.

The third lens element 1130 with negative refractive power has an object-side surface 1131 being convex in a paraxial region thereof and an image-side surface 1132 being concave in a paraxial region thereof. The third lens element 1130 is made of a plastic material, and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of a plastic material, and has the object-side surface 1141 and the image-side surface 1142 being both aspheric.

The fifth lens element 1150 with positive refractive power has an object-side surface 1151 being convex in a paraxial region thereof and an image-side surface 1152 being convex in a paraxial region thereof. The fifth lens element 1150 is made of a plastic material, and has the object-side surface 1151 and the image-side surface 1152 being both aspheric. Furthermore, the image-side surface 1152 of the fifth lens element 1150 includes at least one convex shape in an off-axis region thereof.

The sixth lens element 1160 with negative refractive power has an object-side surface 1161 being concave in a paraxial region thereof and an image-side surface 1162 being concave in a paraxial region thereof. The sixth lens element 1160 is made of a plastic material, and has the object-side surface 1161 and the image-side surface 1162 being both aspheric. Furthermore, the object-side surface 1161 of the sixth lens element 1160 includes at least one convex shape in an off-axis region thereof, and the image-side surface 1162 of the sixth lens element 1160 includes at least one convex shape in an off-axis region.

S The filter 1170 is made of a glass material and located between the sixth lens element 1160 and the image surface 1180, and will not affect the focal length of the imaging lens assembly.

The detailed optical data of the 11th embodiment are shown in Table 21 and the aspheric surface data are shown in Table 22 below.

Moreover, these parameters can be calculated from Table 21 and Table 22 as the following values and satisfy the following conditions:

| 11th Embodiment | | | |
|---|---|---|---|
| f [mm] | 10.40 | f/f12 | 2.00 |
| Fno | 2.16 | f2/f5 | 5.28 |
| HFOV [deg] | 14.7 | \|f/f5\| + \|f/f6\| | 3.47 |
| V3 | 19.5 | f/ImgH | 3.69 |

TABLE 21

11th Embodiment
f = 10.40 mm, Fno = 2.16, HFOV = 14.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.321 | | | | |
| 2 | Lens 1 | 2.716 | ASP | 1.415 | Plastic | 1.534 | 55.9 | 6.02 |
| 3 | | 14.367 | ASP | 0.090 | | | | |
| 4 | Lens 2 | 7.620 | ASP | 0.461 | Plastic | 1.530 | 55.8 | 33.42 |
| 5 | | 13.086 | ASP | 0.374 | | | | |
| 6 | Lens 3 | 9.711 | ASP | 0.210 | Plastic | 1.669 | 19.5 | −9.44 |
| 7 | | 3.792 | ASP | 0.777 | | | | |
| 8 | Lens 4 | 11.247 | ASP | 0.210 | Plastic | 1.669 | 19.5 | −16.87 |
| 9 | | 5.590 | ASP | 2.220 | | | | |
| 10 | Lens 5 | 53.897 | ASP | 0.798 | Plastic | 1.656 | 21.3 | 6.33 |
| 11 | | −4.475 | ASP | 0.045 | | | | |
| 12 | Lens 6 | −14.615 | ASP | 0.210 | Plastic | 1.534 | 55.9 | −5.70 |
| 13 | | 3.866 | ASP | 0.386 | | | | |
| 14 | Filter | Plano | | 0.110 | Glass | 1.517 | 64.2 | — |
| 15 | | Plano | | 2.023 | | | | |
| 16 | Image | Plano | | — | | | | |

Reference wavelength is 587.6 nm (d-line).

TABLE 22

Aspheric Coefficients

| Surface # | 2 | 3 | 4 | 5 | 6 | 7 |
|---|---|---|---|---|---|---|
| k= | −3.0541E−01 | −1.3550E+00 | 5.5434E−01 | −4.0528E+01 | −6.1720E+01 | −2.3703E+01 |
| A4= | 3.3735E−04 | −4.5316E−03 | −1.1436E−03 | 5.6208E−03 | −2.7916E−02 | 2.0088E−02 |
| A6= | 4.0415E−04 | 2.3189E−03 | 2.0996E−03 | −9.1294E−03 | 2.4191E−02 | 2.6720E−03 |
| A8= | −9.1012E−05 | −6.3084E−04 | −3.5058E−03 | 3.3325E−03 | 5.9429E−03 | 2.9096E−02 |
| A10= | 3.3120E−05 | 6.2404E−05 | 1.5847E−03 | 3.6745E−05 | −8.9680E−03 | −1.7707E−02 |
| A12= | −3.9586E−06 | −1.0855E−06 | −3.0644E−04 | −2.1255E−04 | 2.5606E−03 | 3.0088E−03 |
| A14= | | | 2.2865E−05 | 2.9494E−05 | −2.3149E−04 | 6.7013E−05 |

| Surface # | 8 | 9 | 10 | 11 | 12 | 13 |
|---|---|---|---|---|---|---|
| k= | 2.6611E+00 | −2.3939E+01 | 5.0832E+01 | −1.6046E+00 | −8.0953E+00 | −2.6636E+01 |
| A4= | −4.4231E−02 | −1.9775E−02 | −1.7932E−02 | −8.7348E−04 | −8.3593E−02 | −5.5660E−02 |
| A6= | 4.9600E−02 | 3.9137E−02 | 2.9051E−03 | −1.4540E−02 | 3.1311E−02 | 2.4128E−02 |
| A8= | −6.8524E−03 | −5.5404E−02 | −1.5031E−03 | 7.5180E−03 | −1.2127E−02 | −7.9634E−03 |
| A10= | −4.3321E−03 | −3.6524E−03 | 6.8085E−04 | −2.1418E−03 | 4.6110E−03 | 1.8023E−03 |
| A12= | 1.9039E−03 | 1.7586E−03 | −1.7707E−04 | 3.8114E−04 | −1.2607E−03 | −2.6351E−04 |
| A14= | −2.2628E−04 | −2.3961E−04 | 1.8130E−05 | −5.7232E−05 | 1.8134E−04 | 2.2458E−05 |
| A16= | | | | 5.4449E−06 | −9.5809E−06 | −8.5264E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

-continued

| 11th Embodiment | | | |
|---|---|---|---|
| V5 | 21.3 | TL/ImgH | 3.31 |
| V5-V2 | −34.5 | EPD/ImgH | 1.71 |
| V5-V6 | −34.6 | EPD/TL | 0.52 |

-continued

11th Embodiment

| Nmax | 1.669 | TL/f | 0.90 |
|---|---|---|---|
| CT4/CT5 | 0.26 | f/EPD | 2.16 |
| (T34 + T45)/(CT3 + CT4) | 7.14 | SD/TD | 0.81 |
| (T12 + T23 + T56)/(T34 + T45) | 0.17 | Y11/Y62 | 1.00 |
| R1/f | 0.26 | | |

Furthermore, in the imaging lens assembly according to the 11th embodiment, there are three of the six lens elements of the imaging lens assembly having an Abbe number smaller than 25 and 22, wherein the three lens elements are the third lens element 1130, the fourth lens element 1140 and the fifth lens element 1150. Moreover, there are two of the six lens elements of the imaging lens assembly having an Abbe number smaller than 20, wherein the two lens elements are the third lens element 1130 and the fourth lens element 1140.

In the imaging lens assembly according to the 11th embodiment, a minimum of maximum effective diameters of object-side surfaces and image-side surfaces of the six lens elements is a maximum effective diameter of the image-side surface 1132 of the third lens element 1130.

In the imaging lens assembly according to the 11th embodiment, the inflection points of object-side surfaces and image-side surfaces of the six lens elements are listed in table below. The inflections mentioned are those disposed between the optical axis and the maximum effective diameter position of each lens element.

Numbers of inflection points of 11th Embodiment

| | Lens 1 | Lens 2 | Lens 3 | Lens 4 | Lens 5 | Lens 6 |
|---|---|---|---|---|---|---|
| Object-side surface | 0 | 0 | 0 | 0 | 2 | 1 |
| Image-side surface | 2 | 0 | 0 | 1 | 1 | 1 |

12th Embodiment

Figure 23:
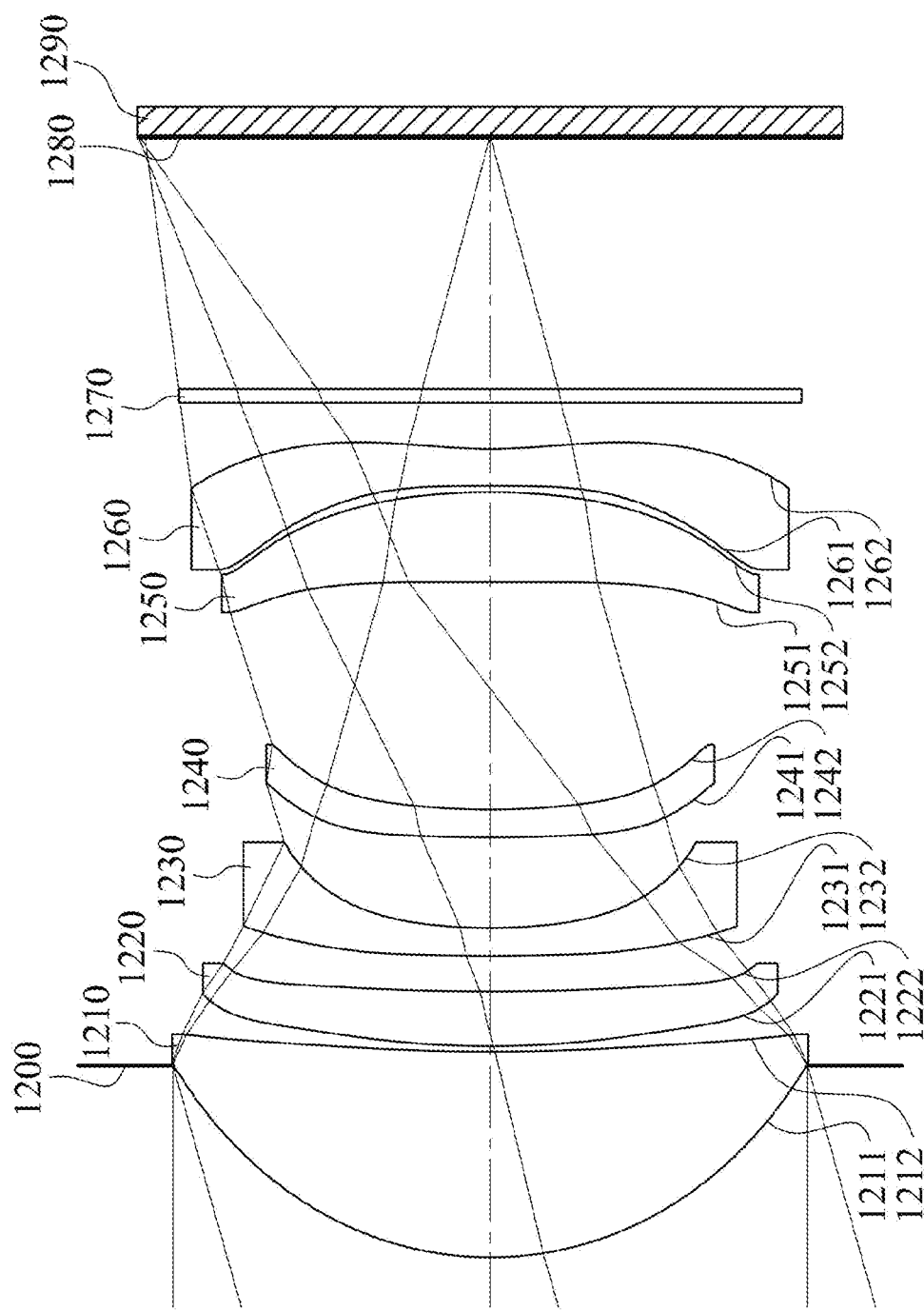
FIG. 23 is a schematic view of an imaging apparatus according to the 12th embodiment of the present disclosure.
Figure 24:
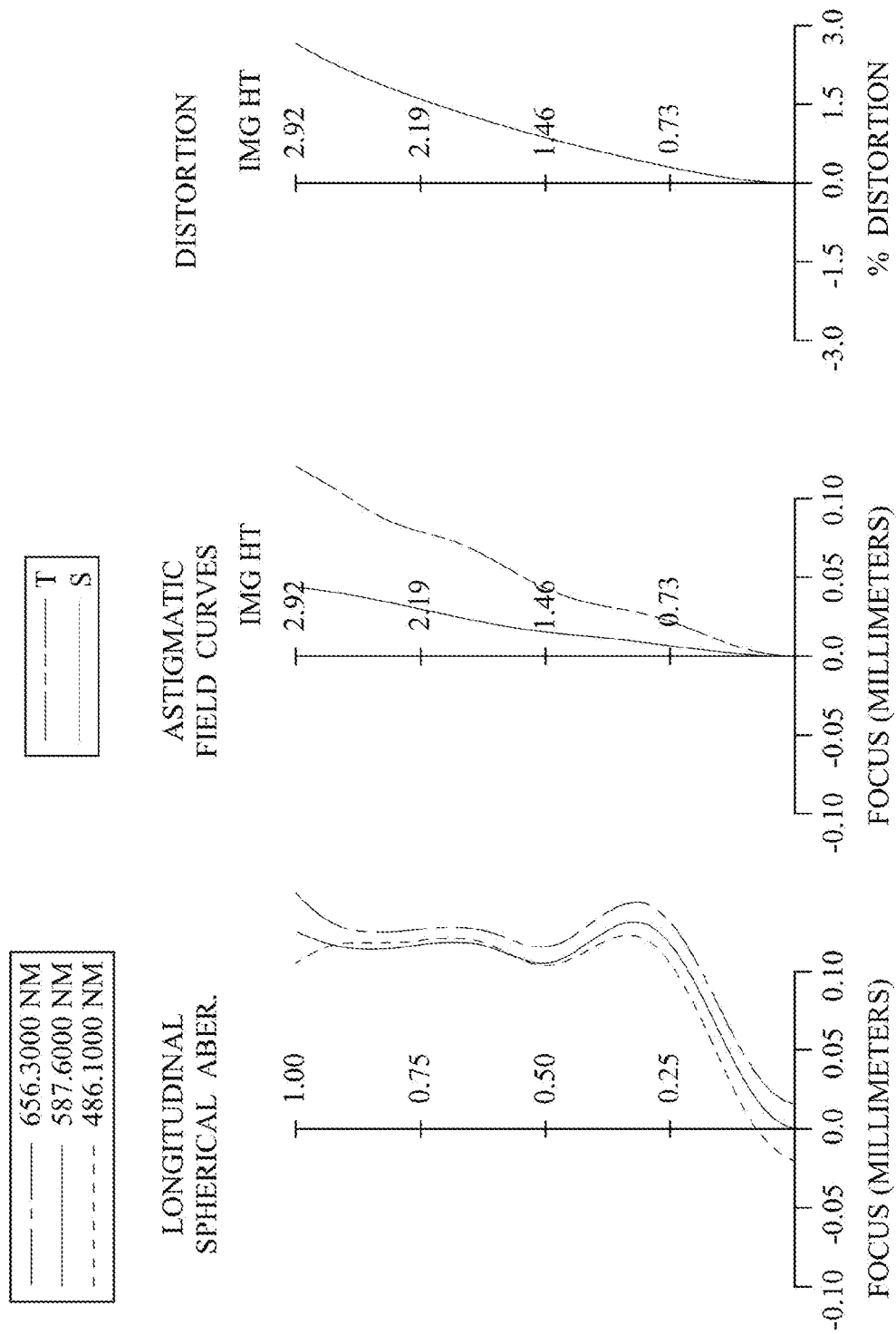
FIG. 24 shows spherical aberration curves, astigmatic field curves and a distortion curve of the imaging apparatus according to the 12th embodiment.

FIG. 23 is a schematic view of an imaging apparatus according to the 12th embodiment of the present disclosure. FIG. 24 shows spherical aberration curves, astigmatic field curves and a distortion curve of the imaging apparatus according to the 12th embodiment. In FIG. 23, the imaging apparatus includes an imaging lens assembly (its reference numeral is omitted) and an image sensor 1290. The imaging lens assembly includes, in order from an object side to an image side, an aperture stop 1200, a first lens element 1210, a second lens element 1220, a third lens element 1230, a fourth lens element 1240, a fifth lens element 1250, a sixth lens element 1260, a filter 1270 and an image surface 1280, wherein the image sensor 1290 is disposed on the image surface 1280 of the imaging lens assembly. The imaging lens assembly includes six lens elements (1210, 1220, 1230, 1240, 1250, 1260) with air gaps between every adjacent lens elements, and without additional one or more lens elements inserted between the first lens element 1210 and the sixth lens element 1260.

The first lens element 1210 with positive refractive power has an object-side surface 1211 being convex in a paraxial region thereof and an image-side surface 1212 being concave in a paraxial region thereof. The first lens element 1210 is made of a plastic material, and has the object-side surface 1211 and the image-side surface 1212 being both aspheric.

The second lens element 1220 with positive refractive power has an object-side surface 1221 being convex in a paraxial region thereof and an image-side surface 1222 being concave in a paraxial region thereof. The second lens element 1220 is made of a plastic material, and has the object-side surface 1221 and the image-side surface 1222 being both aspheric.

The third lens element 1230 with negative refractive power has an object-side surface 1231 being convex in a paraxial region thereof and an image-side surface 1232 being concave in a paraxial region thereof. The third lens element 1230 is made of a plastic material, and has the object-side surface 1231 and the image-side surface 1232 being both aspheric.

The fourth lens element 1240 with negative refractive power has an object-side surface 1241 being convex in a paraxial region thereof and an image-side surface 1242 being concave in a paraxial region thereof. The fourth lens element 1240 is made of a plastic material, and has the object-side surface 1241 and the image-side surface 1242 being both aspheric.

The fifth lens element 1250 with positive refractive power has an object-side surface 1251 being convex in a paraxial region thereof and an image-side surface 1252 being convex in a paraxial region thereof. The fifth lens element 1250 is made of a plastic material, and has the object-side surface 1251 and the image-side surface 1252 being both aspheric. Furthermore, the image-side surface 1252 of the fifth lens element 1250 includes at least one convex shape in an off-axis region thereof.

The sixth lens element 1260 with negative refractive power has an object-side surface 1261 being concave in a paraxial region thereof and an image-side surface 1262 being concave in a paraxial region thereof. The sixth lens element 1260 is made of a plastic material, and has the object-side surface 1261 and the image-side surface 1262 being both aspheric. Furthermore, the object-side surface 1261 of the sixth lens element 1260 includes at least one convex shape in an off-axis region thereof, and the image-side surface 1262 of the sixth lens element 1260 includes at least one convex shape in an off-axis region thereof.

The filter 1270 is made of a glass material and located between the sixth lens element 1260 and the image surface 1280, and will not affect the focal length of the imaging lens assembly.

The detailed optical data of the 12th embodiment are shown in Table 23 and the aspheric surface data are shown in Table 24 below.

TABLE 23

12th Embodiment
f = 9.91 mm, Fno = 1.88, HFOV = 15.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.595 | | | | |
| 2 | Lens 1 | 2.795 | ASP | 1.712 | Plastic | 1.534 | 55.9 | 6.02 |
| 3 | | 16.931 | ASP | 0.045 | | | | |
| 4 | Lens 2 | 7.870 | ASP | 0.454 | Plastic | 1.529 | 45.4 | 26.07 |
| 5 | | 17.959 | ASP | 0.297 | | | | |
| 6 | Lens 3 | 13.552 | ASP | 0.230 | Plastic | 1.669 | 19.5 | −8.71 |
| 7 | | 4.046 | ASP | 0.756 | | | | |
| 8 | Lens 4 | 11.615 | ASP | 0.230 | Plastic | 1.669 | 19.5 | −16.54 |
| 9 | | 5.620 | ASP | 1.892 | | | | |
| 10 | Lens 5 | 116.242 | ASP | 0.748 | Plastic | 1.688 | 18.7 | 7.34 |
| 11 | | −5.268 | ASP | 0.052 | | | | |
| 12 | Lens 6 | −43.124 | ASP | 0.307 | Plastic | 1.529 | 45.4 | −7.21 |
| 13 | | 2.795 | ASP | 1.712 | | | | |
| 14 | Filter | Plano | | 0.110 | Glass | 1.517 | 64.2 | — |
| 15 | | Plano | | 2.097 | | | | |
| 16 | Image | Plano | | — | | | | |

Reference wavelength is 587.6 nm (d-line).

TABLE 24

Aspheric Coefficients

| Surface # | 2 | 3 | 4 | 5 | 6 | 7 |
|---|---|---|---|---|---|---|
| k= | −3.0656E−01 | −6.1867E−01 | 6.0770E−01 | −4.0197E+01 | −6.1720E+01 | −2.3412E+01 |
| A4= | 4.4255E−04 | −1.4016E−03 | −3.8893E−03 | −1.2200E−02 | −4.2716E−02 | 1.4655E−02 |
| A6= | 1.5299E−04 | −3.8580E−04 | 8.6702E−04 | 1.9546E−02 | 5.9458E−02 | 2.1640E−02 |
| A8= | −2.7032E−05 | 6.1514E−05 | −7.3642E−03 | −1.4036E−02 | −2.7506E−02 | 9.0358E−03 |
| A10= | 1.4121E−05 | 7.5536E−06 | 2.4360E−03 | 4.9007E−03 | 5.9562E−03 | −1.0369E−02 |
| A12= | −1.4822E−06 | −1.0780E−06 | −3.7238E−04 | −8.3733E−04 | −5.7901E−04 | 2.6703E−03 |
| A14= | | | 2.4908E−05 | 6.0921E−05 | 1.8576E−05 | −1.5677E−04 |
| A16= | | | −3.5711E−07 | −5.6853E−07 | | |

| Surface # | 8 | 9 | 10 | 11 | 12 | 13 |
|---|---|---|---|---|---|---|
| k= | 2.6611E+00 | −2.7027E+01 | −9.0000E+01 | −2.5409E+00 | −8.0953E+00 | −2.6636E+01 |
| A4= | −3.6048E−02 | −1.2160E−02 | −1.1525E−02 | −1.6424E−03 | −8.3415E−02 | −5.5736E−02 |
| A6= | 4.0449E−02 | 2.7905E−02 | −1.9419E−03 | −1.2515E−02 | 3.4349E−02 | 2.4144E−02 |
| A8= | −4.4128E−03 | −8.8508E−04 | 2.4817E−04 | 6.4141E−03 | −1.5392E−02 | −9.0945E−03 |
| A10= | −3.9262E−03 | −4.5363E−03 | 2.9694E−03 | −1.7630E−03 | 6.1106E−03 | 2.4106E−03 |
| A12= | 1.6028E−03 | 1.8276E−03 | −1.3474E−04 | 3.0175E−04 | −1.5977E−03 | −4.1407E−04 |
| A14= | −1.8795E−04 | −2.3592E−04 | 1.6474E−05 | −4.3581E−05 | 2.1922E−04 | 4.0694E−05 |
| A16= | | | | 3.9878E−06 | −1.1481E−05 | −1.7213E−06 |

In the 12th embodiment, the equation of the aspheric surface profiles of the aforementioned lens elements is the same as the equation of the 1st embodiment. Also) the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 9.91 | f/f12 | 1.96 |
| Fno | 1.88 | f2/f5 | 3.55 |
| HFOV [deg] | 15.8 | |f/f5| + |f/f6| | 2.72 |
| V3 | 19.5 | f/ImgH | 3.39 |
| V5 | 18.7 | TL/ImgH | 3.19 |
| V5-V2 | −26.7 | EPD/ImgH | 1.80 |
| V5-V6 | −26.7 | EPD/TL | 0.57 |
| Nmax | 1.688 | TL/f | 0.94 |
| CT4/CT5 | 0.31 | f/EPD | 1.88 |
| (T34 + T45)/(CT3 + CT4) | 5.76 | SD/TD | 0.76 |
| (T12 + T23 + T56)/(T34 + T45) | 0.15 | Y11/Y62 | 1.06 |
| R1/f | 0.28 | | |

Furthermore, in the imaging lens assembly according to the 12th embodiment, there are three of the six lens elements of the imaging lens assembly having an Abbe number smaller than 25, 22, and 20, wherein the three lens elements are the third lens element 1230, the fourth lens element 1240, and the fifth lens element 1250.

In the imaging lens assembly according to the 12th embodiment, a minimum of maximum effective diameters of object-side surfaces and image-side surfaces of the six lens elements is a maximum effective diameter of the image-side surface 1232 of the third lens element 1230.

In the imaging lens assembly according to the 12th embodiment, the inflection points of object-side surfaces and image-side surfaces of the six lens elements are listed in table below. The inflections mentioned are those disposed between the optical axis and the maximum effective diameter position of each lens element.

| Numbers of inflection points of 12th Embodiment | | | | | | |
|---|---|---|---|---|---|---|
| | Lens 1 | Lens 2 | Lens 3 | Lens 4 | Lens 5 | Lens 6 |
| Object-side surface | 0 | 2 | 0 | 1 | 2 | 1 |
| Image-side surface | 1 | 0 | 0 | 1 | 1 | 1 |

13th Embodiment

Figure 28:
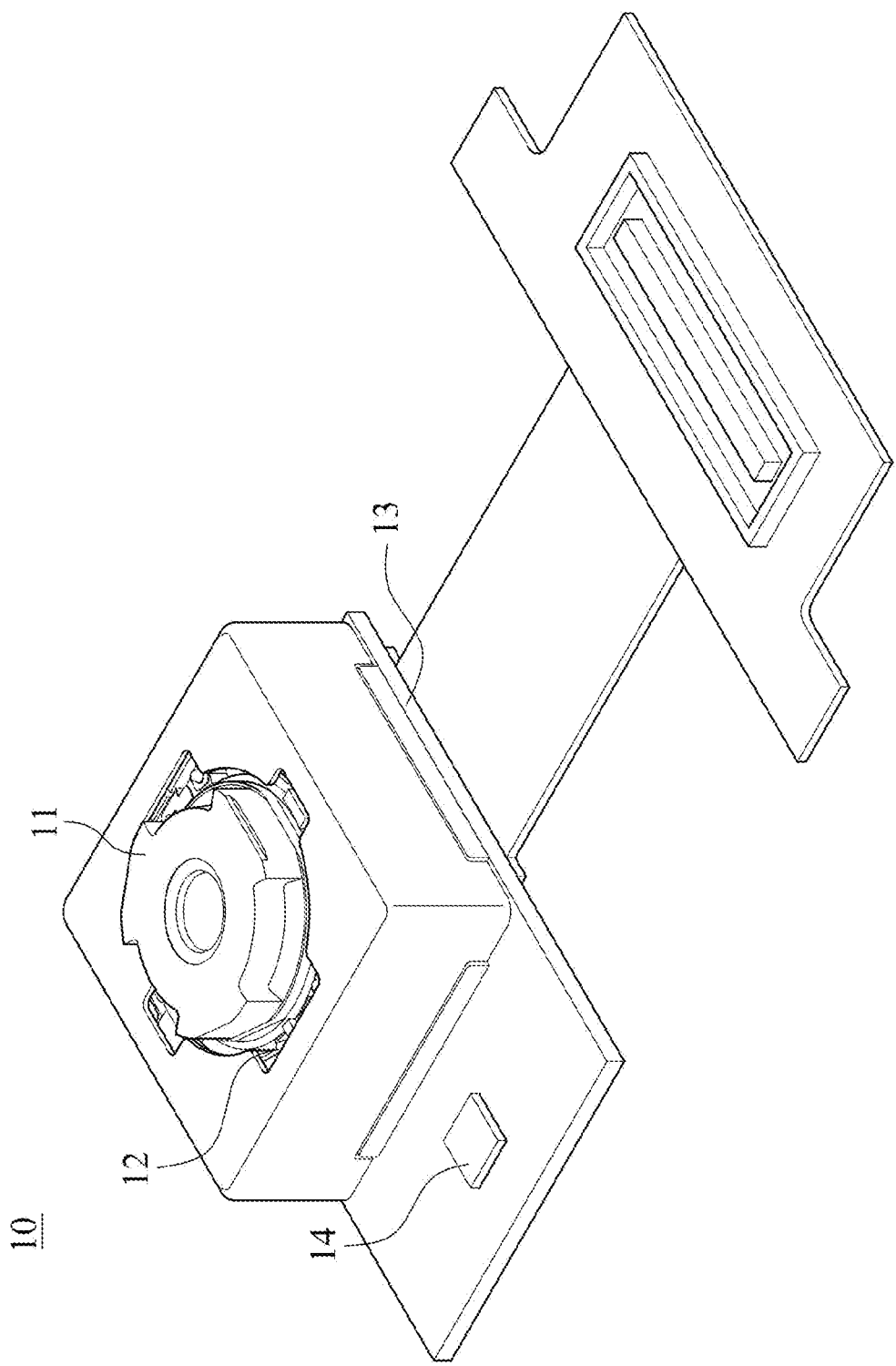
FIG. 28 is a three-dimensional schematic view of an imaging apparatus according to the 13th embodiment of the present disclosure.

FIG. 28 is a three-dimensional schematic view of an imaging apparatus 10 according to the 13th embodiment of the present disclosure. In FIG. 28, the imaging apparatus 10 of the 13th embodiment is a camera module, the imaging apparatus 10 includes an imaging lens assembly 11, a driving apparatus 12 and an image sensor 13, wherein the imaging lens assembly 11 includes the imaging lens assembly of the 1st embodiment and a lens barrel (not shown in drawings) for carrying the imaging lens assembly 11. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The imaging lens assembly can obtain a favorable imaging position by the driving apparatus 12 so as to capture clear images when the imaged object is disposed at different object distances.

The imaging apparatus 10 can include the image sensor 13 located on the image surface of the imaging lens assembly 11, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyroscope, and a Hall Effect sensor. In the 13th embodiment, the image stabilization module 14 is a gyro sensor, but is not limited thereto. Therefore, the variation of different axial directions of the imaging lens assembly can adjusted so as to compensate the image blur generated by motion at the moment of exposure, and it is further favorable for enhancing the image quality while photographing in motion and low light situation. Furthermore, advanced image compensation functions, such as optical image stabilization (OIS) and electronic image stabilization (EIS) etc., can be provided.

14th Embodiment

Figure 29A:
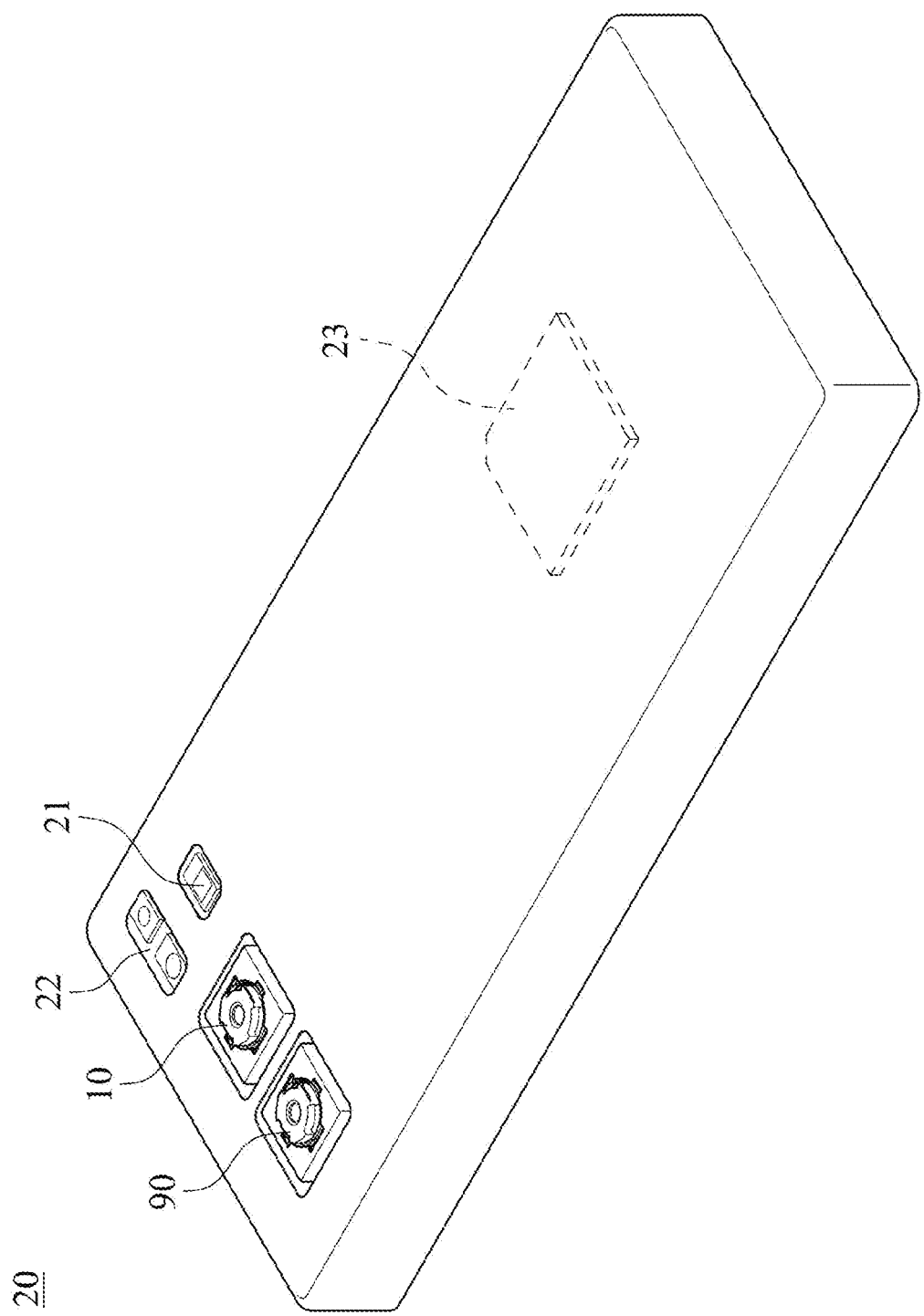
FIG. 29A is a schematic view of one side of an electronic device according to the 14th embodiment of the present disclosure.
Figure 29B:
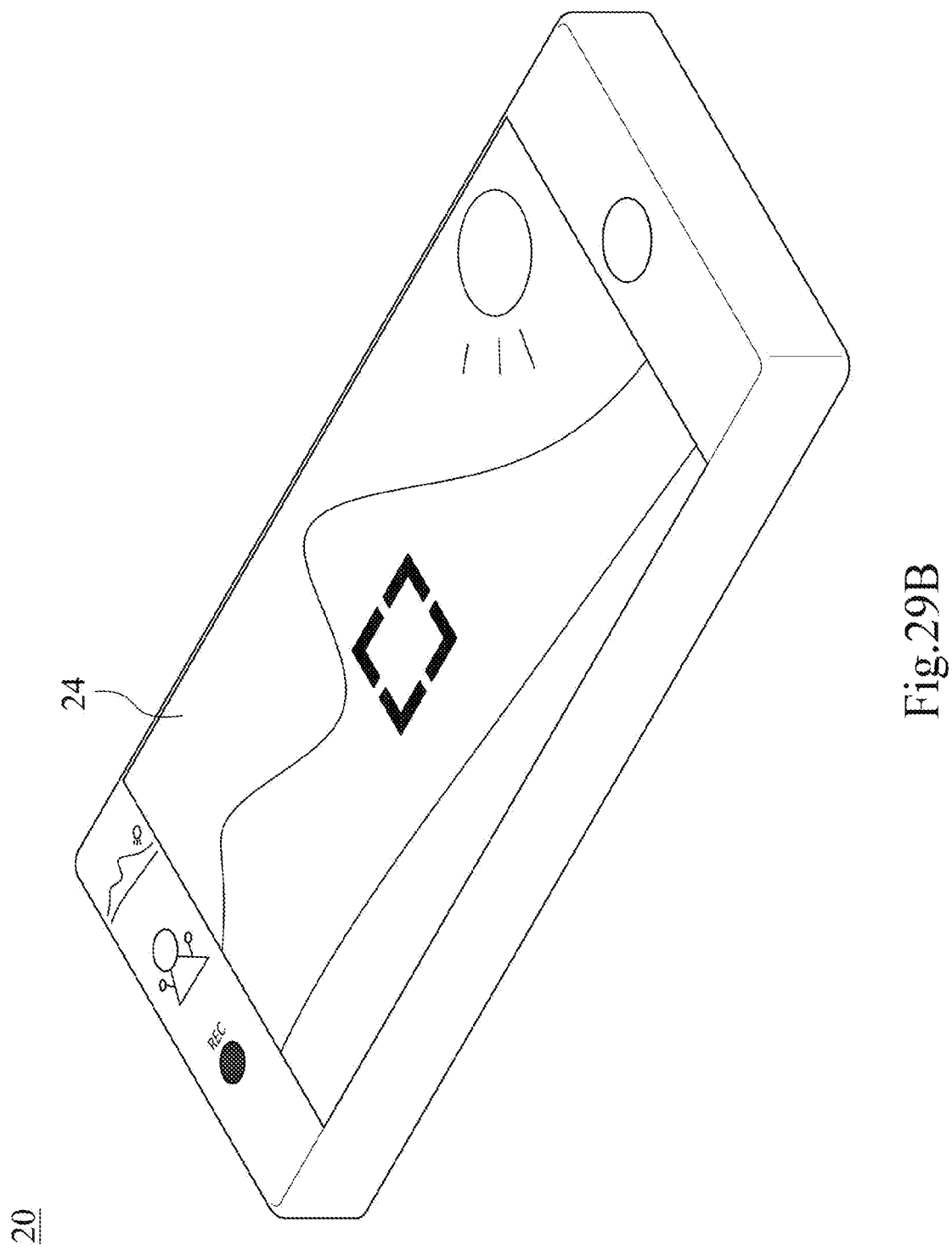
FIG. 29B is a schematic view of another side of the electronic device of FIG. 29A.
Figure 29C:
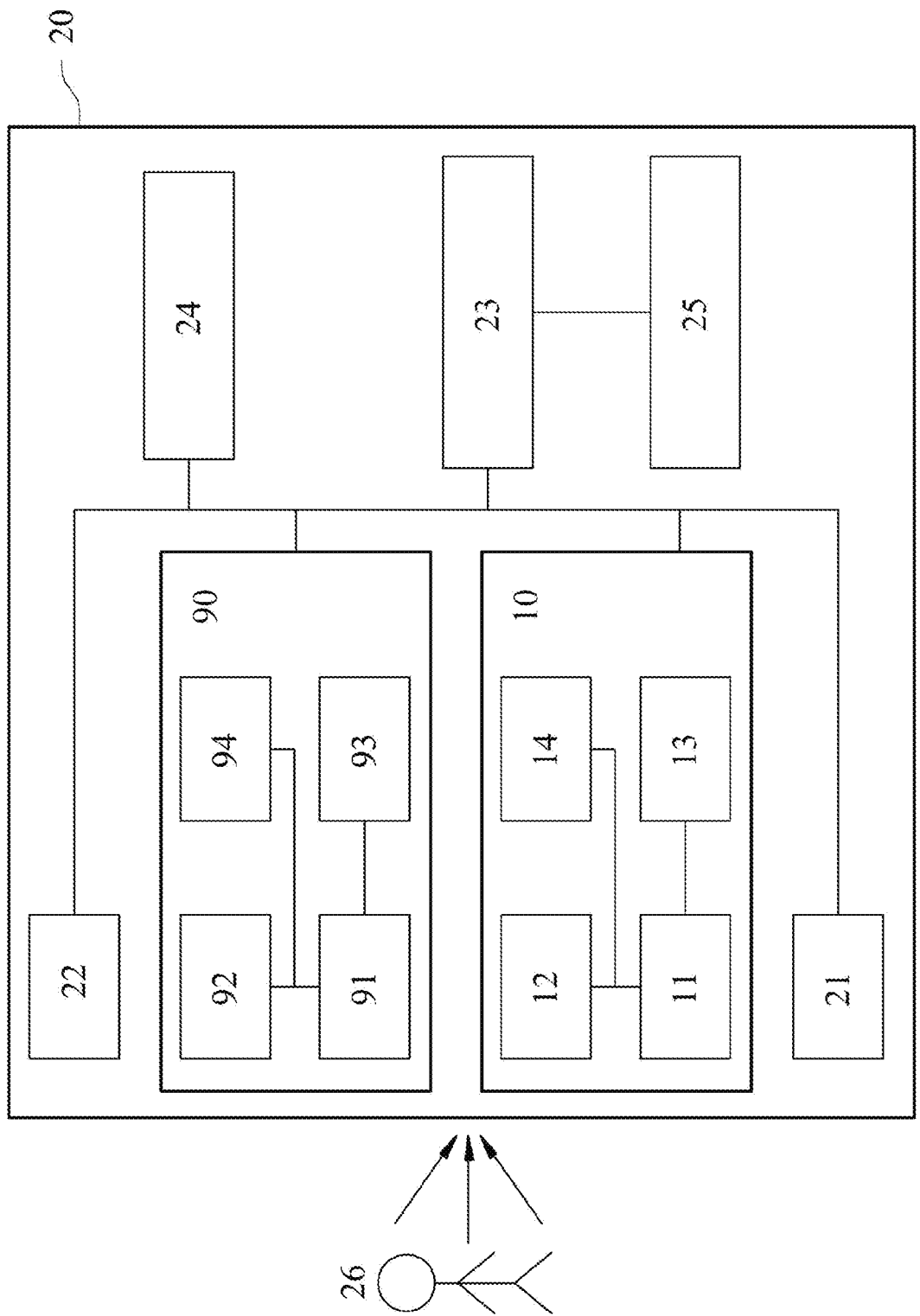
FIG. 29C is a system schematic view of the electronic device of FIG. 29A.

FIG. 29A is a schematic view of one side of an electronic device 20 according to the 14th embodiment of the present disclosure. FIG. 29B is a schematic view of another side of the electronic device 20 of FIG. 29A. FIG. 29C is a system schematic view of the electronic device 20 of FIG. 29A. In FIGS. 29A, 29B and 29C, the electronic device 20 according to the 14th embodiment is a smartphone, wherein the electronic device 20 includes the imaging apparatus 10, a photographing apparatus 90, a flash module 21, a focusing assisting module 22, an image signal processor 23, a user interface 24 and an image software processor 25, wherein the photographing apparatus 90 includes an imaging lens assembly 91, a driving apparatus 92, an image sensor 93 and a stabilization module 94. The imaging lens assembly 91 includes a photographing lens assembly (reference number is omitted) with a maximum field of view larger than the field of view of the imaging apparatus 10, and both lens assemblies (the photographing lens assembly and the imaging lens assembly) can be utilized by the electronic device 20 to achieve a zoom function. When the user captures images of an imaged object 26 via the user interface 24, the electronic device 20 focuses and generates images via the imaging apparatus 10 and photographing apparatus 90 while compensating for low illumination via the flash module 21 when necessary. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

The imaging apparatus 10 according to the 14th embodiment is the same as the imaging apparatus 10 according to the 13th embodiment, and will not describe again herein.

15th Embodiment

Figure 30:
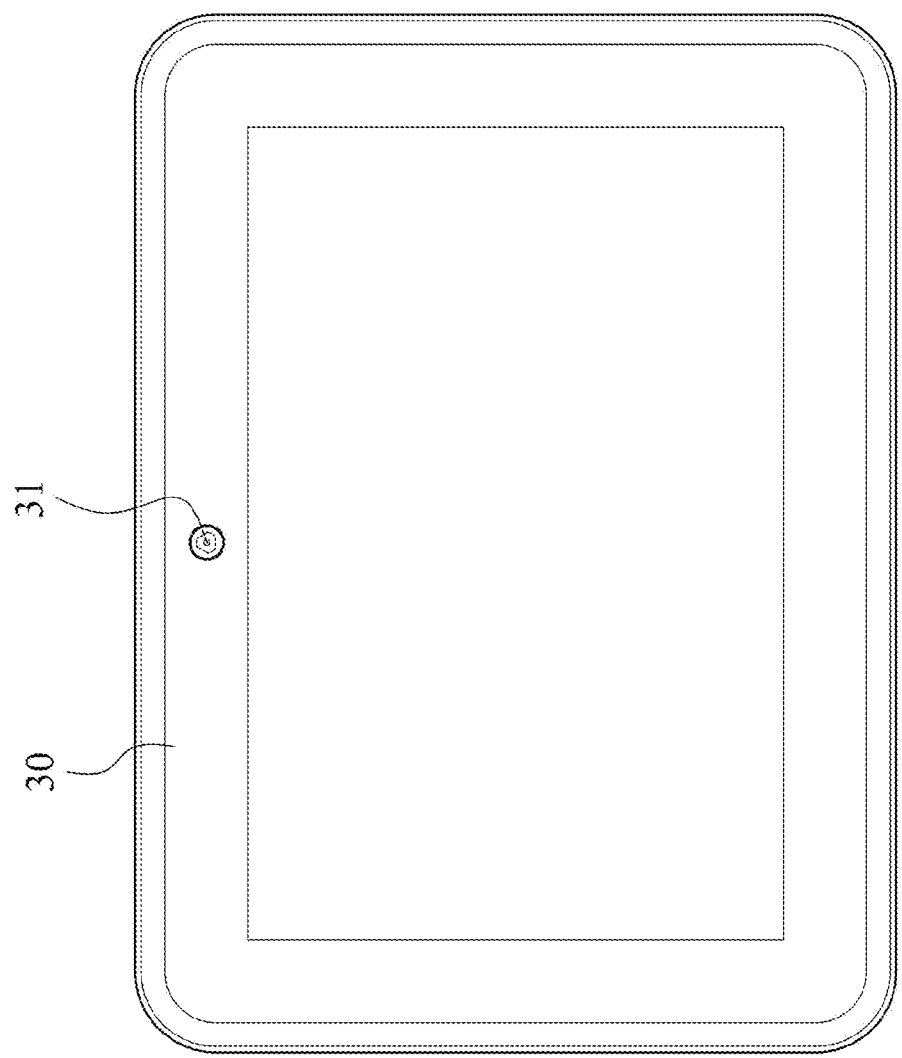
FIG. 30 is a schematic view of an electronic device according to the 15th embodiment of the present disclosure.

FIG. 30 is a schematic view of an electronic device 30 according to the 15th embodiment of the present disclosure. The electronic device 30 of the 15th embodiment is a tablet personal computer, wherein the electronic device 30 includes an imaging apparatus 31, wherein the imaging apparatus 31 is the same as stated in the 13th embodiment, and will not describe again herein.

16th Embodiment

Figure 31:
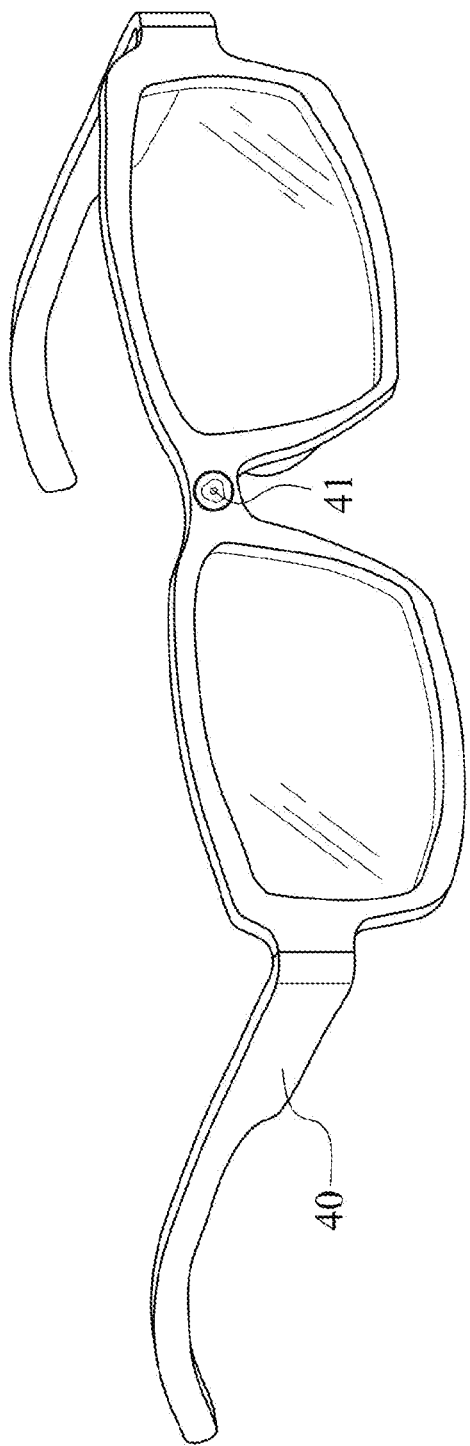
FIG. 31 is a schematic view of an electronic device according to the 16th embodiment of the present disclosure.

FIG. 31 is a schematic view of an electronic device 40 according to the 16th embodiment of the present disclosure. The electronic device 40 of the 16th embodiment is a wearable device, wherein the electronic device 40 includes an imaging apparatus 41, wherein the imaging apparatus 41 is the same as stated in the 13th embodiment, and will not describe again herein.

The foregoing description, for purpose of explanation, has been described with reference to specific embodiments. It is to be noted that Tables 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising six lens elements, the six lens elements being, in order from an object side to an image side:
a first lens element, a second lens element, a third lens element, a fourth lens element, a fifth lens element, and a sixth lens element;
wherein at least one of an object-side surface and an image-side surface of at least one of the six lens elements comprises at least one inflection point; at least one of the six lens elements is made of plastic material; and each of at least two of the six lens elements has an Abbe number smaller than 20.0;
wherein a maximum refractive index of the six lens elements of the imaging lens assembly is Nmax, a focal length of the imaging lens assembly is f, a maximum image height of the imaging lens assembly is ImgH, and the following conditions are satisfied:

$1.640 < Nmax < 1.750$; and $2.60 \leq f/ImgH < 10.0$.

2. The imaging lens assembly of claim 1, wherein the first lens element has positive refractive power, a curvature radius of an object-side surface of the first lens element is R1, the focal length of the imaging lens assembly is f, and the following condition is satisfied:

$0 < R1/f < 0.35$.

3. The imaging lens assembly of claim 1, wherein the fifth lens element has positive refractive power, and the six lens elements are made of plastic material.

4. The imaging lens assembly of claim 1, wherein the third lens element has negative refractive power, a focal length of the second lens element is f2, a focal length of the fifth lens element is f5, and the following condition is satisfied:

$0 < f2/f5 < 5.50$.

5. The imaging lens assembly of claim 1, wherein the first lens element has an object-side surface being convex in a paraxial region thereof and an image-side surface being concave in a paraxial region thereof, and the second lens element has an object-side surface being convex in a paraxial region thereof.

6. The imaging lens assembly of claim 1, wherein an Abbe number of the second lens element is V2, an Abbe number of the fifth lens element is V5, and the following condition is satisfied:

$-70.0 < V5 - V2 < -10.0$.

7. The imaging lens assembly of claim 1, wherein a central thickness of the fourth lens element is CT4, a central thickness of the fifth lens element is CT5, and the following condition is satisfied:

$0.10 < CT4/CT5 < 0.65$.

8. The imaging lens assembly of claim 1, wherein the focal length of the imaging lens assembly is f, a composite focal length of the first lens element and the second lens element is f12, and the following condition is satisfied:

$1.50 < f/f12 < 3.0$.

9. The imaging lens assembly of claim 1, wherein the focal length of the imaging lens assembly is f, an entrance pupil diameter of the imaging lens assembly is EPD, and the following condition is satisfied:

$0.80 < f/EPD < 2.0$.

10. The imaging lens assembly of claim 1, wherein a vertical distance between a maximum effective diameter position of an object-side surface of the first lens element and an optical axis is Y11, a vertical distance between a maximum effective diameter position of an image-side surface of the sixth lens element and the optical axis is Y62, and the following condition is satisfied:

$0.74 \leq Y11/Y62 < 1.20$.

11. The imaging lens assembly of claim 1, wherein an entrance pupil diameter of the imaging lens assembly is EPD, the maximum image height of the imaging lens assembly is ImgH, and the following condition is satisfied:

$1.0 < EPD/ImgH < 2.0$.

12. The imaging lens assembly of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following condition is satisfied:

$0 \leq (T12+T23+T56)/(T34+T45) < 0.50$.

13. The imaging lens assembly of claim 1, wherein each of at least three of the six lens elements has an Abbe number smaller than 20.0.

14. An imaging apparatus, comprising:
the imaging lens assembly of claim 1;
a reflective element; and
an image sensor disposed on an image surface of the imaging lens assembly.

15. An electronic device, comprising:
the imaging apparatus of claim 14.

16. An imaging lens assembly comprising six lens elements, the six lens elements being, in order from an object side to an image side:
a first lens element, a second lens element, a third lens element, a fourth lens element, a fifth lens element, and a sixth lens element;
wherein at least one of an object-side surface and an image-side surface of at least one of the six lens elements comprises at least one inflection point; at least one of the six lens elements is made of plastic material; and each of at least two of the six lens elements has an Abbe number smaller than 20.0;
wherein a maximum refractive index of the six lens elements of the imaging lens assembly is Nmax, a focal length of the imaging lens assembly is f, a maximum image height of the imaging lens assembly is ImgH, a focal length of the fifth lens element is f5, a focal length of the sixth lens element is f6, and the following conditions are satisfied:

$1.640 < Nmax < 1.750$;

$2.25 < f/ImgH < 10.0$; and $1.50 < |f/f5| + |f/f6| < 4.0$.

17. The imaging lens assembly of claim 16, wherein the fourth lens element has negative refractive power; each of the six lens elements has at least one of the object-side surface and the image-side surface being aspheric; and there is an air gap between every adjacent lens elements of the six lens elements.

18. The imaging lens assembly of claim 16, wherein the third lens element has an object-side surface being convex in a paraxial region thereof and an image-side surface being concave in a paraxial region thereof.

19. The imaging lens assembly of claim 16, wherein the sixth lens element has an object-side surface being concave in a paraxial region thereof and comprising at least one convex shape in an off-axis region thereof.

20. The imaging lens assembly of claim 16, wherein the maximum refractive index of the six lens elements of the imaging lens assembly is Nmax, an Abbe number of the fifth lens element is V5, an Abbe number of the sixth lens element is V6, and the following conditions are satisfied:

$1.650 \leq N\max < 1.730$; and $-55.0 < V5 - V6 < -17.0$.

21. The imaging lens assembly of claim 16, wherein an axial distance between an object-side surface of the first lens element and an image surface is TL, the focal length of the imaging lens assembly is f, an entrance pupil diameter of the imaging lens assembly is EPD, and the following conditions are satisfied:

$0.50 < TL/f < 1.15$;

$0.80 < f/EPD < 2.25$; and $0.40 < EPD/TL < 1.0$.

22. The imaging lens assembly of claim 16, wherein a minimum of maximum effective diameters of object-side surfaces and image-side surfaces of the six lens elements is a maximum effective diameter of an image-side surface of the third lens element.

23. An imaging lens assembly comprising six lens elements, the six lens elements being, in order from an object side to an image side:
   a first lens element, a second lens element, a third lens element, a fourth lens element, a fifth lens element, and a sixth lens element;
   wherein at least one of an object-side surface and an image-side surface of at least one of the six lens elements comprises at least one inflection point; at least one of the six lens elements is made of plastic material; and each of at least two of the six lens elements has an Abbe number smaller than 20.0;
   wherein a maximum refractive index of the six lens elements of the imaging lens assembly is Nmax, a focal length of the imaging lens assembly is f, a maximum image height of the imaging lens assembly is ImgH, an Abbe number of the third lens element is V3, and the following conditions are satisfied:

$1.640 < N\max < 1.750$;

$2.25 < f/\text{ImgH} < 10.0$; and $10.0 < V3 < 22.0$.

24. The imaging lens assembly of claim 23, wherein the second lens element has positive refractive power.

25. The imaging lens assembly of claim 23, wherein the fifth lens element has an image-side surface being convex in a paraxial region thereof, and each of the image-side surface of the fifth lens element and an image-side surface of the sixth lens element comprises at least one convex shape in an off-axis region thereof.

26. The imaging lens assembly of claim 23, wherein the sixth lens element has an image-side surface being concave in a paraxial region thereof and comprising at least one convex shape in an off-axis region thereof, an axial distance between an object-side surface of the first lens element and an image surface is TL, an entrance pupil diameter of the imaging lens assembly is EPD, and the following condition is satisfied:

$0.45 < EPD/TL < 0.80$.

27. The imaging lens assembly of claim 23, wherein an Abbe number of the fifth lens element is V5, an axial distance between an object-side surface of the first lens element and an image surface is TL, the maximum image height of the imaging lens assembly is ImgH, and the following conditions are satisfied:

$10.0 < V5 < 38.0$; and $1.50 < TL/\text{ImgH} < 3.50$.

28. The imaging lens assembly of claim 23, wherein an axial distance between the third lens element and the fourth lens element is T34, an axial distance between the fourth lens element and the fifth lens element is T45, a central thickness of the third lens element is CT3, a central thickness of the fourth lens element is CT4, and the following condition is satisfied:

$2.70 < (T34 + T45)/(CT3 + CT4) < 15.0$.

29. The imaging lens assembly of claim 23, further comprising:
   an aperture stop, wherein an axial distance between the aperture stop and an image-side surface of the sixth lens element is SD, an axial distance between an object-side surface of the first lens element and the image-side surface of the sixth lens element is TD, an axial distance between the object-side surface of the first lens element and an image surface is TL, the focal length of the imaging lens assembly is f, and the following conditions are satisfied:

$0.55 < SD/TD < 1.10$; and $0.50 < TL/f < 1.0$.

* * * * *